(12) United States Patent  (10) Patent No.: US 8,697,295 B2
Fujii et al.  (45) Date of Patent: Apr. 15, 2014

(54) NONAQUEOUS ELECTROLYTIC SOLUTION AND NONAQUEOUS ELECTROLYTE SECONDARY BATTERY

(75) Inventors: Takashi Fujii, Ibaraki (JP); Youichi Ohashi, Ibaraki (JP); Shinichi Kinoshita, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/476,598

(22) Filed: May 21, 2012

(65) Prior Publication Data

US 2012/0231330 A1  Sep. 13, 2012

Related U.S. Application Data

(62) Division of application No. 12/518,188, filed as application No. PCT/JP2007/073572 on Dec. 6, 2007.

(30) Foreign Application Priority Data

Dec. 6, 2006 (JP) ................................ 2006-329935
Jun. 28, 2007 (JP) ................................ 2007-170651

(51) Int. Cl.
  *H01M 6/16* (2006.01)
(52) U.S. Cl.
  USPC ........... 429/339; 429/199; 429/200; 429/330; 429/231.8; 252/62.2
(58) Field of Classification Search
  USPC ....................... 429/339, 199, 200, 330, 231.8; 252/62.2
  See application file for complete search history.

(56) References Cited

U.S. PATENT DOCUMENTS

| | | | |
|---|---|---|---|
| 6,919,145 B1 | 7/2005 | Kotato et al. | |
| 6,942,948 B2 | 9/2005 | Takehara et al. | |
| 8,007,938 B2 | 8/2011 | Kotato et al. | |
| 8,043,745 B2 | 10/2011 | Kotato et al. | |
| 2003/0068562 A1* | 4/2003 | Kim et al. | 429/330 |
| 2003/0194312 A1 | 10/2003 | Burnett et al. | |
| 2003/0194612 A1 | 10/2003 | Shembel et al. | |
| 2004/0013946 A1 | 1/2004 | Abe et al. | |
| 2004/0197667 A1 | 10/2004 | Noh et al. | |
| 2005/0238957 A1 | 10/2005 | Kim et al. | |
| 2006/0068293 A1 | 3/2006 | Kim et al. | |
| 2006/0194118 A1* | 8/2006 | Yew et al. | 429/330 |
| 2006/0204834 A1* | 9/2006 | Kim et al. | 429/65 |
| 2008/0057402 A1* | 3/2008 | Abe et al. | 429/330 |
| 2008/0248397 A1* | 10/2008 | Jung et al. | 429/314 |
| 2009/0325065 A1 | 12/2009 | Fujii et al. | |
| 2010/0099031 A1 | 4/2010 | Kato et al. | |
| 2010/0119956 A1 | 5/2010 | Tokuda et al. | |
| 2011/0091768 A1 | 4/2011 | Ohashi et al. | |
| 2011/0223488 A1 | 9/2011 | Nishida et al. | |
| 2011/0300453 A1 | 12/2011 | Kotato et al. | |
| 2012/0070731 A1 | 3/2012 | Fujii et al. | |
| 2012/0177988 A1 | 7/2012 | Fujii et al. | |

FOREIGN PATENT DOCUMENTS

| | | |
|---|---|---|
| CN | 1532986 A | 9/2004 |
| JP | 62 290072 | 12/1987 |
| JP | 7 176322 | 7/1995 |
| JP | 8 45545 | 2/1996 |
| JP | 9 161845 | 6/1997 |
| JP | 11-67270 A | 3/1999 |
| JP | 11 176470 | 7/1999 |
| JP | 2000 40526 | 2/2000 |
| JP | 2002 302649 | 10/2002 |
| JP | 2003 86247 | 3/2003 |
| JP | 2004-31079 | 1/2004 |
| JP | 2004-71458 | 3/2004 |
| JP | 2004 87284 | 3/2004 |
| JP | 2004 179146 | 6/2004 |
| JP | 2004 303437 | 10/2004 |
| JP | 2005-71678 A | 3/2005 |
| JP | 2007 66726 | 3/2007 |
| WO | 98 15024 | 4/1998 |
| WO | 2005 078832 | 8/2005 |
| WO | 2005 117198 | 12/2005 |

OTHER PUBLICATIONS

Extended European Search Report issued Jul. 21, 2011, in Patent Application No. 07859727.5.
Office Action issued Aug. 2, 2011, in Chinese Patent Application No. 200780044722.5 (with English-language translation).
Chinese Office Action issued Dec. 6, 2010, in Patent Application No. 200780044722.5 (with English-language translation).

(Continued)

*Primary Examiner* — Laura Weiner
(74) *Attorney, Agent, or Firm* — Oblon, Spivak, McClelland, Maier & Neustadt, L.L.P.

(57) ABSTRACT

A nonaqueous electrolytic solution that can provide a high energy density nonaqueous electrolyte secondary battery having a high capacity, excellent storage characteristics, and excellent cycle characteristics and suppressing the decomposition of an electrolytic solution and the deterioration thereof when used in a high-temperature environment includes an electrolyte, a nonaqueous solvent, and a compound represented by general formula (1):

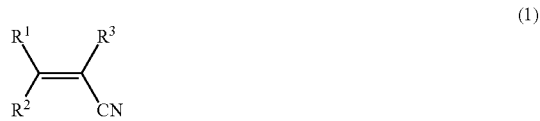

(1)

wherein $R^1$, $R^2$, and $R^3$ each independently represent a hydrogen atom, a cyano group, or an optionally halogen atom-substituted hydrocarbon group having 1 to 10 carbon atoms, with the proviso that $R^1$ and $R^2$ do not simultaneously represent hydrogen atoms.

14 Claims, No Drawings

(56) References Cited

OTHER PUBLICATIONS

U.S. Appl. No. 13/489,038, filed Jun. 5, 2012, Kotato, et al.
Office Action issued Jul. 25, 2012 in European Application No. 07 859 727.5.
Japanese Office Action issued on Mar. 5, 2013, in patent Application No. 2008-169031.
European Office Action issued on Feb. 27, 2013, in European patent Application No. 07 859 727.5.
Office Action issued Oct. 2, 2012 in Japanese Patent Application No. 2007-316037.
Office Action issued Apr. 26, 2013 in Chinese Patent Application No. 201110098376.7 (with English translation).
Office Action issued May 21, 2013 in Japanese Patent Application No. 2007-316037.

* cited by examiner

NONAQUEOUS ELECTROLYTIC SOLUTION AND NONAQUEOUS ELECTROLYTE SECONDARY BATTERY

The present application is a Divisional of U.S. application Ser. No. 12/518,188, filed Sep. 14, 2009, which is a national stage application, under 35 U.S.C. 371, of PCT/JP2007/073572, filed on Dec. 6, 2007, and in turn claims priority to JP 2006-329935 filed on Dec. 6, 2006, and to JP 2007-170651, filed Jun. 28, 2007, the entire contents of each of which are hereby incorporated herein by reference.

TECHNICAL FIELD

The present invention relates to nonaqueous electrolytic solutions and nonaqueous electrolyte secondary batteries. Specifically, the present invention relates to a specific component-containing nonaqueous electrolytic solution that can realize a secondary battery having improved battery characteristics, such as cycle characteristics and high-temperature storage characteristics, and relates to a nonaqueous electrolyte secondary battery including the nonaqueous electrolytic solution.

BACKGROUND ART

In recent years, there have been advances in the development of nonaqueous electrolyte secondary batteries with higher energy densities as progress toward a reduction in the size and weight of electric appliances. Furthermore, the expansion of fields of application of nonaqueous electrolyte secondary batteries require further improvement in battery characteristics.

Hitherto, metallic lithium, metal compounds, such as elemental metals, oxides, and alloys of lithium, capable of storing and releasing lithium, and carbonaceous materials have been used as negative-electrode active materials for use in nonaqueous electrolyte secondary batteries. With respect to carbonaceous materials, in particular, for example, nonaqueous electrolyte secondary batteries including carbonaceous materials, such as coke, artificial graphite, and natural graphite, capable of storing and releasing lithium have been reported. In such nonaqueous electrolyte secondary batteries, lithium does not exist in the metallic state, suppressing the formation of dendrites and improving the life and safety of batteries. In particular, nonaqueous electrolyte secondary batteries including graphite-based carbonaceous materials such as artificial and natural graphite have been receiving attention because they should meet the demand for higher capacity.

In nonaqueous electrolyte secondary batteries including the carbonaceous materials, usually, cyclic carbonic esters, such as propylene carbonate and ethylene carbonate, are widely used as high-dielectric solvents for use in nonaqueous electrolytic solutions. In particular, for nonaqueous electrolyte secondary batteries including non-graphite-based carbonaceous materials, e.g., coke, propylene carbonate-containing solvents are suitably used.

In the case of using solvents containing propylene carbonate in nonaqueous electrolyte secondary batteries including negative electrodes composed of graphite-based carbonaceous materials alone or mixtures of graphite-based carbonaceous materials and other negative-electrode materials capable of storing and releasing lithium, however, the decomposition reaction of propylene carbonate proceeds vigorously on surfaces of the electrodes during charging. This makes it impossible to smoothly store and release lithium at the graphite-based carbonaceous negative electrodes.

In contrast, ethylene carbonate is not vigorously decomposed; hence, in nonaqueous electrolyte secondary batteries including graphite-based carbonaceous negative electrodes, ethylene carbonate is often used as a high-dielectric solvent in electrolytic solutions. Even in the case of using ethylene carbonate as a main solvent, however, there are problems of reductions in charge and discharge efficiency and cycle characteristics, an increase in internal battery pressure due to gas generated by the decomposition of electrolytic solutions on surfaces of the electrodes during charging and discharging, and the like.

To improve characteristics of nonaqueous electrolyte secondary batteries, electrolytic solutions containing various additives have been reported.

To suppress the decomposition of electrolytic solutions of nonaqueous electrolyte batteries including graphite-based negative electrodes, for example, the following electrolytic solutions have been reported: electrolytic solutions containing vinylene carbonate and its derivatives (Patent Document 1), electrolytic solutions containing ethylene carbonate derivatives having non-conjugated unsaturated bonds in their side chains (Patent Document 2), and electrolytic solutions containing halogen atom-substituted cyclic carbonates (Patent Document 3). These compounds contained in the electrolytic solutions are reductively decomposed on surfaces of negative electrodes to form films that suppress excessive decomposition of the electrolytic solutions.

These compounds, however, do not necessarily meet the requirements for storage characteristics under a high-temperature environment, battery characteristics in a high-voltage state, or gas generation. Vinylene carbonate compounds react readily with positive electrode materials in a charged state. A higher vinylene carbonate compound content is liable to cause a further reduction in storage characteristics.

Meanwhile, in place of vinylene carbonate and its derivatives and ethylene carbonates having nonconjugated unsaturated bonds in their side chains and their derivatives, nitrile compounds having unsaturated bonds have been reported as additives capable of being reductively decomposed to form films (Patent Document 4). The patent document discloses that also in electrolytic solutions containing these compounds, the reductive decomposition of solvents can be suppressed at a low level during charging. Also in the case of using these compounds, however, there are still issues of battery characteristics under a high-temperature environment and high-voltage conditions or gas generation.

The suppression of the reactivity of electrode materials in a charged state to solvents, vinylene carbonate and its derivatives, ethylene carbonates having nonconjugated unsaturated bonds in their side chains and their derivatives, or halogen atom-substituted cyclic carbonates, which are additives, results in improvements in battery characteristics under high-temperature conditions and the suppression of gas generation. It is desirable to develop a technique for suppressing the reactivity.

In place of propylene carbonate and ethylene carbonate, a halogen atom-substituted cyclic carbonate used as a high-dielectric solvent has been reported (Patent Document 5). The document describes that the incorporation of a fluorine atom or a chlorine atom serving as an electron-withdrawing group in ethylene carbonate suppresses the decomposition and improves charge and discharge efficiency. This effect, however, is still insufficient under a high-temperature environment. Thus, further improvements are required.

In recent years, negative-electrode active materials composed of elemental metals, such as silicon (Si), tin (Sn), and lead (Pb), capable of being alloyed with lithium, alloys containing at least these metal elements, and metal compounds containing these metal elements (hereinafter, referred to as "negative-electrode active materials containing Si, Sn, Pb, and the like") have been reported. The capacity of these materials are about 2,000 mAh·cm$^{-3}$ or more and is about four or more times those of graphite and the like. Thus, the use of these materials results in a higher capacity.

Secondary batteries including the negative-electrode active materials containing Si, Sn, Pb, and the like can have higher capacities but have problems of a reduction in safety, a reduction in charge and discharge efficiency due to the deterioration of the negative-electrode active materials by charge and discharge, a reduction in battery characteristics under a high-temperature environment and high-voltage conditions, gas generation, and a reduction in cycle characteristics.

To ensure safety and prevent a reduction in the discharge capacity of such batteries, a nonaqueous electrolytic solution containing a phosphotriester and a cyclic carbonate or a multimer of a carbonate has been reported as a nonaqueous electrolytic solution used for secondary batteries (Patent Document 6). To improve charge-discharge cycle characteristics of batteries, a method for improving charge-discharge cycle characteristics of a battery by adding a heterocyclic compound having a sulfur atom and/or an oxygen atom in its ring to a nonaqueous electrolytic solution and forming a film on a surface of a negative-electrode active material has been reported (Patent Document 7). To suppress gas generation when a battery is stored in a charged state at a high temperature, a negative electrode provided with a fired mixture layer containing negative-electrode active material particles, lithium oxide, and a binder arranged on a surface of a current collector has been reported (Patent Document 8).

[Patent Document 1] Japanese Unexamined Patent Application Publication No. 8-45545
[Patent Document 2] Japanese Unexamined Patent Application Publication No. 2000-40526
[Patent Document 3] WO98/15024
[Patent Document 4] Japanese Unexamined Patent Application Publication No. 2003-86247
[Patent Document 5] Japanese Unexamined Patent Application Publication No. 62-290072
[Patent Document 6] Japanese Unexamined Patent Application Publication No. 11-176470
[Patent Document 7] Japanese Unexamined Patent Application Publication No. 2004-87284
[Patent Document 8] Japanese Unexamined Patent Application Publication No. 2007-66726

DISCLOSURE OF INVENTION

In conventional secondary batteries described in Patent Documents 6, 7, and the like, the use of an element such as silicon (Si) as a material constituting negative electrodes results in a higher capacity. However, the performance, in particular, discharge capacity retention rates of the secondary batteries in charge-discharge cycles over longer periods of time, is still insufficient.

Furthermore, the conventional secondary batteries described above do not sufficiently overcome all problems of gas generation, the reduction in cycle characteristics, and the like when stored in a charged state at a high temperature.

The present invention has been made in light of the circumstances described above. It is an object of the present invention to provide a nonaqueous electrolytic solution for use in a nonaqueous electrolytic secondary battery, the nonaqueous electrolytic solution suppressing gas generation during high-temperature storage in a charged state and affording satisfactory cycle characteristics, and provide a secondary battery including the nonaqueous electrolytic solution.

To overcome the foregoing problems relating to the graphite negative electrodes, it is another object of the present invention to provide a high energy density nonaqueous electrolyte secondary battery having a high capacity, excellent storage characteristics, and excellent cycle characteristics and suppressing the decomposition of an electrolytic solution used in the nonaqueous electrolyte secondary battery and the deterioration thereof when used in a high-temperature environment.

The inventors have conducted various studies and have found that the use of a nitrile compound having a specific structure minimizes the decomposition reaction of an electrolytic solution and, if an additive for forming a film on a negative electrode is added, also minimizes the decomposition reaction of the additive, thereby improving charge and discharge efficiency, storage characteristics, and cycle characteristics. The finding has led to the completion of the present invention.

A nonaqueous electrolytic solution according to a first aspect of the present invention is a nonaqueous electrolytic solution for use in a nonaqueous electrolyte secondary battery including a positive electrode having a positive-electrode active material capable of storing and releasing metal ions and a negative electrode having a negative-electrode active material containing at least one atom selected from the group consisting of Si, Sn, and Pb and capable of storing and releasing metal ions and includes a compound represented by general formula (1) and/or a compound having 2 to 4 cyano groups in its structural formula:

In general formula (1), $R^1$, $R^2$, and $R^3$ each independently represent a hydrogen atom, a cyano group, or an optionally halogen atom-substituted hydrocarbon group having 1 to 10 carbon atoms.

A nonaqueous electrolytic solution according to a second aspect of the present invention is a nonaqueous electrolytic solution for use in a nonaqueous electrolyte secondary battery including a negative electrode, a positive electrode, and a nonaqueous electrolytic solution, the negative electrode and the positive electrode being capable of storing and releasing metal ions, and includes an electrolyte, a nonaqueous solvent, and a compound represented by general formula (2):

In general formula (2), $R^4$, $R^5$, and $R^6$ each independently represent a hydrogen atom, a cyano group, or an optionally halogen atom-substituted hydrocarbon group having 1 to 10 carbon atoms, with the proviso that $R^4$ and $R^5$ do not simultaneously represent hydrogen atoms.

A nonaqueous electrolytic solution according to a third aspect of the present invention is a nonaqueous electrolytic solution for use in a nonaqueous electrolyte secondary battery including a negative electrode, a positive electrode, and a nonaqueous electrolytic solution, the negative electrode and the positive electrode being capable of storing and releasing metal ions, and includes an electrolyte, a nonaqueous solvent, a compound represented by general formula (1), and at least one compound selected from the group consisting of halogen atom-containing cyclic carbonates, monofluorophosphates, and difluorophosphates:

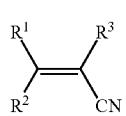
(1)

In general formula (1), $R^1$, $R^2$, and $R^3$ each independently represent a hydrogen atom, a cyano group, or an optionally halogen atom-substituted hydrocarbon group having 1 to 10 carbon atoms.

A nonaqueous electrolyte secondary battery according to a fourth aspect of the present invention includes a positive electrode having a positive-electrode active material capable of storing and releasing metal ions, a negative electrode having a negative-electrode active material containing at least one atom selected from the group consisting of Si, Sn, and Pb and capable of storing and releasing metal ions, and the nonaqueous electrolytic solution according to the first aspect.

A nonaqueous electrolyte secondary battery according to a fifth aspect of the present invention includes a positive electrode having a positive-electrode active material capable of storing and releasing metal ions, a negative electrode having a negative-electrode active material containing at least one atom selected from the group consisting of Si, Sn, and Pb and capable of storing and releasing metal ions, and the nonaqueous electrolytic solution according to the second aspect.

A nonaqueous electrolyte secondary battery according to a sixth aspect of the present invention includes a negative electrode, a positive electrode, and a nonaqueous electrolytic solution, the negative electrode and the positive electrode being capable of storing and releasing metal ions, wherein the nonaqueous electrolytic solution is the nonaqueous electrolytic solution according to the second aspect.

A nonaqueous electrolyte secondary battery according to a seventh aspect of the present invention includes a negative electrode, a positive electrode, and a nonaqueous electrolytic solution, the negative electrode and the positive electrode being capable of storing and releasing metal ions, wherein the nonaqueous electrolytic solution is the nonaqueous electrolytic solution according to the third aspect.

DETAILED DESCRIPTION OF THE INVENTION

According to the present invention, it is possible to provide a nonaqueous electrolyte secondary battery inhibiting gas generation during high-temperature storage in a charged state and having excellent cycle characteristics.

Furthermore, according to the present invention, it is possible to provide a nonaqueous electrolyte secondary battery that does not readily deteriorate when used in a high-temperature environment and that has high capacity, excellent storage characteristics, and excellent cycle characteristics.

While embodiments of the present invention will be described in detail below, the present invention is not limited to the following description. Any modification can be made within the scope of the invention.

[Nonaqueous Electrolytic Solution]

A nonaqueous electrolytic solution according to a first aspect of the present invention is a nonaqueous electrolytic solution for use in a nonaqueous electrolyte secondary battery including a nonaqueous electrolytic solution, a negative electrode, and a positive electrode, the negative electrode and the positive electrode being capable of storing and releasing metal ions, and the negative electrode having a negative-electrode active material containing at least one atom selected from the group consisting of Si, Sn, and Pb, and contains an unsaturated nitrile compound represented by general formula (1) described below and/or a compound having 2 to 4 cyano groups in its structural formula described below.

A nonaqueous electrolytic solution according to a second aspect of the present invention is a nonaqueous electrolytic solution for use in a nonaqueous electrolyte secondary battery including a nonaqueous electrolytic solution, a negative electrode, and a positive electrode, the negative electrode and the positive electrode being capable of storing and releasing metal ions, contains an electrolyte and a nonaqueous solvent that dissolves the electrolyte, and further contains an unsaturated nitrile compound represented by general formula (2) described below.

A nonaqueous electrolytic solution according to a third aspect of the present invention is a nonaqueous electrolytic solution for use in a nonaqueous electrolyte secondary battery including a nonaqueous electrolytic solution, a negative electrode, and a positive electrode, the negative electrode and the positive electrode being capable of storing and releasing metal ions, contains an electrolyte and a nonaqueous solvent that dissolves the electrolyte, and further contains an unsaturated nitrile compound represented by general formula (1) described below and at least one compound selected from the group consisting of halogen atom-containing cyclic carbonates, monofluorophosphates, and difluorophosphates.

Details of the effect of the present invention are not clear. It is believed that in the unsaturated nitrile compound represented by general formula (1) described below and the unsaturated nitrile compound represented by general formula (2), each of the unsaturated nitrile compounds is subjected to reduction reaction on a surface of the negative electrode at a more electropositive potential than the other constituents in the nonaqueous electrolytic solution to form a coating component, thereby suppressing the decomposition of the other components constituting the nonaqueous electrolytic solution and thus improving battery characteristics and cycle characteristics under a high-temperature environment.

In the compound having 2 to 4 cyano groups in its structural formula and contained in the nonaqueous electrolytic solution, the presence of 2 or more cyano groups results in some strong interactions, such as coordination and adsorption, with a transition metal contained in a positive-electrode active material compared with a mononitrile compound, thereby stabilizing the positive electrode in a charged state. This permits the suppression of the reaction between the positive electrode in a charged state and the nonaqueous electrolytic solution during high-temperature storage and the suppression of gas generation and a deterioration in battery characteristics.

The excellent effect attributed to the compound having 2 to 4 cyano groups in its structural formula is noticeable when a negative electrode having a negative-electrode active material containing at least one atom selected from the group consisting of Si, Sn, and Pb is used, as compared with the case of using a carbon-based negative-electrode active material as a negative-electrode active material.

The reason for this is not necessarily clear. It is speculated that in the case of using the negative electrode having the negative-electrode active material containing at least one atom selected from the group consisting of Si, Sn, and Pb, the potential of a positive electrode is high compared with the case of using a carbon-based negative electrode even when the same battery voltage is obtained, thereby facilitating the reaction between the positive electrode and the nonaqueous electrolytic solution during high-temperature storage in a charged state. In this case, the stabilizing effect of the compound having 2 to 4 cyano groups in its structural formula on the positive electrode in the nonaqueous electrolytic solution is believed to be more clearly provided.

Furthermore, a secondary battery including the negative electrode having the negative-electrode active material containing at least one atom selected from the group consisting of Si, Sn, and Pb is less likely to degrade cycle characteristics without reducing charge and discharge efficiency and thus can satisfy both storage characteristics and cycle characteristics.

Although the reason for this is not clear, it is speculated that the difference in reactivity of the compound, having 2 to 4 cyano groups in its structural formula contained in the nonaqueous electrolytic solution, on the negative electrode is affected.

[Nonaqueous Electrolytic Solution According to First Aspect]

A nonaqueous electrolytic solution according to the first aspect of the present invention is a nonaqueous electrolytic solution for use in a nonaqueous electrolyte secondary battery including a nonaqueous electrolytic solution, a negative electrode, and a positive electrode, the negative electrode and the positive electrode being capable of storing and releasing metal ions, and the negative electrode having a negative-electrode active material containing at least one atom selected from the group consisting of Si, Sn, and Pb, the negative-electrode active material being capable of storing and releasing metal ions, and always contains a compound represented by general formula (1) described below (hereinafter, also referred to as "unsaturated nitrile compound (1)") and/or a compound having 2 to 4 cyano groups in its structural formula.

{Unsaturated Nitrile Compound (1)}

Unsaturated nitrile compound (1) is represented by general formula (1) below.

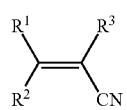

(1)

In general formula (1), $R^1$, $R^2$, and $R^3$ each independently represent a hydrogen atom, a cyano group, or an optionally halogen atom-substituted hydrocarbon group having 1 to 10 carbon atoms.

In general formula (1) described above, a specific example of a compound in which each of $R^1$ to $R^3$ represents a hydrogen atom is acrylonitrile.

In general formula (1) described above, specific examples of a compound in which at least any one of $R^1$ to $R^3$ represents a cyano group include fumaronitrile, 1,1,2-tricyanoethylene, and tetracyanoethylene.

In general formula (1) described above, in the case where at least one of $R^1$ to $R^3$ represents a hydrocarbon group, the lower limit of the number of carbon atoms in the hydrocarbon group is usually 1 or more. The upper limit is usually 10 or less, preferably 8 or less, and more preferably 6 or less.

In general formula (1) described above, the type of hydrocarbon group of each of $R^1$ to $R^3$ is not particularly limited. That is, each of $R^1$ to $R^3$ may represent an aliphatic hydrocarbon group, an aromatic hydrocarbon group, or a group in which an aliphatic hydrocarbon group is linked to an aromatic hydrocarbon group. The aliphatic hydrocarbon group may be a saturated hydrocarbon group or may have an unsaturated bond (a carbon-carbon double bond or carbon-carbon triple bond). Furthermore, the aliphatic hydrocarbon group may have a chain or cyclic structure. In the case of the chain structure, a linear or branched structure may be used. Moreover, the aliphatic hydrocarbon group may have a structure in which a linear moiety is linked to a cyclic moiety.

Specific examples of a preferred substituent as a hydrocarbon group of each of $R^1$ to $R^3$ are described below.

<Specific Example of Saturated Chain Hydrocarbon Group>

Examples thereof include a methyl group, an ethyl group, a n-propyl group, an isopropyl group, a n-butyl group, an isobutyl group, a sec-butyl group, and a tert-butyl group.

<Specific Example of Saturated Cyclic Hydrocarbon Group>

Examples thereof include a cyclopropyl group, a cyclopentyl group, a cyclohexyl group, and a cycloheptyl group.

<Specific Example of Hydrocarbon Group Having Unsaturated Bond (Hereinafter, Also Referred to as an "Unsaturated Hydrocarbon Group")>

Examples thereof include a vinyl group, a 1-propen-1-yl group, a 1-propen-2-yl group, an allyl group, a crotyl group, an ethynyl group, a propargyl group, a phenyl group, a 2-toluoyl group, a 3-toluoyl group, a 4-toluoyl group, a xylyl group, a benzyl group, and a cinnamoyl group.

<Preferred Example of Hydrocarbon Group>

Among exemplified hydrocarbon groups described above, the following hydrocarbon groups of $R^1$ to $R^3$ are preferred from the viewpoint of solubility in a nonaqueous electrolytic solution and the ease of industrial availability: a methyl group, an ethyl group, a n-propyl group, an isopropyl group, a n-butyl group, an isobutyl group, a tert-butyl group, a cyclopentyl group, a cyclohexyl group, a phenyl group, a 2-toluoyl group, a 3-toluoyl group, a 4-toluoyl group, a vinyl group, an allyl group, an ethynyl group, a propargyl group, a benzyl group, and the like. Particularly preferred hydrocarbon groups are as follows: a methyl group, an ethyl group, a n-propyl group, a n-butyl group, a cyclohexyl group, and a phenyl group.

A hydrocarbon group of each of $R^1$ to $R^3$ shown in general formula (1) described above may have a structure in which hydrogen atoms bonded to carbon atoms are partially or completely substituted with halogen atoms.

Examples of the halogen atom include a fluorine atom, a chlorine atom, a bromine atom, and an iodine atom. A fluorine atom, a chlorine atom, and a bromine atom are preferred. A fluorine atom and a chlorine atom are more preferred from the viewpoints of chemical stability and electrochemical stability.

In the case of a halogen atom-substituted hydrocarbon group of each of $R^1$ to $R^3$, the number of halogen atoms is not particularly limited. Hydrogen atoms in the hydrocarbon group may be partially substituted with a halogen atom. Furthermore, all hydrogen atoms in the hydrocarbon group may be substituted with halogen atoms. In the case where a hydrocarbon group of each of $R^1$ to $R^3$ has a plurality of halogen atoms, these halogen atoms may be the same or different.

Specific examples of a halogen atom-substituted hydrocarbon group suitable as a hydrocarbon group of each of $R^1$ to $R^3$ are described below.

<Specific Example of Fluorine Atom-Substituted Chain Saturated Hydrocarbon Group>

Examples thereof include a fluoromethyl group, difluoromethyl group, a trifluoromethyl group, a 1-fluoroethyl group, a 2-fluoroethyl group, a 1,1-difluoroethyl group, a 1,2-difluoroethyl group, a 2,2-difluoroethyl group, a 2,2,2-trifluoroethyl group, a perfluoroethyl group, a 1-fluoro-n-propyl group, a 2-fluoro-n-propyl group, a 3-fluoro-n-propyl group, a 1,1-difluoro-n-propyl group, a 1,2-difluoro-n-propyl group, a 1,3-difluoro-n-propyl group, a 2,2-difluoro-n-propyl group, a 2,3-difluoro-n-propyl group, a 3,3-difluoro-n-propyl group, a 3,3,3-trifluoro-n-propyl group, a 2,2,3,3,3-pentafluoro-n-propyl group, a perfluoro-n-propyl group, a 1-fluoroisopropyl group, a 2-fluoroisopropyl group, a 1,2-difluoroisopropyl group, a 2,2-difluoroisopropyl group, a 2,2'-difluoroisopropyl group, 2,2,2,2',2',2'-hexafluoroisopropyl group, a 1-fluoro-n-butyl group, a 2-fluoro-n-butyl group, a 3-fluoro-n-butyl group, a 4-fluoro-n-butyl group, a 4,4,4-trifluoro-n-butyl group, a perfluoro-n-butyl group, a 2-fluoro-tert-butyl group, and a perfluoro-tert-butyl group.

<Specific Example of Fluorine Atom-Substituted Cyclic Saturated Hydrocarbon Group>

Examples thereof include a 1-fluorocyclopropyl group, a 2-fluorocyclopropyl group, a perfluorocyclopropyl group, a 1-fluorocyclopentyl group, a 2-fluorocyclopentyl group, a 3-fluorocyclopentyl group, a perfluorocyclopentyl group, a 1-fluorocyclohexyl group, a 2-fluorocyclohexyl group, a 3-fluorocyclohexyl group, a 4-fluorocyclohexyl group, and a perfluorocyclohexyl group.

<Specific Example of Fluorine Atom-Substituted Unsaturated Hydrocarbon Group>

Examples thereof include a 2-fluorophenyl group, a 3-fluorophenyl group, a 4-fluorophenyl group, a 2,3-difluorophenyl group, a 2,4-difluorophenyl group, a 3,5-difluorophenyl group, a 2,4,6-trifluorophenyl group, a perfluorophenyl group, a 3-fluoro-2-methylphenyl group, a 4-fluoro-2-methylphenyl group, a 5-fluoro-2-methylphenyl group, a 6-fluoro-2-methylphenyl group, a 2-fluoro-3-methylphenyl group, a 4-fluoro-3-methylphenyl group, a 5-fluoro-3-methylphenyl group, a 6-fluoro-3-methylphenyl group, a 2-fluoro-4-methylphenyl group, a 3-fluoro-4-methylphenyl group, a perfluorotoluoyl group, a perfluoronaphthyl group, a 1-fluorovinyl group, a 2-fluorovinyl group, a 1,2-difluorovinyl group, a 2,2-difluorovinyl group, a perfluorovinyl group, a 1-fluoroallyl group, a 2-fluoroallyl group, a 3-fluoroallyl group, a perfluoroallyl group, a (2-fluorophenyl)methyl group, a (3-fluorophenyl)methyl group, a (4-fluorophenyl)methyl group, and a (perfluorophenyl)methyl group.

<Specific Example of Chlorine Atom-Substituted Chain Saturated Hydrocarbon Group>

Examples thereof include a chloromethyl group, a dichloromethyl group, a trichloromethyl group, a 1-chloroethyl group, a 2-chloroethyl group, a 1,1-dichloroethyl group, a 1,2-dichloroethyl group, a 2,2-dichloroethyl group, a 2,2,2-trichloroethyl group, a perchloroethyl group, a 1-chloro-n-propyl group, a 2-chloro-n-propyl group, a 3-chloro-n-propyl group, a 1,1-dichloro-n-propyl group, a 1,2-dichloro-n-propyl group, a 1,3-dichloro-n-propyl group, a 2,2-dichloro-n-propyl group, a 2,3-dichloro-n-propyl group, a 3,3-dichloro-n-propyl group, a 3,3,3-trichloro-n-propyl group, a 2,2,3,3,3-pentachloro-n-propyl group, a perchloro-n-propyl group, a 1-chloroisopropyl group, a 2-chloroisopropyl group, a 1,2-dichloroisopropyl group, a 2,2-dichloroisopropyl group, a 2,2'-dichloroisopropyl group, a 2,2,2,2',2',2'-hexachloroisopropyl group, a 1-chloro-n-butyl group, a 2-chloro-n-butyl group, a 3-chloro-n-butyl group, a 4-chloro-n-butyl group, a 4,4,4-trichloro-n-butyl group, a perchloro-n-butyl group, a 2-chloro-tert-butyl group, and a perchloro-tert-butyl group.

<Specific Example of Chlorine Atom-Substituted Cyclic Saturated Hydrocarbon Group>

Examples thereof include a 1-chlorocyclopropyl group, a 2-chlorocyclopropyl group, a perchlorocyclopropyl group, a 1-chlorocyclopentyl group, a 2-chlorocyclopentyl group, a 3-chlorocyclopentyl group, a perchlorocyclopentyl group, a 1-chlorocyclohexyl group, a 2-chlorocyclohexyl group, a 3-chlorocyclohexyl group, a 4-chlorocyclohexyl group, and a perchlorocyclohexyl group.

<Specific Example of Chlorine Atom-Substituted Unsaturated Hydrocarbon Group>

Examples thereof include a 2-chlorophenyl group, a 3-chlorophenyl group, a 4-chlorophenyl group, a 2,3-dichlorophenyl group, a 2,4-dichlorophenyl group, a 3,5-dichlorophenyl group, a 2,4,6-trichlorophenyl group, a perchlorophenyl group, a 3-chloro-2-methylphenyl group, a 4-chloro-2-methylphenyl group, a 5-chloro-2-methylphenyl group, a 6-chloro-2-methylphenyl group, a 2-chloro-3-methylphenyl group, a 4-chloro-3-methylphenyl group, a 5-chloro-3-methylphenyl group, a 6-chloro-3-methylphenyl group, a 2-chloro-4-methylphenyl group, a 3-chloro-4-methylphenyl group, a perchlorotoluoyl group, a perchloronaphthyl group, a 1-chlorovinyl group, a 2-chlorovinyl group, a 1,2-dichlorovinyl group, a 2,2-dichlorovinyl group, a perchlorovinyl group, a 1-chloroallyl group, a 2-chloroallyl group, a 3-chloroallyl group, a perchloroallyl group, a (2-chlorophenyl)methyl group, a (3-chlorophenyl)methyl group, a (4-chlorophenyl)methyl group, and a (perchlorophenyl)methyl group.

<Preferred Example of Halogen Atom-Substituted Hydrocarbon Group>

Among these, a fluorine atom-substituted hydrocarbon group is preferred from the viewpoints of chemical and electrochemical stability and the ease of industrial availability. Specific examples thereof are described below.

Examples thereof include a fluoromethyl group, a difluoromethyl group, a trifluoromethyl group, a 1-fluoroethyl group, a 2-fluoroethyl group, a 2,2,2-trifluoroethyl group, a perfluoroethyl group, a 3,3,3-trifluoro-n-propyl group, a 2,2,3,3,3-pentafluoro-n-propyl group, a perfluoro-n-propyl group, a 2,2,2,2',2',2'-hexafluoroisopropyl group, a perfluoro-n-butyl group, a 2-fluoro-tert-butyl group, a perfluoro-tert-butyl group, a 2-fluorocyclohexyl group, a 3-fluorocyclohexyl group, a 4-fluorocyclohexyl group, a perfluorocyclohexyl group, a 2-fluorophenyl group, a 3-fluorophenyl group, a 4-fluorophenyl group, a 2,3-difluorophenyl group, a 2,4-difluorophenyl group, a 3,5-difluorophenyl group, a 2,4,6-trifluorophenyl group, a perfluorophenyl group, a 1-fluorovinyl group, a 2-fluorovinyl group, a perfluorovinyl group, a (2-fluorophenyl)methyl group, a (3-fluorophenyl)methyl group, a (4-fluorophenyl)methyl group, and a (perfluorophenyl)methyl group.

Specific examples of a compound which is represented by general formula (1) and in which at least one of $R^1$ to $R^3$ represents any of the foregoing hydrocarbon group are described below.

<Specific Examples of Compound Having Chain Saturated Hydrocarbon Group>

Examples thereof include methacrylonitrile, 2-ethyl-acrylonitrile, crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile.

<Specific Examples of Compound Having Cyclic Saturated Hydrocarbon Group>

Examples thereof include 1-cyano-1-cyclopentene and 1-cyano-1-cyclohexene.

<Specific Examples of Compound Having Unsaturated Hydrocarbon Group>

Examples thereof include 2-vinylacrylonitrile, geranylnitrile and cinnamonitrile.

<Specific Examples of Compound Having Chain Saturated Hydrocarbon Group Substituted with Fluorine Atom>

Examples thereof include 2-fluoroacrylonitrile, 3-fluoroacrylonitrile, 3-fluoro-methacrylonitrile, 2-(fluoromethyl)acrylonitrile, 2-(difluoromethyl)acrylonitrile, 2-(trifluoromethyl)acrylonitrile, 3-fluorocrotononitrile, 4-fluorocrotononitrile, 4,4-difluorocrotononitrile, 4,4,4-trifluorocrotononitrile, 3-(fluoromethyl)crotononitrile, 4-fluoro-3-(fluoromethyl)-2-butenenitrile, 4-fluoro-2-pentenenitrile, and 5-fluoro-2-pentenenitrile.

<Specific Examples of Compound Having Cyclic Saturated Hydrocarbon Group Substituted with Fluorine Atom>

Examples thereof include 3-fluoro-1-cyano-1-cyclopentene, 4-fluoro-1-cyano-1-cyclopentene, 5-fluoro-1-cyano-1-cyclopentene, 3-fluoro-1-cyano-1-cyclohexene, 4-fluoro-1-cyano-1-cyclohexene, 5-fluoro-1-cyano-1-cyclohexene, and 6-fluoro-1-cyano-1-cyclohexene.

<Specific Examples of Compound Having Unsaturated Hydrocarbon Group Substituted with Fluorine Atom>

Examples thereof include 2-(1-fluorovinyl)acrylonitrile, 2-(2-fluorovinyl)acrylonitrile, 2-(1-fluoroallyl)acrylonitrile, 2-(2-fluoroallyl)acrylonitrile, 2-(3-fluoroallyl)acrylonitrile, 2-(2-fluorophenyl)acrylonitrile, 2-(3-fluorophenyl)acrylonitrile, 2-(4-fluorophenyl)acrylonitrile, 3-(2-fluorophenyl)propenenitrile, 3-(3-fluorophenyl)propenenitrile, 3-(4-fluorophenyl)propenenitrile, and 3-fluorogeranylnitrile.

<Preferred Example of Unsaturated Nitrile Compound (1)>

Among these nitrile compounds exemplified above, the following compounds are particularly preferred as unsaturated nitrile compound (1) according to the present invention from the viewpoint of easy synthesis or from the industrial standpoint.

Examples thereof include acrylonitrile, methacrylonitrile, crotononitrile, 3-methylcrotononitrile, 2-methyl-2-butenenitrile, 2-pentenenitrile, 2-methyl-2-pentenenitrile, 1-cyano-1-cyclopentene, 1-cyano-1-cyclohexene, geranylnitrile, cinnamonitrile, 2-furonitrile, fumaronitrile, and tetracyanoethylene.

In unsaturated nitrile compound (1) according to the present invention shown in general formula (1), preferably, $R^1$ and $R^2$ do not simultaneously represent hydrogen atoms, and either or both of $R^1$ and $R^2$ each independently represent a cyano group or an optionally halogen atom-substituted hydrocarbon group having 1 to 10 carbon atoms. Examples of unsaturated nitrile compound (1) include preferred compounds for unsaturated nitrile compound (2) represented by general formula (2) described below.

The molecular weight of unsaturated nitrile compound (1) is not limited. Unsaturated nitrile compound (1) may have any molecular weight unless the effect of the present invention is significantly impaired. Unsaturated nitrile compound (1) has a molecular weight of usually 40 or more and preferably 50 or more. The upper limit of the molecular weight is not particularly limited. For practical purposes, the upper limit is usually 400 or less and preferably 300 or less because an excessively high molecular weight is liable to cause an increase in the viscosity of an electrolytic solution.

A method for producing unsaturated nitrile compound (1) is not particularly limited. Any of known methods can be selected to produce it.

A single type of unsaturated nitrile compound (1) may be used alone. Alternatively, two or more types of unsaturated nitrile compounds (1) may be used in combination as a mixture.

The nonaqueous electrolytic solution according to the first aspect has an unsaturated nitrile compound (1) content of usually 0.001% by weight or more, preferably 0.01% by weight or more, and more preferably 0.1% by weight, and usually 10% by weight or less, preferably 5% by weight, and more preferably 2% by weight with respect to the total weight of the nonaqueous electrolytic solution. An unsaturated nitrile compound (1) content of less than the lower limit described above can result in insufficient suppression of the decomposition of other components, constituting the nonaqueous electrolytic solution, on a surface of the electrode, so that the effect of the present invention may not be readily provided. Meanwhile, an unsaturated nitrile compound (1) content exceeding the upper limit described above can result in excessive progress of the reaction on the electrode surface, thereby deteriorating various battery characteristics.

Furthermore, two or more types of unsaturated nitrile compounds (1) may be used in combination. Also in the case where the two or more types of unsaturated nitrile compounds are used in combination, the total content of the two or more types of unsaturated nitrile compounds (1) is the same as above.

{Compound Having 2 to 4 Cyano Groups in Its Structural Formula}

The number of cyano groups in the compound having 2 to 4 cyano groups in its structural formula is usually 2 or more and usually 4 or less, preferably 3 or less, and particularly preferably 2.

Furthermore, the compound having 2 to 4 cyano groups in its structural formula is preferably a compound represented by general formula (3) (hereinafter, also referred to as "dicyano compound (3)").

$$NC-(X)_n-CN \qquad (3)$$

In general formula (3), X represents $CH_2$, CFH, $CF_2$, CHR, CFR, $CR_2$, C=O, O, S, NH, or NR. R represents an optionally substituted hydrocarbon group having 5 or less carbon atoms or a cyano group. n represents an integer of 1 or more. n X's may be the same or different.

In general formula (3), n represents an integer of 1 or more. Preferably, n represents an integer of 2 or more. More preferably, n represents an integer of 5 or more. An excessively small n results in an excessively small distance between two cyano groups in general formula (3), so that both cyano groups cannot sufficiently affect a transition metal in the positive-electrode active material. The upper limit of n is not particularly limited. The upper limit is usually 12 or less and particularly preferably 8 or less from the viewpoint of sufficiently ensuring the proportion of the cyano groups, serving as an agent, per weight of dicyano compound (3) incorporated in the nonaqueous electrolytic solution.

X represents one or more groups selected from the group consisting of $CH_2$, CFH, $CF_2$, CHR, CFR, $CR_2$, C=O, O, S, NH, and NR, in which the one or more groups may be the same or different (wherein R represents an optionally substituted hydrocarbon group having 5 or less carbon atoms or a cyano group). Among these, from the viewpoint of stability in a battery, preferably, X represents one or more groups selected from the group consisting of $CH_2$, CFH, $CF_2$, CHR, CFR, $CR_2$, O, S, and NR, wherein the one or more groups may be the same or different. Particularly preferably, X represents one or more groups selected from the group consisting of $CH_2$, CFH, $CF_2$, CHR, CFR, $CR_2$, and O, wherein the one or more groups may be the same or different. Most preferably, X represents one or more groups selected from the group consisting of $CH_2$, CFH, $CF_2$, CHR, CFR, and $CR_2$, wherein the one or more groups may be the same or different.

R in each of CHR, CFR, and $CR_2$ of X represents a cyano group or a hydrocarbon group having 5 or less carbon atoms and optionally having a substituent such as a cyano group. Specific examples of R include the following hydrocarbon groups, hydrocarbon groups having substituents, and a cyano group.

<Hydrocarbon Group>

Examples thereof include a methyl group, an ethyl group, a propyl group, an isopropyl group, a butyl group, a 1-methylpropyl group, a 2-methylbutyl group, a tert-butyl group, a pentyl group, a 1-methylbutyl group, a 2-methylbutyl group, a 3-methylbutyl group, and a neopentyl group.

<Hydrocarbon Group Having Substituent>

Examples thereof include a fluoromethyl group, a difluoromethyl group, a trifluoromethyl group, a 2-fluoroethyl group, a 2,2-difluoroethyl group, a 2,2,2-trifluoroethyl group, a 1,1,2,2,2-pentafluoroethyl group, a methoxymethyl group, an ethoxymethyl group, a 2-methoxyethyl group, a cyanomethyl group, a 2-cyanoethyl group, a 3-cyanopropyl group, a methoxycarbonylmethyl group, an ethoxycarbonylmethyl group, and a 2-methoxycarbonylethyl group.

R may be a cyano group.

In the case where X represents $CR_2$, two R's may be the same or different.

Specific examples of dicyano compound (3) are described below.

<Specific Examples of Dicyano Compound (3)>

Examples thereof include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, trimethylsuccinonitrile, tetramethylsuccinonitrile, 3,3'-oxydipropionitrile, 3,3'-thiodipropionitrile, 3,3'-(ethylenedioxy)dipropionitrile, 3,3'-(ethylenedithio)dipropionitrile, 1,2,3-propanetricarbonitrile, 1,3,5-pentanetricarbonitrile, 1,2,3-tris(2-cyanoethoxy)propane, and tris(2-cyanoethyl)amine.

Among these specific examples described above, the following compounds are preferred because the effect of the present invention is readily provided.

<Preferred Examples of Dicyano Compound (3)>

Examples thereof include succinonitrile, glutaronitrile, adiponitrile, pimelonitrile, suberonitrile, azelanitrile, sebaconitrile, 3,3'-oxydipropionitrile, 3,3'-thiodipropionitrile, 1,2,3-propanetricarbonitrile, and 1,3,5-pentanetricarbonitrile.

Among these preferred specific examples described above, in particular, pimelonitrile, suberonitrile, azelanitrile, sebaconitrile, 3,3'-oxydipropionitrile, and 1,3,5-pentanetricarbonitrile, in which n represents 5 or more in general formula (3), are more preferred.

A method for producing dicyano compound (3) is not particularly limited. Any of known methods can be selected to produce it.

Compounds having 2 to 4 cyano groups in their structural formulae, e.g., dicyano compound (3), may be contained alone in the nonaqueous electrolytic solution of the present invention. Alternatively, any two or more types of compounds may be combined in any proportion.

Furthermore, the proportion of a compound having 2 to 4 cyano groups in its structural formula, e.g., dicyano compound (3), in a nonaqueous electrolytic solution according to the first aspect is not particularly limited. Any proportion thereof may be used unless the effect of the present invention is significantly impaired. The nonaqueous electrolytic solution has a concentration of the compound of usually 0.001% by weight or more, preferably 0.01% by weight or more, and more preferably 0.1% by weight, and usually 10% by weight or less, preferably 5% by weight or less, and more preferably 2% by weight or less. At a concentration of the compound of less than the lower limit of this range, in the case of using this nonaqueous electrolytic solution for a secondary battery, the nonaqueous electrolyte secondary battery does not have sufficiently improved characteristics, in some cases. A concentration of the compound exceeding the upper limit of this range can increase reactivity in the nonaqueous electrolytic solution to deteriorate the battery characteristics of the nonaqueous electrolyte secondary battery.

{Halogen Atom-Containing Cyclic Carbonate}

The nonaqueous electrolytic solution according to the first aspect may further contain a halogen atom-containing cyclic carbonate.

An example of the halogen atom-containing cyclic carbonate is a cyclic carbonate in which a halogen atom is bonded to either or both of the main skeleton and a hydrocarbon group linked to the cyclic carbonate.

Specific examples of the cyclic carbonate include five-membered cyclic carbonates, six-membered cyclic carbonates, and seven-membered cyclic carbonates.

Examples of the hydrocarbon group linked to the cyclic carbonate include hydrocarbon groups exemplified as the hydrocarbon groups of $R^1$ to $R^3$ of unsaturated nitrile dicyano compound (3) described above.

Specific examples of the halogen atom in the halogen atom-containing cyclic carbonate include a fluorine atom, a chlorine atom, a bromine atom, and an iodine atom. Among these, a fluorine atom and a chlorine atom are preferred. A fluorine atom is particularly preferred. The number of halogen atoms of the halogen atom-containing cyclic carbonate is not particularly limited as long as the number of halogen atoms is 1 or more. The number of halogen atoms is usually 6 or less and preferably 4 or less. In the case where the halogen atom-containing cyclic carbonate has a plurality of halogen atoms, they may be the same or different.

SPECIFIC EXAMPLES

Specific examples of the halogen atom-containing cyclic carbonate include fluoroethylene carbonate, chloroethylene carbonate, 4,4-difluoroethylene carbonate, 4,5-difluoroethylene carbonate, 4,4-dichloroethylene carbonate, 4,5-dichloroethylene carbonate, 4-fluoro-4-methylethylene carbonate, 4-chloro-4-methylethylene carbonate, 4,5-difluoro-4-methylethylene carbonate, 4,5-dichloro-4-methylethylene carbonate, 4-fluoro-5-methylethylene carbonate, 4-chloro-5-methylethylene carbonate, 4,4-difluoro-5-methylethylene carbonate, 4,4-dichloro-5-methylethylene carbonate, 4-(fluoromethyl)-ethylene carbonate, 4-(chloromethyl)-ethylene carbonate, 4-(difluoromethyl)-ethylene carbonate, 4-(dichloromethyl)-ethylene carbonate, 4-(trifluoromethyl)-ethylene carbonate, 4-(trichloromethyl)-ethylene carbonate, 4-(fluoromethyl)-4-fluoroethylene carbonate, 4-(chloromethyl)-4-chloroethylene carbonate, 4-(fluoromethyl)-5-fluoroethylene carbonate, 4-(chloromethyl)-5-chloroethylene carbonate, 4-fluoro-4,5-dimethylethylene carbonate, 4-chloro-4,5-dimethylethylene carbonate, 4,5-difluoro-4,5- dimethylethylene carbonate, 4,5-dichloro-4,5-dimethylethylene carbonate, 4,4-difluoro-5,5-dimethylethylene carbonate, 4,4-dichloro-5,5-dimethylethylene carbonate, and fluorotrifluoromethylethylene carbonate.

PREFERRED EXAMPLE

Among these halogen atom-containing cyclic carbonates, fluorine atom-containing cyclic carbonate derivatives are preferred. In particular, fluoroethylene carbonate, 4-(fluoromethyl)-ethylene carbonate, 4-(trifluoromethyl)-ethylene carbonate, 4,4-difluoroethylene carbonate, 4,5-difluoroethylene carbonate, 4-(fluoromethyl)-4-fluoroethylene carbonate, and fluorotrifluoromethylethylene carbonate are more preferably used because they form interface-protecting films.

A method for producing the halogen atom-containing cyclic carbonate is not particularly limited. Any known method can be selected to produce it.

A single type of halogen atom-containing cyclic carbonate may be used alone. Alternatively, two or more types of halogen atom-containing cyclic carbonates may be used in combination as a mixture.

The halogen atom-containing cyclic carbonate provides different functions in response to its concentration in an electrolytic solution. That is, in the case where the halogen atom-containing cyclic carbonate is used as an additive at a concentration of 0.001% by weight to 10% by weight with respect to the total weight of a nonaqueous electrolytic solution, the halogen atom-containing cyclic carbonate is decomposed on a surface of a negative electrode to form a negative-electrode-surface-protecting film in the same way as in a carbon-carbon unsaturated cyclic carbonate described below. Meanwhile, in the case where the halogen atom-containing cyclic carbonate is used as a solvent at a concentration of 10% by weight to 70% by weight, the halogen atom-containing cyclic carbonate has not only the function as the additive described above but also the function of improving the oxidation resistance of the nonaqueous electrolytic solution.

In the case where the halogen atom-containing cyclic carbonate is used as an additive, the concentration of the halogen atom-containing cyclic carbonate is usually 0.001% by weight or more and preferably 0.01% by weight or more and usually 10% by weight or less, preferably 8% by weight or less, and more preferably 5% by weight or less with respect to the total weight of a nonaqueous electrolytic solution. At an excessively low proportion thereof, in some cases, the film is not sufficiently formed by reductive decomposition on the negative electrode, so that battery characteristics may not be sufficiently provided.

In the case where the halogen atom-containing cyclic carbonate is used as a solvent, the concentration of the halogen atom-containing cyclic carbonate is usually 10% by weight or more, preferably 12% by weight or more, more preferably 15% by weight or more, still more preferably 20% by weight or more, and usually 70% by weight or less, preferably 60% by weight or less, and more preferably 50% by weight or less with respect to the total weight of a nonaqueous electrolytic solution. A concentration of less than the lower limit described above can result in insufficient suppression of the oxidative decomposition of other components, constituting a nonaqueous electrolytic solution, on a surface of a positive electrode, so that the effect of the present invention may not be provided. Meanwhile, a concentration exceeding the upper limit described above can result in an increase in the viscosity of an electrolytic solution, thereby deteriorating various battery characteristics.

The halogen atom-containing cyclic carbonate can be used as a mixture obtained by mixing the halogen atom-containing cyclic carbonate and a nonaqueous solvent described below in a desired ratio. Examples of a combination of components constituting the mixture are described below.

That is, examples thereof include a halogen atom-containing cyclic carbonate and a halogen atom-free cyclic carbonate; a halogen atom-containing cyclic carbonate and a chain carbonate; a halogen atom-containing cyclic carbonate and a cyclic ether; a halogen atom-containing cyclic carbonate and a chain ether; a halogen atom-containing cyclic carbonate and a phosphorus-containing organic solvent; a halogen atom-containing cyclic carbonate, a halogen atom-free cyclic carbonate, and a chain carbonate; a halogen atom-containing cyclic carbonate, a halogen atom-free cyclic carbonate, and a cyclic carbonate; a halogen atom-containing cyclic carbonate, a halogen atom-free cyclic carbonate, a cyclic carbonate, and a chain carbonate; a halogen atom-containing cyclic carbonate, a halogen atom-free cyclic carbonate, a cyclic ether, and a chain carbonate; and a halogen atom-containing cyclic carbonate, a halogen atom-free cyclic carbonate, a phosphorus-containing organic solvent, and a chain carbonate.

{Cyclic Carbonate Having Carbon-Carbon Unsaturated Bond}

The nonaqueous electrolytic solution according to the first aspect may further contain a cyclic carbonate having a carbon-carbon unsaturated bond.

Examples of the cyclic carbonate having a carbon-carbon unsaturated bond include vinylene carbonate-based compounds, vinyl ethylene carbonate-based compounds, and methylene ethylene carbonate-based compounds.

Examples of methylene ethylene carbonate-based compounds include methylene ethylene carbonate, 4,4-dimethyl-5-methylene ethylene carbonate, and 4,4-diethyl-5-methylene ethylene carbonate.

PREFERRED EXAMPLE

Preferred examples of the cyclic carbonate having a carbon-carbon unsaturated bond include vinylene carbonate, methylvinylene carbonate, ethylvinylene carbonate, 4,5-dimethylvinylene carbonate, 4,5-diethylvinylene carbonate, fluorovinylene carbonate, trifluoromethylvinylene carbonate, 4-vinylethylene carbonate, 4-methyl-4-vinylethylene carbonate, 4-ethyl-4-vinylethylene carbonate, 4-n-propyl-4-vinylethylene carbonate, 5-methyl-4-vinylethylene carbonate, 4,4-divinylethylene carbonate, and 4,5-divinylethylene carbonate.

Among these cyclic carbonates having carbon-carbon unsaturated bonds, vinylene carbonate, 4-methylvinylene carbonate, 4,5-dimethylvinylene carbonate, 4-vinylethylene carbonate, and 5-methyl-4-vinylethylene carbonate are preferred. Vinylene carbonate and 4-vinylethylene carbonate are more preferred.

The cyclic carbonates having carbon-carbon unsaturated bonds may be used separately or in combination as a mixture.

A cyclic carbonate having both of an unsaturated bond and a halogen atom (appropriately referred to as a "halogenated unsaturated cyclic carbonate") is not particularly limited. Any halogenated unsaturated cyclic carbonate may be used unless the effect of the present invention is significantly impaired.

Examples of the halogenated unsaturated cyclic carbonate include vinylene carbonate derivatives; and ethylene carbonate derivatives substituted with substituent groups each having an aromatic ring or a carbon-carbon unsaturated bond.

Specific examples of vinylene carbonate derivatives include fluorovinylene carbonate, 4-fluoro-5-methylvinylene carbonate, 4-fluoro-5-phenylvinylene carbonate, chlorovinylene carbonate, 4-chloro-5-methylvinylene carbonate, and 4-chloro-5-phenylvinylene carbonate.

Specific examples of the ethylene carbonate derivatives substituted with substituent groups each having an aromatic ring or a carbon-carbon unsaturated bond include 4-fluoro-4-vinylethylene carbonate, 4-fluoro-5-vinylethylene carbonate, 4,4-difluoro-5-vinylethylene carbonate, 4,5-difluoro-4-vinylethylene carbonate, 4-chloro-5-vinylethylene carbonate, 4,4-dichloro-5-vinylethylene carbonate, 4,5-dichloro-4-vinylethylene carbonate, 4-fluoro-4,5-divinylethylene carbonate, 4,5-difluoro-4,5-divinylethylene carbonate, 4-chloro-4,5-divinylethylene carbonate, 4,5-dichloro-4,5-divinylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate, 4-chloro-4-phenylethylene carbonate, 4-chloro-5-phenylethylene carbonate, 4,4-dichloro-5-phenylethylene carbonate, 4,5-dichloro-4-phenylethylene carbonate, 4,5-difluoro-4,5-diphenylethylene carbonate, and 4,5-dichloro-4,5-diphenylethylene carbonate.

With respect to the foregoing halogen atom-containing cyclic carbonate and the foregoing cyclic carbonate having a carbon-carbon unsaturated bond, a single type or two or more types of one of the cyclic carbonates may be used. Alternatively, a single type or two or more types of each of the cyclic carbonates may be used in combination. In the case where one of the halogen atom-containing cyclic carbonate and the cyclic carbonate having a carbon-carbon unsaturated bond is used, the halogen atom-containing cyclic carbonate is preferably contained from the viewpoint of improving the oxidation resistance of a nonaqueous electrolytic solution to suppress a deterioration in battery characteristics. Furthermore, in the case where any two or more types of cyclic carbonates are combined in any proportion, a film formed on a surface of a negative electrode has complex characteristics, which is more preferred.

In the case where the nonaqueous electrolytic solution according to the first aspect contains a cyclic carbonate having a carbon-carbon unsaturated bond, the proportion of the cyclic carbonate having a carbon-carbon unsaturated bond is usually 0.001% by weight or more and preferably 0.01% by weight, and usually 10% by weight or less and preferably 5% by weight or less with respect to the total weight of the nonaqueous electrolytic solution. At an excessively low proportion thereof, in some cases, a film is not sufficiently formed by reductive decomposition on the negative electrode, so that battery characteristics may not be sufficiently provided. Meanwhile, an excessively high proportion thereof may lead to gas generation due to the oxidative decomposition of an excess of the carbonate and a deterioration in battery characteristics.

In the case where the nonaqueous electrolytic solution according to the first aspect contains both of the halogen atom-containing cyclic carbonate and the cyclic carbonate having a carbon-carbon unsaturated bond, the proportion of the halogen atom-containing cyclic carbonate is usually 0.001% by weight or more and preferably 0.01% by weight or more and usually 0.1% by weight or less and preferably 70% by weight or less with respect to the total weight of the nonaqueous electrolytic solution, the proportion of the cyclic carbonate having a carbon-carbon unsaturated bond is usually 0.001% by weight or more and preferably 0.01% by weight or more and usually 10% by weight or less and preferably 5% by weight or less with respect to the total weight of the nonaqueous electrolytic solution, and the total proportion of these components is usually 0.002% by weight or more and preferably 0.01% by weight or more and usually 80% by weight or less and preferably 70% by weight or less with respect to the total weight of the nonaqueous electrolytic solution.

{Monofluorophosphate and Difluorophosphate}

The nonaqueous electrolytic solution according to the first aspect may further contain a monofluorophosphate and/or a difluorophosphate.

The type of monofluorophosphate and/or difluorophosphate used in the present invention is not particularly limited as long as it is constituted by a cation and one or more monofluorophosphate ions and/or one or more difluorophosphate ions. The type monofluorophosphate and/or difluorophosphate needs to be selected in consideration of the fact that an ultimately produced nonaqueous electrolytic solution needs to be useful as an electrolytic solution of a nonaqueous electrolyte secondary battery.

Thus, preferably, each of the monofluorophosphate and the difluorophosphate in the present invention is a salt of one or more ions of a metal (hereinafter, also referred to as a "salt-forming metal") selected from the elements in groups 1, 2, and 13 of the periodic table or a quaternary onium ion and one or more monofluorophosphate ions or one or more difluorophosphate ions. A single type of monofluorophosphate and/or difluorophosphate may be used. Alternatively, two or more types of monofluorophosphate and/or difluorophosphate may be used in combination.

<Metal Monofluorophosphate and Metal Difluorophosphate>

In the case where the monofluorophosphate and the difluorophosphate of the present invention are a salt of a salt-forming metal ion and a monofluorophosphate ion (hereinafter, the salt being also referred to as a "metal monofluorophosphate") and a salt of a salt-forming metal ion and a difluorophosphate ion (hereinafter, the salt being also referred to as a "metal difluorophosphate"), respectively, among the salt-forming metals constituting the metal monofluorophosphate and the metal difluorophosphate, examples of the metals in group 1 of the periodic table include lithium, sodium, potassium, and cesium. Among these metals, lithium or sodium is preferred. Lithium is particularly preferred.

Specific examples of the metals in group 2 of the periodic table include magnesium, calcium, strontium, and barium. Among these metals, magnesium or calcium is preferred. Magnesium is particularly preferred.

Specific examples of the metals in group 13 of the periodic table include aluminum, gallium, indium, and thallium. Among these metals, aluminum or gallium is preferred. Aluminum is particularly preferred.

The number of atoms of the salt-forming metal present in one molecule of each of the metal monofluorophosphate and the metal difluorophosphate of the present invention is not limited. Only one atom may be present. Alternatively, two or more atoms may be present.

In the case where each of the metal monofluorophosphate and the metal difluorophosphate of the present invention contains two or more atoms of the salt-forming metal in one molecule, the types of these salt-forming metal atoms may be the same or different. Furthermore, one or two or more metal atoms other than the salt-forming metal may be contained.

Specific examples of the metal monofluorophosphate and the metal difluorophosphate include $Li_2PO_3F$, $Na_2PO_3F$, $MgPO_3F$, $CaPO_3F$, $Al_2(PO_3F)_3$, $Ga_2(PO_3F)_3$, $LiPO_2F_2$, $NaPO_2F_2$, $Mg(PO_2F_2)_2$, $Ca(PO_2F_2)_2$, $Al(PO_2F_2)_3$, and $Ga(PO_2F_2)_3$. Among these compounds, $Li_2PO_3F$, $LiPO_2F_2$, $Na_2PO_{22}F$, $Mg(PO_2F_2)_2$, and the like are preferred from the viewpoints of easy availability and battery characteristics provided.

<Monofluorophosphate Quaternary Onium Salt and Difluorophosphate Quaternary Onium Salt>

In the case where the monofluorophosphate and the difluorophosphate of the present invention are a salt of a quaternary onium ion and a monofluorophosphate ion (hereinafter, the salt being also referred to as a "monofluorophosphate quaternary onium salt") and a salt of a quaternary onium ion and a difluorophosphate ion (hereinafter, the salt being also referred to as a "difluorophosphate quaternary onium salt"), the quaternary onium ions constituting the monofluorophosphate quaternary onium salt and the difluorophosphate quaternary onium salt are usually cations. Specific examples thereof include cations represented by general formula (4) described below.

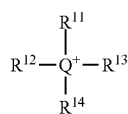

(4)

wherein in general formula (4), $R^{11}$ to $R^{14}$ each independently represent an optionally substituted hydrocarbon group; and Q represents an atom in group 15 of the periodic table.

In the general formula (4), the type of each of $R^{11}$ to $R^{14}$ is not limited. Each of $R^{11}$ to $R^{14}$ may represent an aliphatic hydrocarbon group, an aromatic hydrocarbon group, or a group in which both groups are linked. The aliphatic hydrocarbon group may have a chain structure, a cyclic structure, or a structure in which a linear moiety is linked to a cyclic moiety. In the case of the chain structure, a linear or branched structure may be used. Furthermore, each of $R^{11}$ to $R^{14}$ may be a saturated hydrocarbon group or may have an unsaturated bond.

Examples of the hydrocarbon group of each of $R^{11}$ to $R^{14}$ include alkyl groups, cycloalkyl groups, aryl groups, and aralkyl groups.

Specific examples of alkyl groups include a methyl group, an ethyl group, a 1-propyl group, a 1-methylethyl group, a 1-butyl group, a 1-methylpropyl group, a 2-methylproplyl group, and a 1,1-dimethylethyl group. Among these, a methyl group, an ethyl group, a 1-propyl group, a 1-butyl group, and the like are preferred.

Specific examples of cycloalkyl groups include a cyclopentyl group, a 2-methylcyclopentyl group, a 3-methylcyclopentyl group, a 2,2-dimethylcyclopentyl group, a 2,3-dimethylcyclopentyl group, a 2,4-dimethylcyclopentyl group, a 2,5-dimethylcyclopentyl group, a 3,3-dimethylcyclopentyl group, a 3,4-dimethylcyclopentyl group, a 2-ethylcyclopentyl group, a 3-ethylcyclopentyl group, a cyclohexyl group, a 2-methylcyclohexyl group, a 3-methylcyclohexyl group, a 4-methylcyclohexyl group, a 2,2-dimethylcyclohexyl group, a 2,3-dimethylcyclohexyl group, a 2,4-dimethylcyclohexyl group, a 2,5-dimethylcyclohexyl group, a 2,6-dimethylcyclohexyl group, a 3,4-dimethylcyclohexyl group, a 3,5-dimethylcyclohexyl group, a 2-ethylcyclohexyl group, a 3-ethylcyclohexyl group, a 4-ethylcyclohexyl group, a bicyclo[3.2.1]octan-1-yl group, and a bicyclo[3.2.1]octan-2-yl group. Among these, a cyclopentyl group, a 2-methylcyclopentyl group, a 3-methylcyclopentyl group, a cyclohexyl group, a 2-methylcyclohexyl group, a 3-methylcyclohexyl group, and a 4-methylcyclohexyl group are preferred.

Specific examples of aryl groups include a phenyl group, a 2-methylphenyl group, a 3-methylphenyl group, a 4-methylphenyl group, and a 2,3-dimethylphenyl group. Among these, a phenyl group is preferred.

Specific examples of aralkyl groups include a phenylmethyl group, a 1-phenylethyl group, a 2-phenylethyl group, a diphenylmethyl group, and a triphenylmethyl group. Among these, a phenylmethyl group and a 2-phenylethyl group are preferred.

The hydrocarbon group of each of $R^{11}$ to $R^{14}$ may be substituted with one or two or more substituents. The type of substituent is not limited unless the effect of the present invention is significantly impaired. Examples of the substituent include a halogen atom, a hydroxy group, an amino group, a nitro group, a cyano group, a carboxy group, an ether group, and an aldehyde group. In the case where each of $R^{11}$ to $R^{14}$ has two or more substituents, these substituents may be the same or different.

When any two or more hydrocarbon groups of $R^{11}$ to $R^{14}$ are compared with one another, the hydrocarbon groups may be the same or different. In the case where the hydrocarbon groups of $R^{11}$ to $R^{14}$ have substituents, the hydrocarbon groups including the substituents may be the same or different.

Furthermore, any two or more hydrocarbon groups of $R^{11}$ to $R^{14}$ or any two or more their substituents may be bonded together to form a cyclic structure.

The number of carbon atoms in the hydrocarbon group of each of $R^{11}$ to $R^{14}$ is usually 1 or more, and usually 20 or less, preferably 10 or less, and more preferably 5 or less. An excessively large hydrocarbon group having a large number of carbon atoms reduces the number of moles per weight and is liable to cause the deterioration of various effects. In the case where the hydrocarbon group of each of $R^{11}$ to $R^{14}$ has a substituent, the number of carbon atoms in the hydrocarbon group including the substituent needs to satisfy the above range.

In general formula (4), Q represents an atom that belongs to group 15 of the periodic table and preferably represents a nitrogen atom or a phosphorus atom.

Preferred examples of the quaternary onium salt represented by general formula (4) described above include aliphatic chain quaternary salts, aliphatic cyclic ammonium, aliphatic cyclic phosphonium, and nitrogen-containing heteroaromatic cations.

Among the aliphatic chain quaternary salts, tetraalkylammonium, tetraalkylphosphonium, and the like are particularly preferred.

Specific examples of tetraalkylammonium include tetramethylammonium, ethyltrimethylammonium, diethyldimethylammonium, triethylmethylammonium, tetraethylammonium, and tetra-n-butylammonium.

Specific examples of tetraalkylphosphonium include tetramethylphosphonium, ethyltrimethylphosphonium, diethyldimethylphosphonium, triethylmethylphosphonium, tetraethylphosphonium, and tetra-n-butylphosphonium.

As aliphatic cyclic ammonium, pyrrolidiniums, morpholiniums, imidazoliniums, tetrahydropyrimidiniums, piperaziniums, and piperidiniums are particularly preferred.

Specific examples of pyrrolidiniums include N,N-dimethylpyrrolidinium, N-ethyl-N-methylpyrrolidinium, and N,N-diethylpyrrolidinium.

Specific examples of morpholiniums include N,N-dimethylmorpholinium, N-ethyl-N-methylmorpholinium, and N,N-diethylmorpholinium.

Specific examples of imidazoliniums include N,N'-dimethylimidazolinium, N-ethyl-N'-methylimidazolinium, N,N'-diethylimidazolinium, and 1,2,3-trimethylimidazolinium.

Specific examples of tetrahydropyrimidiniums include N,N'-dimethyltetrahydropyrimidinium, N-ethyl-N'-methyltetrahydropyrimidinium, N,N'-diethyltetrahydropyrimidinium, and 1,2,3-trimethyltetrahydropyrimidinium.

Specific examples of piperaziniums include N,N,N',N'-tetramethylpiperazinium, N-ethyl-N,N',N'-trimethylpiperazinium, N,N-diethyl-N',N'-dimethylpiperazinium, N,N,N'-triethyl-N'-methylpiperazinium, and N,N,N',N'-tetraethylpiperazinium.

Specific examples of piperidiniums include N,N-dimethylpiperidinium, N-ethyl-N-methylpiperidinium, and N,N-diethylpiperidinium.

Among nitrogen-containing heteroaromatic cations, pyridiniums, imidazoliums, and the like are particularly preferred.

Specific examples of pyridiniums include N-methylpyridinium, N-ethylpyridinium, 1,2-dimethylpyridinium, 1,3-dimethylpyridinium, 1,4-dimethylpyridinium, and 1-ethyl-2-methylpyridinium.

Specific examples of imidazoliums include N,N'-dimethylimidazolium, N-ethyl-N'-methylimidazolium, N,N'-diethylimidazolium, and 1,2,3-trimethylimidazolium.

Salts of the quaternary onium ions and the monofluorophosphate ions and salts of the quaternary onium ions and the difluorophosphate ions exemplified above are preferred examples of the monofluorophosphate onium salt and the difluorophosphate quaternary onium salt of the present invention.

In the nonaqueous electrolytic solution according to the first aspect, a single type of monofluorophosphate or difluorophosphate may be used alone. Alternatively, any two or more types of monofluorophosphate and/or difluorophosphate may be combined in any proportion. A single type of monofluorophosphate or difluorophosphate is usually used from the viewpoint of efficiently operating a secondary battery. In the nonaqueous electrolytic solution, when the use of a mixture of two or more types of salts is preferred, a mixture of two or more types of monofluorophosphates and/or difluorophosphates may be used.

The molecular weight of each of monofluorophosphate and difluorophosphate is not limited. Each of monofluorophosphate and difluorophosphate may have any molecular weight unless the effect of the present invention is significantly impaired. Each of monofluorophosphate and difluorophosphate usually has a molecular weight of 100 or more. The upper limit of the molecular weight is not particularly limited. In view of reactivity in a reaction, the upper limit is usually 1,000 or less and preferably 500 or less, for practical purposes.

A method for producing each of the monofluorophosphate and the difluorophosphate is not particularly limited. Any of known methods can be selected to produce them.

In the case where the nonaqueous electrolytic solution according to the first aspect contains the monofluorophosphate and/or the difluorophosphate, the total proportion of the monofluorophosphate and/or the difluorophosphate is preferably 0.001% by weight or more, more preferably 0.01% by weight or more, still more preferably 0.05% by weight or more, and particularly preferably 0.1% by weight or more with respect to the total amount of the nonaqueous electrolytic solution. The upper limit of the total proportion is preferably 5% by weight or less, more preferably 4% by weight or less, and still more preferably 3% by weight or less.

At an excessively low proportion of the monofluorophosphate and/or the difluorophosphate in the nonaqueous electrolytic solution, in some cases, a film is not sufficiently formed by the decomposition of them, so that battery characteristics may not be sufficiently provided. Meanwhile, an excessively high proportion thereof may lead to a deterioration in battery characteristics due to the decomposition of an excess of thereof.

When a nonaqueous electrolyte secondary battery including a nonaqueous electrolytic solution containing the monofluorophosphate and the difluorophosphate is practically produced and then disassembled to take out the nonaqueous electrolytic solution, the proportions of the monofluorophosphate and the difluorophosphate in the resulting nonaqueous electrolytic solution are often significantly reduced. In the case where at least one type of monofluorophosphate and/or difluorophosphate can be detected, albeit at a low level, the nonaqueous electrolytic solution is assumed to have contained the monofluorophosphate and/or the difluorophosphate. Furthermore, even in the case where a nonaqueous electrolytic solution obtained by practically producing a nonaqueous electrolyte secondary battery including the nonaqueous electrolytic solution containing the monofluorophosphate and the difluorophosphate and then disassembling the battery to take out the nonaqueous electrolytic solution does not contain the monofluorophosphate and/or the difluorophosphate, the monofluorophosphate and/or the difluorophosphate is often detected on a positive electrode, a negative electrode, or a separator, which are other components of the nonaqueous electrolyte secondary battery. Thus, also in the case where at least one type of monofluorophosphate and/or difluorophosphate can be detected on at least one component selected from the positive electrode, the negative electrode, and the separator, the nonaqueous electrolytic solution is assumed to have contained the monofluorophosphate and/or the difluorophosphate.

The case where the monofluorophosphate and/or the difluorophosphate is contained in a nonaqueous electrolytic solution and at least one component selected from a positive electrode, a negative electrode, and a separator, is also the same as above.

The monofluorophosphate and/or the difluorophosphate may be incorporated in advance in a positive electrode or on a surface of a positive electrode of a nonaqueous electrolyte secondary battery produced. In this case, the incorporated monofluorophosphate and/or difluorophosphate should be partially or completely dissolved in the nonaqueous electrolytic solution to provide the function.

Means for incorporating the monofluorophosphate and/or the difluorophosphate in advance in the positive electrode or on the surface of the positive electrode is not particularly limited. Specific examples thereof include a method in which the monofluorophosphate and/or the difluorophosphate is dissolved in a slurry prepared in forming a positive electrode described below; and a method in which an already formed positive electrode is subjected to application of or impregnation with a solution of the monofluorophosphate and/or the difluorophosphate dissolved in any nonaqueous solvent, followed by drying to remove the solvent.

The monofluorophosphate and/or the difluorophosphate may be incorporated in a positive electrode or a surface of a positive electrode from a nonaqueous electrolytic solution containing at least one type of monofluorophosphate and/or difluorophosphate when a nonaqueous electrolyte secondary battery is practically produced. In the case where a nonaqueous electrolyte secondary battery is produced, a positive electrode is impregnated with a nonaqueous electrolytic solution;

hence, the monofluorophosphate and the difluorophosphate are often incorporated in the positive electrode or a surface of the positive electrode. When the monofluorophosphate and/or the difluorophosphate can be detected, albeit at a low level, from a positive electrode recovered in disassembling a battery, a nonaqueous electrolytic solution is assumed to have contained the monofluorophosphate and/or the difluorophosphate.

The monofluorophosphate and/or the difluorophosphate may be incorporated in advance in a negative electrode or a surface of a negative electrode of a nonaqueous electrolyte secondary battery produced. In this case, the incorporated monofluorophosphate and/or difluorophosphate should be partially or completely dissolved in the nonaqueous electrolytic solution to provide the function.

Means for incorporating the monofluorophosphate and/or the difluorophosphate in advance in the negative electrode or on the surface of the negative electrode is not particularly limited. Specific examples thereof include a method in which the monofluorophosphate and/or the difluorophosphate is dissolved in a slurry prepared in forming a negative electrode described below; and a method in which an already formed negative electrode is subjected to application of or impregnation with a solution of the monofluorophosphate and/or the difluorophosphate dissolved in any nonaqueous solvent, followed by drying to remove the solvent.

The monofluorophosphate and/or the difluorophosphate may be incorporated in a negative electrode or a surface of a negative electrode from a nonaqueous electrolytic solution containing at least one type of monofluorophosphate and/or difluorophosphate when a nonaqueous electrolyte secondary battery is practically produced. In the case where a nonaqueous electrolyte secondary battery is produced, a negative electrode is impregnated with a nonaqueous electrolytic solution; hence, the monofluorophosphate and/or the difluorophosphate are often incorporated in the negative electrode or a surface of the negative electrode. When the monofluorophosphate and/or the difluorophosphate can be detected, albeit at a low level, from a negative electrode recovered in disassembling a battery, a nonaqueous electrolytic solution is assumed to have contained the monofluorophosphate and/or the difluorophosphate.

The monofluorophosphate and/or the difluorophosphate may be incorporated in advance in a separator or a surface of a separator of a nonaqueous electrolyte secondary battery produced. In this case, the incorporated monofluorophosphate and/or difluorophosphate should be partially or completely dissolved in the nonaqueous electrolytic solution to provide the function.

Means for incorporating the monofluorophosphate and/or the difluorophosphate in advance in the separator or a surface of the separator is not particularly limited. Specific examples thereof include a method in which the monofluorophosphate and/or the difluorophosphate is mixed when a separator is formed; and a method in which before the formation of a nonaqueous electrolyte secondary battery, a separator is subjected to application of or impregnation with a solution of the monofluorophosphate and/or the difluorophosphate dissolved in any nonaqueous solvent, followed by drying to remove the solvent.

The monofluorophosphate and/or the difluorophosphate may be incorporated in a separator or a surface of a separator from a nonaqueous electrolytic solution containing the monofluorophosphate and/or the difluorophosphate when a nonaqueous electrolyte secondary battery is practically produced. In the case where a nonaqueous electrolyte secondary battery is produced, a separator is impregnated with a nonaqueous electrolytic solution; hence, the monofluorophosphate and/or the difluorophosphate are often incorporated in the separator or a surface of the separator. When the monofluorophosphate and/or the difluorophosphate can be detected, albeit at a low level, from a separator recovered in disassembling a battery, a nonaqueous electrolytic solution is assumed to have contained the monofluorophosphate and/or the difluorophosphate.

The incorporation of the monofluorophosphate and/or the difluorophosphate and the halogen atom-containing cyclic carbonate in a nonaqueous electrolytic solution probably permits improvement in high-temperature storage characteristics of a nonaqueous electrolyte secondary battery including the nonaqueous electrolytic solution. The detailed reason for this is not clear. The present invention is not limited to the reason. The reason for this is probably that a satisfactory protective film is formed on a surface of a negative-electrode active material by the reaction between the halogen atom-containing cyclic carbonate and the monofluorophosphate and/or the difluorophosphate in the nonaqueous electrolytic solution, thereby suppressing a side reaction and deterioration due to high-temperature storage. Furthermore, the simultaneous presence of the halogen atom-containing cyclic carbonate and the monofluorophosphate and/or the difluorophosphate in the electrolytic solution is believed to contribute to improvement in characteristics of the protective film.

In the case where the nonaqueous electrolytic solution according to the first aspect contains the halogen atom-containing cyclic carbonate and the monofluorophosphate and/or the difluorophosphate, the proportion of the monofluorophosphate and/or the difluorophosphate is usually 0.001% by weight or more and preferably 0.01% by weight or more and usually 5% by weight or less and preferably 4% by weight or less with respect to the total weight of the nonaqueous electrolytic solution, the proportion of the halogen atom-containing cyclic carbonate usually 0.001% by weight or more and preferably 0.01% by weight or more and usually 70% by weight or less with respect to the total weight of the nonaqueous electrolytic solution, and the total proportion of these components is usually 0.002% by weight or more and preferably 0.01% by weight or more and usually 75% by weight or less and preferably 70% by weight or less with respect to the total weight of the nonaqueous electrolytic solution.

{Nonaqueous Solvent}

With respect to a nonaqueous solvent the nonaqueous electrolytic solution according to the first embodiment, any known solvent for use in a nonaqueous electrolytic solution may be used. Usually, an organic solvent is used. Examples of the organic solvent include chain and cyclic carbonates, chain and cyclic carboxylates, chain and cyclic ethers, and phosphorus-containing organic solvents.

Examples of cyclic carbonate include alkylene carbonates with alkylene groups each having 2 to 4 carbon atoms, e.g., ethylene carbonate, propylene carbonate, butylene carbonate, fluoroethylene carbonate, difluoroethylene carbonate, and trifluoromethylethylene carbonate. Among these, ethylene carbonate, propylene carbonate, and fluoroethylene carbonate are preferred. In particular, propylene carbonate has high reactivity at the interface between a negative electrode and an electrolytic solution. Thus, it is difficult to use propylene carbonate for a battery, in some cases. In a nonaqueous electrolytic solution of the present invention, however, propylene carbonate can be suitably used because the reactivity at the interface between the negative electrode and the electrolytic solution.

Examples of chain carbonate include dialkyl carbonates with alkyl groups each having 1 to 4 carbon atoms, e.g., dimethyl carbonate, diethyl carbonate, di-n-propyl carbonate, ethylmethyl carbonate, methyl-n-propyl carbonate, and ethyl-n-propyl carbonate; and dialkyl carbonates with alkyl groups each having 1 to 4 carbon atoms and having hydrogen atoms partially or completely substituted with fluorine atoms, e.g., bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, fluoromethylmethyl carbonate, difluoromethylmethyl carbonate, trifluoromethylmethyl carbonate, 2-fluoroethylmethyl carbonate, 2,2-difluoroethylmethyl carbonate, 2,2,2-trifluoroethylmethyl carbonate, fluoromethylethyl carbonate, difluoromethylethyl carbonate, trifluoromethylethyl carbonate, 2-fluoroethylethyl carbonate, 2,2-difluoroethylethyl carbonate, and 2,2,2-trifluoroethylethyl carbonate. Among these, dimethyl carbonate, diethyl carbonate, and ethylmethyl carbonate are preferred.

Examples of cyclic carboxylates include γ-butyrolactone and γ-valerolactone.

Examples of chain carboxylates include methyl acetate, ethyl acetate, methyl propionate, ethyl propionate, and methyl butyrate.

Examples of cyclic ethers include tetrahydrofuran and 2-methyltetrahydrofuran.

Examples of chain ethers include diethoxyethane, dimethoxyethane, and dimethoxymethane.

Examples of phosphorus-containing organic solvents include trimethyl phosphate, triethyl phosphate, dimethylethyl phosphate, methyldiethyl phosphate, ethylenemethyl phosphate, and ethyleneethyl phosphate.

These nonaqueous solvents may be used alone. Alternatively, any two or more nonaqueous solvents may be combined in any proportions. Two or more compounds are preferably used in combination. For example, a high-dielectric solvent, e.g., cyclic carbonate or cyclic carboxylate, and a low-viscosity solvent, e.g., chain carbonate or chain carboxylate, are preferably used in combination.

In the case of using a chain carboxylate as a nonaqueous solvent, the proportion of the chain carboxylate in the nonaqueous solvent is usually 50% by weight or less, preferably 30% by weight or less, and more preferably 20% by weight or less. A proportion exceeding the upper limit may result in a reduction in conductivity. Note that the chain carboxylate is not an essential component of the nonaqueous solvent. The nonaqueous solvent may not contain the chain carboxylate.

In the case of using a cyclic carboxylate as a nonaqueous solvent, the proportion of the cyclic carboxylate in the nonaqueous solvent is usually 60% by weight or less, preferably 55% by weight or less, and more preferably 50% by weight or less. A proportion exceeding the upper limit may result in a reduction in flowability or a deterioration in output characteristics at a low temperature. Note that the cyclic carboxylate is not an essential component of the nonaqueous solvent. The nonaqueous solvent may not contain the cyclic carboxylate.

Furthermore, in the case of using a chain ether as a nonaqueous solvent, the proportion of the chain ether in the nonaqueous solvent is usually 60% by weight or less, preferably 40% by weight or less, and more preferably 30% by weight or less. A proportion exceeding the upper limit may result in a reduction in conductivity. Note that the chain ether is not an essential component of the nonaqueous solvent. The nonaqueous solvent may not contain the chain ether.

Furthermore, in the case of using a cyclic ether as a nonaqueous solvent, the proportion of the cyclic ether in the nonaqueous solvent is usually 60% by weight or less, preferably 50% by weight or less, and more preferably 40% by weight or less. A proportion exceeding the upper limit may result in a deterioration in storage characteristics. Note that the cyclic ether is not an essential component of the nonaqueous solvent. The nonaqueous solvent may not contain the cyclic ether.

A preferred example of the nonaqueous solvent is a combination of a cyclic carbonate and a chain carbonate, the carbonates serving as main components. In particular, the total proportion of the cyclic carbonate and the chain carbonate in the nonaqueous solvent is usually 85% by weight or more, preferably 90% by weight or more, and more preferably 95% by weight or more, and the volume ratio of the cyclic carbonate to the chain carbonate is 5:95 or more, preferably 10:90 or more, and more preferably 15:85 or more, and usually 45:55 or less and preferably 40:60 or less. The use of a nonaqueous electrolytic solution containing a lithium salt and an additive characteristic of the present invention, in particular, unsaturated nitrile compound (1) or unsaturated nitrile compound (2) described below and/or the compound having 2 to 4 cyano groups in its structural formula, in this mixed solvents achieves a good balance among cycle characteristics, large-current discharge characteristics, and the suppression of gas generation and is thus preferred.

Examples of a preferred combination of the cyclic carbonate and the chain carbonate include combinations of ethylene carbonate and dialkyl carbonates. Specific examples of the combination include ethylene carbonate and dimethyl carbonate; ethylene carbonate and diethyl carbonate; ethylene carbonate and ethylmethyl carbonate; ethylene carbonate, dimethyl carbonate, and diethyl carbonate; ethylene carbonate, dimethyl carbonate, and ethylmethyl carbonate; ethylene carbonate, diethyl carbonate, and ethylmethyl carbonate; and ethylene carbonate, dimethyl carbonate, diethyl carbonate, and ethylmethyl carbonate.

Combinations of propylene carbonate, ethylene carbonate, and dialkyl carbonates are also preferred. In this case, the volume ratio of ethylene carbonate to propylene carbonate is usually 99:1 or less and preferably 95:5 or less and usually 1:99 or more and preferably 20:80 or more.

Furthermore, combinations of propylene carbonate and the foregoing dialkyl carbonates are preferred.

Another preferred example of the nonaqueous solvent is a nonaqueous solvent containing 50% by weight or more of an organic solvent selected from ethylene carbonate, propylene carbonate, the halogen atom-containing cyclic carbonate, γ-butyrolactone, and γ-valerolactone. A nonaqueous electrolytic solution containing a lithium salt and an additive characteristic of the present invention, in particular, unsaturated nitrile compound (1) or unsaturated nitrile compound (2) described below in this mixed solvent results in the suppression of evaporation of the solvent and the suppression of fluid leaks even when the solution is used at a high temperature.

In particular, a nonaqueous solvent in which the total amount of ethylene carbonate and γ-butyrolactone in the nonaqueous solvent is 70% by weight or more and preferably 80% by weight or more and in which the volume ratio of ethylene carbonate to γ-butyrolactone is in the range of 5:95 to 45:55 is preferred. A nonaqueous solvent in which the total amount of ethylene carbonate and propylene carbonate in the nonaqueous solvent is 70% by weight or more and preferably 80 weight or more and in which the volume ratio of ethylene carbonate to propylene carbonate is in the range of 30:70 to 80:20 is preferred. The use of a nonaqueous electrolytic solution containing a lithium salt and an additive characteristic of the present invention, in particular, unsaturated nitrile compound (1) or unsaturated nitrile compound (2) described below and/or the compound having 2 to 4 cyano groups in its structural formula, in this mixed solvent achieves a good balance between storage characteristics and the suppression of gas generation and is thus preferred.

Moreover, the phosphorus-containing organic solvent is preferably used as a nonaqueous solvent. The incorporation of the phosphorus-containing organic solvent in the nonaqueous solvent in a concentration of usually 10% by weight or more and preferably 10% to 80% by weight results in a reduction in the flammability of the resulting electrolytic solution. In particular, the use of the phosphorus-containing organic solvent in combination with a nonaqueous solvent selected from ethylene carbonate, propylene carbonate, the halogen atom-containing cyclic carbonate, γ-butyrolactone, γ-valerolactone, and dialkyl carbonates achieves a good balance between cycle characteristics and large-current discharge characteristics and is thus preferred.

In this specification, the volume ratio of the nonaqueous solvents is measured at 25° C. For a solvent that is in the form of a solid at 25° C., e.g., ethylene carbonate, a measurement value at its melting point is used.

{Electrolyte}

An electrolyte is not particularly limited. Any known electrolyte can be used as long as it is used as an electrolyte in a target secondary battery. For nonaqueous electrolyte secondary batteries, usually, lithium salts can be used as electrolytes.

Specific examples of the lithium salt include inorganic lithium salts, such as $LiClO_4$, $LiAsF_6$, $LiPF_6$, $Li_2CO_3$, and $LiBF_4$; fluorine-containing organic lithium salts, such as $LiCF_3SO_3$, $LiC_4F_9SO_3$, $LiNCF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, $LiBF_2(C_2F_5SO_2)_2$, $LiB(OCOCF_3)$, $LiB(OCOC_2F_5)_4$; oxalatophosphate salts, such as lithium tetrafluoro(oxalato)phosphate, lithium difluorobis(oxalato)phosphate, and lithium tris(oxalato)phosphate; oxalatoborate salts, such as lithium bis(oxalato)borate and lithium difluorooxalatoborate; and sodium salts and potassium salts, such as $KPF_6$, $NaPF_6$, $NaBF_4$, and $Na_2CF_3SO_3$. Among these, $LiPF_6$, $LiBF_4$, $LiCF_3SO_3$, $LiN(CF_3SO_2)_2$, $LiN(C_2FF_5SO_2)_2$ are preferred. In particular, $LiPF_6$ or $LiBF_4$ is preferred.

The foregoing lithium salts may be used alone. Alternatively, any two or more types of lithium salts may be combined in any proportion. Combinations of two or more types of inorganic lithium salts or combinations of the inorganic lithium salts and phosphorus-containing organic lithium salts are preferred because gas generation is suppressed during continuous charge or deterioration after high-temperature storage is suppressed. In particular, a combination of $LiPF_6$ and $LiBF_4$ and a combination of an inorganic lithium salt, e.g., $LiPF_6$ or $LiBF_4$, and a fluorine-containing organic lithium salt, e.g., $LiCF_3SO_3$, $LiN(CF_3SO_2)_2$, or $LiN(C_2F_5SO_2)_2$, are preferred. In the combination of $LiPF_6$ and $LiBF_4$, preferably, the proportion of $LiBF_4$ is usually in the range of 0.01% by weight to 50% by weight with respect to the total amount of the lithium salts. In the combination of the inorganic salt, e.g., $LiPF_6$ or $LiBF_4$, and the fluorine-containing organic lithium salt, e.g., $LiCF_3SO_3$, $LiN(CF_3SO_2)_2$, $LiN(C_2F_5SO_2)_2$, preferably, the proportion of the inorganic lithium salt is in the range of usually 70% by weight to 99% by weight with respect to the total amount of the lithium salts.

Furthermore, in the case of a nonaqueous solvent containing 50% by weight or more of γ-butyrolactone, $LiBF_4$ is preferably contained in a concentration of 40 mol % or more with respect to the total amount of the lithium salts. In particular, more preferably, $LiBF_4$ is contained in a concentration of 40 mol % to 95 mol % with respect to the total amount of the lithium salts, and the remainder is composed of a compound selected from the group consisting of $LiPF_6$, $LiCF_3SO_3$, $LiN(CF_3SO_2)_2$ and $LiN(C_2F_5SO_2)_2$.

The concentration of the lithium salt in a nonaqueous electrolytic solution is usually 0.5 mol/L or more, preferably 0.6 mol/L or more, and more preferably 0.8 mol/L or more, and usually 3 mol/L or less, preferably 2 mol/L or less, and more preferably 1.5 mol/L or less. An excessively low concentration of the lithium salt in the nonaqueous electrolytic solution results in the insufficient electrical conductivity of the electrolytic solution. An excessively high concentration may result in a deterioration in battery performance due to an increase in viscosity.

{Additional Additive}

To improve wettability for a separator described below, the nonaqueous electrolytic solution according to the first aspect may further contain one or two or more types of surfactants such as trioctyl phosphate, perfluoroalkyl group-containing poly(oxyethylene ether), and perfluorooctane sulfonate in addition to unsaturated nitrile compound (1) and/or the compound having 2 to 4 cyano groups in its structural formula described above, the nonaqueous solvent, and the electrolyte. The surfactant content is preferably in the range of 0.01% to 1% by weight with respect to the total weight of the nonaqueous electrolytic solution. At a surfactant content of less than the lower limit, the effect expected may not be provided. Meanwhile, a surfactant content exceeding the upper limit may result in a deterioration in battery characteristics.

The nonaqueous electrolytic solution may further contain various overcharge-preventing agents, other film-forming agents, and additional aids.

Examples of the overcharge-preventing agents include aromatic compounds, such as biphenyl, alkylbiphenyl, terphenyl, partially hydrogenated terphenyl, cyclohexylbenzene, tert-butylbenzene, tert-amylbenzene, diphenyl ether, and dibenzofuran; partially fluorinated aromatic compounds described above, e.g., 2-fluorobiphenyl, o-cyclohexylfluorobenzene, and p-cyclohexylfluorobenzene; and fluorine-containing anisoles, such as 2,4-difluoroanisole, 2,5-difluoroanisole, and 2,6-difluoroanisole.

The overcharge-preventing agents may be used alone. Alternatively, any two or more types of overcharge-preventing agents may be combined in any proportion.

The overcharge-preventing agent is preferably contained in the nonaqueous electrolytic solution in a concentration of 0.1% to 5% by weight. At an overcharge-preventing agent concentration of less than the lower limit, the effect expected may not be provided. Meanwhile, an overcharge-preventing agent concentration exceeding the upper limit may result in a deterioration in battery characteristics.

As other film-forming agents, fluorinated carbonate, aryl-substituted carbonate, cyclic carboxylic anhydride, sulfonic acid derivatives, sulfone compounds, and sulfite compounds are preferably used.

As aryl-substituted carbonate, for example, 4-phenylethylene carbonate and methylphenyl carbonate are used.

As cyclic carboxylic anhydride, for example, succinic anhydride, maleic anhydride, glutaric anhydride, trimellitic anhydride, and phthalic anhydride are used.

As sulfonic acid derivatives, for example, 1,3-propane sultone, 1,4-butane sultone, 1,3-propen sultone, 1,4-butene sultone, methyl methanesulfonate, ethyl methanesulfonate, dimethylmethanesulfonic acid amide are used.

As sulfone compounds, for example, dimethyl sulfone, sulfolane, and 3-sulfolene are used.

As sulfite compounds, for example, ethylene sulfite, trimethylene sulfite, erythritan sulfite, vinylethylene sulfite, dimethyl sulfite, ethylmethyl sulfite, and diethyl sulfite are used.

These may be used separately or in any combination of two or more of them in any proportion.

In the case where the film-forming agent is contained, a nonaqueous electrolytic solution has a film-forming agent content of 0.01% by weight or more and preferably 0.1% by weight or more and 10% by weight or less and preferably 8% by weight or less, so that a battery has satisfactory capacity retention characteristics and cycle characteristics.

Examples of additional aids include carbonate compounds, such as erythritan carbonate, spiro-bis-dimethylene carbonate, and methoxyethylmethyl carbonate; carboxylic anhydrides, such as citraconic anhydride, glutaconic anhydride, itaconic anhydride, trimellitic anhydride, diglycolic anhydride, cyclohexanedicarboxylic anhydride, cyclopentanetetracarboxylic dianhydride, and phenylsuccinic anhydride; sulfur-containing compounds, such as 1,3-propane sultone, 1,4-butane sultone, methyl methanesulfonate, busulfan, and tetramethylthiuram monosulfide, N,N-dimethylmethanesulfonamide, and N,N-diethylmethanesulfonamide; nitrogen-containing compounds, such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds, such as heptane, octane, and cycloheptane; and fluorine-containing aromatic compounds, such as fluorobenzene, difluorobenzene, hexafluorobenzene, and benzotrifluoride. These may be used separately or in any combination of two or more of them in any proportion.

In the case where a nonaqueous electrolytic solution contains these aids, the proportion of the aids is usually in the range of 0.01% by weight to 10% by weight with respect to the nonaqueous electrolytic solution. The incorporation of these aids in a nonaqueous electrolytic solution of the present invention results in improvement in capacity retention characteristics and cycle characteristics after high-temperature storage.

{Method for Producing Nonaqueous Electrolytic Solution}

The nonaqueous electrolytic solution according to the first aspect can be prepared by dissolving the unsaturated nitrile compound (1) and/or the compound having 2 to 4 cyano groups in its structural formula, the electrolyte, and, if necessary, additional aids into the nonaqueous solvent.

Components such as the nonaqueous solvent are preferably dehydrated in advance when the nonaqueous electrolytic solution is prepared. Specifically, the components are preferably dehydrated so as to have a water content of usually 50 ppm or less and particularly 20 ppm or less. Any dehydration method can be selected. Examples thereof include a method in which a component is heated under reduced pressure; and a method in which a component is passed through molecular sieves.

The nonaqueous electrolytic solution according to the first aspect may be gelatinized with a genatinizer such as a polymer so as to have a semi-solid form. The proportion of the nonaqueous electrolytic solution in the semi-solid electrolyte is usually 30% by weight or more, preferably 50% by weight or more, and more preferably 75% by weight or more, and usually 99.95% by weight or less, preferably 99% by weight or less, and more preferably 98% by weight or less with respect to the total amount of the semi-solid electrolyte. An excessively high proportion of the nonaqueous electrolytic solution results in difficulty in holding the nonaqueous electrolytic solution, thus readily causing fluid leaks. In contrast, an excessively low proportion of the nonaqueous electrolytic solution may result in insufficient charge and discharge efficiency and capacity.

[Nonaqueous Electrolytic Solution According to Second Aspect]

A nonaqueous electrolytic solution according to a second aspect of the present invention always contains a compound general formula (2) described below (hereinafter, also referred to as "unsaturated nitrile compound (2)"). To more efficiently suppress the decomposition of an nonaqueous electrolytic solution on a surface of a negative electrode, preferably, the nonaqueous electrolytic solution further contains at least one compound selected from the group consisting of halogen atom-containing cyclic carbonate, cyclic carbonate having a carbon-carbon unsaturated bond, monofluorophosphate, and difluorophosphate.

(2)

In general formula (2), $R^4$, $R^5$, and $R^6$ each independently represent a hydrogen atom, a cyano group, or an optionally halogen atom-substituted hydrocarbon group having 1 to 10 carbon atoms, with the proviso that $R^4$ and $R^5$ do not simultaneously represent hydrogen atoms.

In the case where at least one of $R^4$, $R^5$, and $R^6$ in general formula (2) represents a cyano group, examples thereof include fumaronitrile, 1,1,2-tricyanoethylene, and tetracyanoethylene.

In the case where at least one of $R^4$, $R^5$, and $R^6$ in general formula (2) represents a hydrocarbon group, examples of the hydrocarbon group are the same as those listed as the examples of the hydrocarbon groups of $R^1$ to $R^3$ in general formula (1).

Furthermore, in the case where hydrocarbon groups of $R^4$, $R^5$, and $R^6$ in general formula (2) are substituted with halogen atoms, the halogen atom-substituted hydrocarbon groups are the same as those listed as the examples of the halogen atom-substituted hydrocarbon groups of $R^1$ to $R^3$ in general formula (1).

When the compound represented by general formula (2) has a hydrocarbon group as any one of $R^4$ to $R^6$, specific examples of the compound are described below.

<Specific Example of Compound Having Chain Saturated Hydrocarbon Group>

Examples thereof include crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile.

<Specific Examples of Compound Having Cyclic Saturated Hydrocarbon Group>

Examples thereof include 1-cyano-1-cyclopentene and 1-cyano-1-cyclohexene.

<Specific Examples of Compound Having Unsaturated Hydrocarbon Group>

Examples thereof include geranylnitrile and cinnamonitrile.

<Specific Examples of Compound Having Chain Saturated Hydrocarbon Group Substituted with Fluorine Atom>

Examples thereof include 3-fluorocrotononitrile, 4-fluorocrotononitrile, 4,4-difluorocrotononitrile, 4,4,4-trifluorocrotononitrile, 3-(fluoromethyl)crotononitrile, 4-fluoro-3-(fluoromethyl)-2-butenenitrile, 4-fluoro-2-pentenenitrile, and 5-fluoro-2-pentenenitrile.

<Specific Examples of Compound Having Cyclic Saturated Hydrocarbon Group Substituted with Fluorine Atom>

Examples thereof include 3-fluoro-1-cyano-1-cyclopentene, 4-fluoro-1-cyano-1-cyclopentene, 5-fluoro-1-cyano-1-cyclopentene, 3-fluoro-1-cyano-1-cyclohexene, 4-fluoro-1-cyano-1-cyclohexene, 5-fluoro-1-cyano-1-cyclohexene, and 6-fluoro-1-cyano-1-cyclohexene.

<Specific Examples of Compound Having Unsaturated Hydrocarbon Group Substituted with Fluorine Atom>

Examples thereof include 3-(2-fluorophenyl)propenenitrile, 3-(3-fluorophenyl)propenenitrile, 3-(4-fluorophenyl)propenenitrile, and 3-fluorogeranylnitrile.

<Preferred Example of Unsaturated Nitrile Compound (2)>

Among these nitrile compounds exemplified above, the following compounds are particularly preferred as unsaturated nitrile compound (2) according to the present invention from the viewpoint of easy synthesis or from the industrial standpoint.

Examples thereof include crotononitrile, 3-methylcrotononitrile, 2-methyl-2-butenenitrile, 2-pentenenitrile, 2-methyl-2-pentenenitrile, 1-cyano-1-cyclopentene, 1-cyano-1-cyclohexene, geranylnitrile, cinnamonitrile, fumaronitrile, and tetracyanoethylene.

The molecular weight of unsaturated nitrile compound (2) is not limited. Unsaturated nitrile compound (2) may have any molecular weight unless the effect of the present invention is significantly impaired. Unsaturated nitrile compound (2) has a molecular weight of usually 40 or more and preferably 50 or more. The upper limit of the molecular weight is not particularly limited. For practical purposes, the upper limit is usually 400 or less and preferably 300 or less because an excessively high molecular weight is liable to cause an increase in the viscosity of an electrolytic solution.

A method for producing unsaturated nitrile compound (2) is not particularly limited. Any of known methods can be selected to produce it.

A single type of unsaturated nitrile compound (2) may be used alone. Alternatively, two or more types of unsaturated nitrile compounds (2) may be used in combination as a mixture.

The nonaqueous electrolytic solution according to the first aspect has an unsaturated nitrile compound (2) content of usually 0.001% by weight or more, preferably 0.01% by weight or more, and more preferably 0.1% by weight, and usually 10% by weight or less, preferably 5% by weight, and more preferably 2% by weight with respect to the total weight of the nonaqueous electrolytic solution. An unsaturated nitrile compound (2) content of less than the lower limit described above can result in insufficient suppression of the decomposition of other components, constituting the nonaqueous electrolytic solution, on a surface of the electrode, so that the effect of the present invention may not be readily provided. Meanwhile, an unsaturated nitrile compound (2) content exceeding the upper limit described above can result in excessive progress of the reaction on the electrode surface, thereby deteriorating various battery characteristics.

Furthermore, two or more types of unsaturated nitrile compounds (2) may be used in combination. Also in the case where the two or more types are used in combination, the total content of the two or more types of unsaturated nitrile compounds (2) is the same as above.

The nonaqueous electrolytic solution according to the second aspect may contain one or two or more compounds selected from the group consisting of a halogen atom-containing cyclic carbonate, a cyclic carbonate having a carbon-carbon unsaturated bond, a monofluorophosphate, and a difluorophosphate as in the nonaqueous electrolytic solution according to the first aspect. With respect to the compounds, specific examples, preferred examples, preferred proportions in the nonaqueous electrolytic solution, existence forms, and mechanisms of action are the same as those in the above description of the first aspect.

Also for a nonaqueous solvent, an electrolyte, and additional additives which can be incorporated in the nonaqueous electrolytic solution according to the second aspect, specific examples, preferred examples, preferred proportions in the nonaqueous electrolytic solution, existence forms, and mechanisms of action are the same as those in the above description of the first aspect.

The nonaqueous electrolytic solution according to the second aspect can be produced by the same method as that for producing the nonaqueous electrolytic solution according to the first aspect.

[Nonaqueous Electrolytic Solution According to Third Aspect]

A nonaqueous electrolytic solution according to a third aspect of the present invention is a nonaqueous electrolytic solution for use in a nonaqueous electrolyte secondary battery including a nonaqueous electrolytic solution, a negative electrode, and a positive electrode, the negative electrode and the positive electrode being capable of storing and releasing metal ions, contains an electrolyte and a nonaqueous solvent, and further contains an unsaturated nitrile compound represented by general formula (1) (i.e., unsaturated nitrile compound (1)) and at least one compound selected from the group consisting of halogen atom-containing cyclic carbonates, monofluorophosphates, and difluorophosphates.

(1)

In general formula (1), $R^1$, $R^2$, and $R^3$ each independently represent a hydrogen atom, a cyano group, or an optionally halogen atom-substituted hydrocarbon group having 1 to 10 carbon atoms.

The nonaqueous electrolytic solution is preferably used in a nonaqueous electrolyte secondary battery including a negative electrode containing a carbonaceous material serving as an active material.

For unsaturated nitrile compound (1), the halogen atom-containing cyclic carbonate, the monofluorophosphate, and the difluorophosphate which are contained in the nonaqueous electrolytic solution according to the third aspect, specific examples, preferred examples, preferred proportions in the nonaqueous electrolytic solution, existence forms, and mechanisms of action are the same as those in the above description of the first aspect.

Preferably, the nonaqueous electrolytic solution according to the third aspect further contains a cyclic carbonate having a carbon-carbon unsaturated bond as in the nonaqueous electrolytic solution according to the first aspect because a more stable interface-protecting film can be formed. In this case, with respect to the compound, specific examples, preferred examples, preferred proportions in the nonaqueous electrolytic solution, existence forms, and mechanisms of action are the same as those in the above description of the first aspect.

Also for a nonaqueous solvent, an electrolyte, and additional additives which can be incorporated in the nonaqueous electrolytic solution according to the third aspect, specific examples, preferred examples, preferred proportions in the nonaqueous electrolytic solution, existence forms, and mechanisms of action are the same as those in the above description of the first aspect.

The nonaqueous electrolytic solution according to the third aspect can be produced by the same method as that for producing the nonaqueous electrolytic solution according to the first aspect.

[Nonaqueous Electrolyte Secondary Battery]

A nonaqueous electrolyte secondary battery of the present invention includes a negative electrode, a positive electrode, and the foregoing nonaqueous electrolytic solution of the present invention, the negative electrode and the positive electrode being capable of storing and releasing metal ions such as lithium ions.

That is, the nonaqueous electrolyte secondary battery of the present invention is the same as a known nonaqueous electrolyte secondary battery, except for the nonaqueous electrolytic solution. The nonaqueous electrolyte secondary battery of the present invention usually has a structure in which a positive electrode and a negative electrode are stacked with a porous film (separator) provided therebetween, the porous film containing the nonaqueous electrolytic solution of the present invention, and in which these components are accommodated in a case. Thus, the shape of the nonaqueous electrolyte secondary battery of the present invention is not particularly limited and may have a cylindrical shape, an angular shape, a laminate shape, a coin shape, a large shape, or the like.

[Positive Electrode]

Examples of a positive-electrode active material contained in the secondary battery of the present invention include inorganic compounds, such as oxides of transition metals, complex oxides of transition metals and lithium (lithium-transition metal complex oxides), sulfides of transition metals, and metal oxides, metallic lithium, lithium alloys, and complexes thereof.

Specific examples thereof include transition metal oxides, such as MnO, $V_2O_5$, $V_6O_{13}$, and $TiO_2$; lithium-transition metal complex oxides, such as $LiCoO_2$ and lithium-cobalt complex oxides each having a basic composition of $LiCoO_2$, $LiNiO_2$ and lithium-nickel complex oxides each having a basic composition of $LiNiO_2$, $LiMn_2O_4$ and $LiMnO_2$ and lithium-manganese complex oxides each having a basic composition of $LiMn_2O_4$ and $LiMnO_2$, lithium-nickel-manganese-cobalt complex oxides, and lithium-nickel-cobalt-aluminum composite oxides; sulfides of transition metals, such as TiS and FeS; and metal oxides, such as $SnO_2$ and $SiO_2$.

Among these, lithium-transition metal complex oxides, specifically, in particular, $LiCoO_2$ and lithium-cobalt complex oxides each having a basic composition of $LiCoO_2$, $LiNiO_2$ and lithium-nickel complex oxides each having a basic composition of $LiNiO_2$, $LiMn_2O_4$ and $LiMnO_2$ and lithium-manganese complex oxides each having a basic composition of $LiMn_2O_4$ and $LiMnO_2$, lithium-nickel-manganese-cobalt complex oxides, and lithium-nickel-cobalt-aluminum composite oxides are preferably used because they can achieve a good balance between high capacity and high cycle characteristics. Furthermore, lithium-transition metal complex oxides are preferred because their structures can be stabilized by partially substituting other metals, such as Al, Ti, V, Cr, Mn, Fe, Co, Li, Ni, Cu, Zn, Mg, Ga, and Zr, for cobalt, nickel, and manganese.

These positive-electrode active materials may be used separately or in any combination of two or more of them in any proportion.

The positive electrode for use in the nonaqueous electrolyte secondary battery of the present invention can be produced by a common method. Specific examples of a method for producing the positive electrode include a method in which a mixture of the positive-electrode active material, a binder, a conductive material, and the like is subjected to roll forming to form a sheet electrode; a method in which compression molding is performed to form a pellet electrode; a method in which a positive-electrode active material is applied to a current collector for the positive electrode (hereinafter, also referred to as a "positive electrode current collector") to form a positive-electrode active material layer (application method); and a method in which a thin layer (positive-electrode active material layer) containing the foregoing positive-electrode active material is formed on a positive electrode current collector by evaporation, sputtering, plating, or the like. Usually, a positive-electrode active material layer is formed by the application method.

In the case of employing the application method, a binder, a thickener, a conductive material, a solvent, and the like are added to the positive-electrode active material to form a slurry. The resulting slurry is applied to a positive electrode current collector, followed by drying and pressing to increase density. Thereby, the positive-electrode active material layer is formed on the positive electrode current collector.

Examples of a material constituting the positive electrode current collector include aluminum, titanium, and tantalum, and alloys containing one or two or more thereof. Among these, aluminum and its alloys are preferred.

The positive electrode current collector has a thickness of usually 1 µm or more and preferably 5 µm or more and usually 100 µm or less and preferably 50 µm or less. An excessively large thickness of the positive electrode current collector results in an excessively reduction in the capacity of a battery as a whole. In contrast, an excessively small thickness of the positive electrode current collector may lead to poor handleability.

To improve the binding effect on the positive-electrode active material layer formed on the surface, the surface of the positive electrode current collector is preferably subjected to roughening treatment in advance. Examples of a method for roughening the surface include blasting; rolling with a rough-surface roll; mechanical polishing in which a surface of a current collector is polished with an abrasive particle-coated abrasive, a grindstone, an emery wheel, a wire brush having steel wire, or the like; electropolishing, and chemical polishing.

To reduce the weight of the positive electrode current collector to improve the energy density per weight of the battery, a perforated positive electrode current collector having an expanded metal form or a perforated metal form may also be used. In this type of positive electrode current collector, the weight can be desirably changed by changing the opening ratio. In the case where positive-electrode active material layers are formed on both sides of this type of positive electrode current collector, the positive-electrode active material layers are not very easily detached owing to a rivet effect provided through the openings. An excessively high opening ratio, however, may result in a reduction in the contact area between the positive-electrode active material layers and the positive electrode current collector, thereby reducing bonding strength.

To increase conductivity, the conductive material is usually incorporated in the positive-electrode active material layer.

The type of conductive material is not limited. Examples of the conductive material include metal materials, such as copper and nickel; carbon materials, such as graphite, e.g., natural graphite and artificial graphite, carbon black, e.g., acetylene black, and amorphous carbon, e.g., needle coke. These materials may be used separately or in combination of two or more of them in any proportion.

The proportion of the conductive material in the positive-electrode active material layer is usually 0.01% by weight or more, preferably 0.1% by weight or more, and more preferably 1% by weight or more, and usually 50% by weight or less, preferably 30% by weight or less, and more preferably 15% by weight or less. An excessively low proportion of the conductive material may result in insufficient conductivity. In contrast, an excessively high proportion of the conductive material may result in a reduction in battery capacity.

The binder used for the production of the positive-electrode active material layer is not particularly limited. In the case of employing the application method, any binder can be used as long as it is composed of a material stable for a liquid medium used in producing the electrode. Specific examples thereof include resin-like polymers, such as polyethylene, polypropylene, polyethylene terephthalate, polymethyl methacrylate, aromatic polyamide, cellulose, and nitrocellulose; rubbery polymers, such as styrene-butadiene rubber (SBR), acrylonitrile-butadiene rubber (NBR), fluorocarbon rubber, isoprene rubber, butadiene rubber, and ethylene-propylene rubber; thermoplastic elastomer-based polymers, such as styrene-butadiene-styrene block copolymers and hydrogenated products thereof, ethylene-propylene-diene ternary copolymers (EPDM), styrene-ethylene-butadiene-ethylene copolymers, and styrene-isoprene-styrene block copolymers and hydrogenated products thereof; flexible resin-like polymers, such as syndiotactic-1,2-polybutadiene, polyvinyl acetate, ethylene-vinyl acetate copolymers, and propylene-α-olefin copolymers; fluorinated polymers, such as polyvinylidene fluoride, polytetrafluoroethylene, fluorinated polyvinylidene fluoride, and polytetrafluoroethylene-ethylene copolymers; and polymeric compositions having ionic conductivity of alkali metal ions (in particular, lithium ions). These materials may be used separately or in combination of two or more of them in any proportion.

The proportion of the binder in the positive-electrode active material layer is usually 0.1% by weight or more, preferably 1% by weight or more, and more preferably 5% by weight or more, and usually 80% by weight or less, preferably 60% by weight or less, more preferably 40% by weight or less, and most preferably 10% by weight or less. At an excessively low proportion of the binder, the positive-electrode active material is not sufficiently held, and the positive electrode has insufficient mechanical strength, so that battery performance such as cycle characteristics may be deteriorated. An excessively high proportion of the binder may lead to a reduction in battery capacitance and conductivity.

The type of liquid medium used for forming a slurry is not particularly limited as long as the positive-electrode active material, a conductive agent, the binder, and, if necessary, the thickener can be dissolved or dispersed in the liquid medium. Aqueous solvents and organic solvents may be used.

Examples of aqueous solvents include water and mixed solvents of alcohol and water.

Examples of organic solvents include aliphatic hydrocarbons such as hexane; aromatic hydrocarbons such as benzene, toluene, xylene, and methylnaphthalene; heterocyclic compounds, such as quinoline and pyridine; ketones, such as acetone, methyl ethyl ketone, and cyclohexanone; esters, such as methyl acetate and methyl acrylate; amines, such as diethylenetriamine, and N,N-dimethylaminopropylamine; ethers, such as diethyl ether, propyleneoxide, and tetrahydrofuran (THF); amides, such as N-methylpyrrolidone (NMP), dimethylformamide, dimethylacetamide; and aprotic polar solvents, such as hexamethylphosphoramide and dimethyl sulfoxide. These materials may be used separately or in combination of two or more of them in any proportion.

In particular, in the case of using the aqueous solvent, a slurry is preferably formed using the thickener and latex of styrene-butadiene rubber (SBR) or the like. The thickener is usually used to adjust the viscosity of the slurry. Non-limiting examples of the thickener include carboxymethyl cellulose, methyl cellulose, hydroxymethyl cellulose, ethyl cellulose, polyvinyl alcohol, starch oxide, starch phosphate, and casein, and salts thereof. These materials may be used separately or in combination of two or more of them in any proportion.

In the case of incorporating the thickener, the proportion of the thickener is 0.1% by weight or more, preferably 0.5% by weight or more, and more preferably 0.6% by weight or more with respect to the active material. The upper limit is 5% by weight or less, preferably 3% by weight or less, and more preferably 2% by weight or less. A proportion of the thickener of less than the above range may result in a significant reduction in applicability. A proportion of the thickener exceeding the above range may result in a reduction in the proportion of the active material in the positive-electrode active material layer, thereby causing problems of a reduction in the capacity of the battery and an increase in the resistance between the positive-electrode active material particles.

The viscosity of the slurry is not particularly limited as long as the slurry can be applied to the current collector. The viscosity may be appropriately adjusted by changing the amount of solvent used in preparing the slurry to the extent that application can be performed.

The resulting slurry is applied to the positive electrode current collector, followed by drying and pressing to form a positive-electrode active material layer. Any known application method can be employed without limitation. Also, a drying method is not particularly limited. Known methods, such as air drying, drying by heating, and drying under reduced pressure, can be employed.

The positive-electrode active material layer obtained by application and drying is preferably compacted by hand pressing, roller pressing, or the like in order to increase packing density of the positive-electrode active material.

The positive-electrode active material layer has a density of preferably 1.5 $g/cm^3$ or more, more preferably 2 $g/cm^3$ or more, and still more preferably 2.2 $g/cm^3$ or more. The upper limit is preferably 3.9 $g/cm^3$ or less, more preferably 3.5 $g/cm^3$ or less, and still more preferably 3.0 $g/cm^3$ or less. A density exceeding the above range may result in a reduction in permeability of the nonaqueous electrolytic solution to and around the interface between the current collector and the active material, particularly reducing charge and discharge characteristics at a high current density. A density of less than the above range may result in a reduction in the conductivity between active material particles, thus increasing battery resistance.

[Negative Electrode]

Examples of a negative-electrode active material that can be used include carbonaceous materials, metal compounds, metallic lithium, and lithium alloys capable of storing and releasing metal ions. Among these, carbonaceous materials, in particular, graphite and a graphite material covered with more amorphous carbon than graphite, are preferred. Furthermore, a metal compound capable of storing and releasing metal ions can be used as the negative-electrode active material. Examples of the metal compound include compounds containing metals, such as Ag, Al, Ba, Bi, Cu, Ga, Ge, In, Ni, P, Pb, Sb, Si, Sn, Sr, and Zn. These metals may be used in any forms of elemental forms, oxides, alloys with lithium, and the like. In particular, a negative-electrode active material containing at least one atom selected from the group consisting of a silicon (Si) atom, a tin (Sn) atom, and a lead (Pb) atom is preferably selected.

Examples of the negative-electrode active material containing at least one atom selected from the group consisting of a Si atom, a Sn atom, and a Pb atom include the elemental metal of one metal element selected from Si, Sn, and Pb; alloys of two or more of Si, Sn, and Pb; alloys of one or two or more metal elements selected from Si, Sn, and Pb and one or two or more other metal elements; and compounds containing one or two or more metal elements selected from Si, Sn, and Pb. The use of the elemental metal, alloy, or metal compound as the negative-electrode active material results in a higher capacity of a battery.

These negative-electrode active materials may be used separately or in combination of two or more of them in any proportion.

Graphite has a d value (interlayer distance) of the lattice plane (002 plane) obtained by X-ray diffraction according to the Japan Society for the Promotion of Science (JSPS) method of usually 0.335 to 0.340 nm, preferably 0.335 to 0.338 nm, and particularly preferably 0.335 to 0.337 nm. The crystallite size (Lc) obtained by X-ray diffraction according to the JSPS method is usually 30 nm or more, preferably 50 nm or more, and particularly preferably 100 nm or more. The ash content is usually 1% by weight or less, preferably 0.5% by weight or less, and particularly preferably 0.1% by weight or less.

The graphite material covered with amorphous carbon preferably has a structure such that graphite having a d value of the lattice plane (002 plane) on X-ray diffraction of 0.335 to 0.338 nm is used as a core material and that a carbonaceous material having a d value of the lattice plane (002 plane) on X-ray diffraction larger than that of the core material is attached to the core material, in which the weight ratio of the core material to the carbonaceous material having d value of the lattice plane (002 plane) on X-ray diffraction, larger than that of the core material is in the range of 99/1 to 80/20. Use of the graphite material results in a high-capacity negative electrode having low reactivity to the electrolytic solution.

The particle diameter of the carbonaceous material is usually 1 μm or more, preferably 3 μm or more, more preferably 5 μm or more, and most preferably 7 μm or more, and usually 100 μm or less, preferably 50 μm or less, more preferably 40 μm or less, and most preferably 30 μm or less, in terms of a median diameter by the laser diffraction and scattering method.

The specific surface area of the carbonaceous material by the BET method is usually 0.3 $m^2/g$ or more, preferably 0.5 $m^2/g$ or more, more preferably 0.7 $m^2/g$ or more, and most preferably 0.8 $m^2/g$ or more, and usually 25 $m^2/g$ or less, preferably 20 $m^2/g$ or less, more preferably 15 $m^2/g$ or less, and most preferably 10 $m^2/g$ or less.

The carbonaceous material preferably has an R value (=IB/IA) of 0.01 to 0.7, in which the R value is represented by the ratio of IB to IA, where IA represents the peak strength of a peak PA observed in the range of 1,570 to 1,620 $cm^{-1}$ in a Raman spectrum with argon ion laser light, and IB represents the peak strength of a peak PB observed in the range of 1,300 to 1,400 $cm^{-1}$ in the spectrum. The half-width of a peak observed in the range of 1,570 to 1,620 $cm^{-1}$ is usually 26 $cm^{-1}$ or less and preferably 25 $cm^{-1}$ or less.

Examples of the compound containing one or two or more metal elements selected from Si, Sn, and Pb include complex compounds, such as carbides, oxides, nitrides, sulfides, and phosphides, each containing one or two or more metal elements selected from Si, Sn, and Pb.

Furthermore, compounds in which these complex compounds are complexly bonded to several elements such as metal elements, alloys, and nonmetallic elements are also exemplified. More specifically, with respect to Si and Sn, alloys of a metal that does not serve as a negative electrode and either Si or Sn can be used, for example. With respect to Sn, for example, a complex compound containing 5 to 6 elements and composed of a combination of Sn, a metal serving as a negative electrode and being different from Si, Sn, and Pb, a metal not serving as a negative electrode, and a nonmetallic element, can also be used.

Among these negative-electrode active materials, the elemental metal of one metal element selected from Si, Sn, and Pb, alloys of two or more of Si, Sn, and Pb, and oxides, carbides, nitrides, and the like of one or two or more metal elements selected from Si, Sn, and Pb are preferred because when batteries including these materials are produced, the resulting batteries have large capacities per unit weight. In particular, the elemental metal, alloys, oxides, carbides, nitrides, and the like of Si and/or Sn are preferred from the viewpoint of capacity per unit weight and environmental load.

The following compounds containing Si and/or Sn are also preferred because they have lower capacities per unit weight than elemental metals or alloys but have excellent cycle characteristics:

Oxides of Si and/or Sn, in which the element ratio of Si and/or Sn to oxygen is usually 0.5 or more, preferably 0.7 or more, more preferably 0.9 or more, and usually 1.5 or less, preferably 1.3 or less, and more preferably 1.1 or less;

Nitrides of Si and/or Sn, in which the element ratio of Si and/or Sn to nitrogen is usually 0.5 or more, preferably 0.7 or more, and more preferably 0.9 or more, and usually 1.5 or less, preferably 1.3 or less, and more preferably 1.1 or less; and Carbides of Si and/or Sn, in which the element ratio of Si and/or Sn to carbon is usually 0.5 or more, preferably 0.7 or more, and more preferably 0.9 or more, and usually 1.5 or less, preferably 1.3 or less, and more preferably 1.1 or less.

These negative-electrode active materials may be used separately or in combination of two or more of them in any proportion.

The negative electrode for use in the nonaqueous electrolyte secondary battery of the present invention can be produced by a common method. Specific examples of a method for producing the negative electrode include a method in which a mixture of the negative-electrode active material, a binder, a conductive material, and the like is subjected to roll forming to form a sheet electrode; and a method in which compression molding is performed to form a pellet electrode. Usually, a method in which a thin layer (negative-electrode active material layer) containing the foregoing negative-electrode active material is formed on a current collector for the negative electrode (hereinafter, also referred to as a "negative electrode current collector") by application, evaporation, sputtering, plating, or the like. In this case, a binder, a thickener, a conductive material, a solvent, and the like are added to the negative-electrode active material to form a slurry. The resulting slurry is applied to a negative electrode current collector, followed by drying and pressing to increase density.

Thereby, the negative-electrode active material layer is formed on the negative electrode current collector.

Examples of a material constituting the negative electrode current collector include steel, copper alloys, nickel, nickel alloys, and stainless steel. Among these, copper foil is preferred from the viewpoint of easy processing for thin films and cost.

The negative electrode current collector has a thickness of usually 1 μm or more and preferably 5 μm or more and usually 100 μm or less and preferably 50 μm or less. An excessively large thickness of the negative electrode current collector may result in an excessively reduction in the capacity of a battery as a whole. In contrast, an excessively small thickness of the negative electrode current collector may lead to poor handleability.

To improve the binding effect on the negative-electrode active material layer formed on the surface, the surface of the negative electrode current collector is preferably subjected to roughening treatment in advance. Examples of a method for roughening the surface include blasting; rolling with a rough-surface roll; mechanical polishing in which a surface of a current collector is polished with an abrasive particle-coated abrasive, a grindstone, an emery wheel, a wire brush having steel wire, or the like; electropolishing, and chemical polishing.

To reduce the weight of the negative electrode current collector to improve the energy density per weight of the battery, a perforated negative electrode current collector having an expanded metal form or a perforated metal form may also be used. In this type of negative electrode current collector, the weight can be desirably changed by changing the opening ratio. In the case where negative-electrode active material layers are formed on both sides of this type of negative electrode current collector, the negative-electrode active material layers are not very easily detached owing to a rivet effect provided through the openings. An excessively high opening ratio, however, may result in a reduction in the contact area between the negative-electrode active material layers and the negative electrode current collector, thereby reducing bonding strength.

A slurry for forming the negative-electrode active material layer is usually prepared by adding a binder, a thickener, and the like to a negative-electrode material. The term "negative-electrode material" used in this specification indicates a material including the negative-electrode active material and the conductive material.

The proportion of the negative-electrode active material in the negative-electrode material is usually 70% by weight or more and preferably 75% by weight or more and usually 97% by weight or less and preferably 95% by weight or less. An excessively low proportion of the negative-electrode active material is liable to cause a secondary battery including the resulting negative electrode to have an insufficient capacity. An excessively high proportion of the negative-electrode active material is liable to lead to the resultant negative electrode having insufficient strength because the proportions of the binder and the like are relatively reduced. In the case of using two or more negative-electrode active materials in combination, the total amount of the negative-electrode active materials may satisfy the above range.

Examples of the conductive material used for the negative electrode include metal materials, such as copper and nickel; and carbon materials, such as graphite and carbon black. These materials may be used separately or in combination of two or more of them in any proportion. In particular, a carbon material as the conductive material is preferably used because the carbon material functions also as an active material. The proportion of the conductive material in the negative-electrode material is usually 3% by weight or more and preferably 5% by weight or more and usually 30% by weight or less and preferably 25% by weight or less. An excessively low proportion of the conductive material is liable to lead to insufficient conductivity. An excessively high proportion of the conductive material is liable to cause a reduction in battery capacity and strength because the proportions of the negative-electrode active material and the like are relatively reduced. In the case of using two or more conductive materials in combination, the total amount of the conductive materials may satisfy the above range.

With respect to the binder for use in the negative electrode, any binder can be used as long as it is safe for a solvent and an electrolytic solution used in producing the electrode. Examples thereof include polyvinylidene fluoride, polytetrafluoroethylene, polyethylene, polypropylene, styrene-butadiene rubber, isoprene rubber, butadiene rubber, ethylene-acrylic acid copolymers, and ethylene-methacrylic acid copolymers. These materials may be used separately or in combination of two or more of them in any proportion.

The proportion of the binder is usually 0.5% by weight or more and preferably 1% by weight or more and usually 10% by weight or less and preferably 8% by weight or less with respect to 100% by weight of the negative-electrode material. An excessively low proportion of the binder is liable to lead to the resultant negative electrode having insufficient strength. An excessively high proportion of the binder is liable to cause a reduction in battery capacity and strength because the proportions of the negative-electrode active material and the like are relatively reduced. In the case of using two or more binders in combination, the total amount of the binders may satisfy the above range.

Examples of the thickener for use in the negative electrode include carboxymethyl cellulose, methyl cellulose, hydroxymethyl cellulose, ethyl cellulose, polyvinyl alcohol, starch oxide, starch phosphate, and casein. These materials may be used separately or in combination of two or more of them in any proportion. The thickener may be used as needed. In the case of using the thickener, the thickener is preferably used in the negative-electrode active material layer in a proportion of usually 0.5% by weight to 5% by weight.

A slurry for forming the negative-electrode active material layer is prepared by adding the conductive material, the binder, and the thickener, as needed, to the negative-electrode active material with an aqueous solvent or an organic solvent serving as a dispersant. As the aqueous solvent, water is usually used. Alternatively, a mixed solvent in which an organic solvent, such as alcohol, e.g., ethanol, or cyclic amide, e.g., N-methylpyrrolidone, is incorporated in water in a concentration of 30% by weight or less with respect to water may be used. Examples of the organic solvent include cyclic amides such as N-methylpyrrolidone; linear amides, such as N,N-dimethylformamide and N,N-dimethylacetamide; aromatic hydrocarbons, such as anisole, toluene, and xylene; and alcohols, such as butanol and cyclohexanol. Among these, cyclic amides such as N-methylpyrrolidone and linear amides, such as N,N-dimethylformamide and N,N-dimethylacetamide, are preferred. These materials may be used separately or in combination of two or more of them in any proportion.

The resulting slurry is applied to the negative electrode current collector, followed by drying and pressing to form a negative-electrode active material layer. Any known application method can be employed without limitation. Also, a drying method is not particularly limited. Known methods, such as air drying, drying by heating, and drying under reduced pressure, can be employed.

The electrode structure of an electrode produced from the negative-electrode active material by the foregoing method is not particularly limited. The active material present on the current collector preferably has a density of 1 g/cm$^3$ or more, more preferably 1.2 g/cm$^3$ or more, and still more preferably 1.3 g/cm$^3$ or more. The upper limit is preferably 2 g/cm$^3$ or less, preferably 1.9 g/cm$^3$ or less, more preferably 1.8 g/cm$^3$ or less, and still more preferably 1.7 g/cm$^3$ or less. A density exceeding the above range may cause the break of active material particles, thereby increasing the initial irreversible capacity and reducing the permeability of the nonaqueous electrolytic solution to and around the interface between the current collector and the active material to cause a deterioration in charge and discharge characteristics at a high current density. A density of less than the above range may result in a reduction in the conductivity between active material particles, thus increasing battery resistance to cause a reduction in capacity per unit volume.

[Separator]

Usually, a separator is interposed between the positive electrode and the negative electrode to prevent shorting. In this case, usually, the separator is impregnated with the nonaqueous electrolytic solution of the present invention.

The material and shape of the separator are not particularly limited. A porous sheet or nonwoven fabric having excellent liquid-holding properties and composed of a material stable for the nonaqueous electrolytic solution of the present invention is preferably used. Examples of a material that can be used for the separator include polyolefins, such as polyethylene and polypropylene; polytetrafluoroethylene, and polyether sulfone. Polyolefins are preferred.

The separator usually has 1 μm or more, preferably 5 μm or more, and more preferably 10 μm or more, and usually 50 μm or less, preferably 40 μm or less, and more preferably 30 μm or less. An excessively small thickness of the separator may result in a reduction in insulation performance and mechanical strength. An excessively large thickness cause a deterioration in battery performance such as rate characteristic and a reduction in the energy density of the battery as a whole.

The separator usually has a porosity of 20% or more, preferably 35% or more, and more preferably 45% or more, and usually 90% or less, preferably 85% or less, and more preferably 75% or less. An excessively low porosity is liable to cause an increase in film resistance to deteriorate rate characteristics. An excessively high porosity is liable to cause a reduction in the mechanical strength of the separator to reduce insulation performance.

The separator usually has an average pore size of 0.5 μm or less and preferably 0.2 μm or less and usually 0.05 μm or more. An excessively large average pore size is liable to lead to cause a short circuit. An excessively small average pore size may result in an increase in film resistance, deteriorating rate characteristics.

[Housing]

A housing used for the nonaqueous electrolyte secondary battery of the present invention may be composed of any material. Examples of the material include nickel-plated iron, stainless steel, aluminum and alloys thereof, nickel, and titanium.

The present invention relates to a nonaqueous electrolytic solution for use in a lithium secondary battery having improved battery characteristics, such as cycle characteristics and high-temperature storage characteristics and relates to a nonaqueous electrolyte secondary battery including the nonaqueous electrolytic solution.

More specifically, as described in the following Examples, advantages are demonstrated in terms of a remaining capacity, a recovery capacity, the amount of gas generated, a storage gas, a gas-generation inhibition rate, load characteristics after storage, a cycle capacity retention rate, and the ratio of cycle capacity retention rates.

The gas-generation inhibition rate and the ratio of cycle capacity retention rates are determined as described below.

Hereinafter, a "cyano group-containing compound" is used to indicate a unsaturated nitrile compound (1), unsaturated nitrile compound (2), which are characteristic of the present invention, or a compound having 2 to 4 cyano groups in its structural formula.

<Evaluation of Battery Characteristics>

1. Storage Test

A sheet battery held between glass plates to improve contact between electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated 3 cycles to stabilize the battery. Then, the battery was subjected to 4.2-V-CCCV charge (0.05 C cut) and stored at 85° C. for 24 hours. The sheet battery was immersed in an ethanol bath before and after the high-temperature storage. The amount of gas generated (storage gas) was determined from the change in volume.

The battery after the storage was discharged at 25° C. at a constant current of 0.2 C until the battery voltage reached a discharge cut-off voltage of 3 V, subjected to 4.2 V-CCCV charge (0.05 C cut), and discharged at a current corresponding to 0.2 C until the battery voltage reached 3 V, and then a 0.2-C capacity was measured. Next, the battery was subjected to 4.2-V-CCCV charge (0.05 C cut) and discharged at a current corresponding to 1.0 C until the battery voltage reached 3 V, and then a 1.0-C capacity was measured. The ratio of the 1.0-C capacity after the storage to the 0.2-C capacity after the storage (1.0-C capacity/0.2-C capacity) is defined as the load characteristics after storage.

Furthermore, a value calculated by the subtraction of the ratio (%) of the amount of gas generated from a battery including a nonaqueous electrolytic solution that contains a cyano group-containing compound of the present invention to the amount of gas generated from a corresponding battery including a nonaqueous electrolytic solution that does not contain a cyano group-containing compound of the present invention from 100, i.e., 100−{(amount of gas generated from battery including nonaqueous electrolytic solution that contains cyano group-containing compound of the invention/amount of gas generated from battery including nonaqueous electrolytic solution that does not contain cyano group-containing compound of the invention)×100}, is defined as the gas-generation inhibition rate (%). The term "1 C" indicates a current value when a battery is fully charged in one hour.

2. Cycle Test

The sheet battery held between glass plates to improve contact between the electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated three cycles to stabilize the battery. A cycle test was performed as follows: the charge-discharge operation of 0.5-C-CCCV charge (0.05 C cut) and constant-current discharge at 0.5 C until 3 V was repeated. The rate of a discharge capacity in the 100th cycle to a discharge capacity in the fourth cycle, i.e., (discharge capacity in 100th cycle/discharge capacity in 4th cycle), is defined as the cycle capacity retention rate.

The ratio of the cycle capacity retention rate of a battery including a nonaqueous electrolytic solution that contains a cyano group-containing compound of the present invention to the cycle capacity retention rate of a corresponding battery including a nonaqueous electrolytic solution that does not contain a cyano group-containing compound of the present invention, i.e., (cycle capacity retention rate of battery including nonaqueous electrolytic solution that contains cyano group-containing compound of the invention/cycle capacity retention rate of battery including nonaqueous electrolytic solution that does not contain cyano group-containing compound of the invention), is defined as the ratio of the cycle capacity retention rates.

The gas-generation inhibition rate is usually 5% or more, preferably 10% or more, more preferably 15% or more, particularly preferably 30% or more, and most preferably 60% or more from the viewpoint of suppressing the expansion of a battery.

The ratio of the cycle capacity retention rates is usually 0.6 or more, preferably 0.7 or more, more preferably 0.8 or more, particularly preferably 0.9 or more, and most preferably 1.0 or more from the viewpoint of improving the lifetime of a battery.

EXAMPLES

While the present invention will now be described in further detail by means of examples, the present invention, the present invention is not limited to these examples without departing from the scope of the present invention.

Examples 1 to 25 and Comparative Examples 1 to 18

Nonaqueous electrolyte secondary batteries were produced according to the following procedure and evaluated. Tables 1 to 5 show the results.
[Production of Positive Electrode]

First, 85 parts by weight of $LiCoO_2$ ("C5", manufactured by Nippon Chemical Industrial Co., Ltd.) serving as a positive-electrode active material, 6 parts by weight of carbon black, and 9 parts by weight of polyvinylidene fluoride (trade name: "KF-1000", manufactured by Kureha Corporation) were mixed, followed by addition of N-methyl-2-pyrrolidone to form a slurry. The resulting slurry was uniformly applied to both surfaces of aluminum foil having a thickness of 15 μm, followed by drying. The resulting foil was pressed in such a manner that positive-electrode active material layers had a density of 3.0 g/cm³, thereby forming a positive electrode.
[Production of Graphite Negative Electrode]

First, 94 parts by weight of natural graphite having a d value of the lattice plane (002 plane) on X-ray diffraction of 0.336 nm, a crystallite size (Lc) of 652 nm, an ash content of 0.07% by weight, a median diameter by the laser diffraction and scattering method of 12 μm, a BET specific surface area of 7.5 m²/g, an R value (IB/IA) determined by Raman spectrum analysis with argon ion laser light of 0.12, and a half-width of a peak observed in the range of 1,570 to 1,620 cm⁻¹ of 19.9 cm⁻¹ and 6 parts by weight of polyvinylidene fluoride were mixed, followed by addition of N-methyl-2-pyrrolidone to form a slurry. The resulting slurry was uniformly applied to a surface of copper foil having a thickness of 12 μm, naturally dried, and finally dried at 85° C. for whole day and night under reduced pressure. Then the copper foil was pressed in such a manner that a negative-electrode active material layer had a density of 1.5 g/cm³, thereby forming a negative electrode.
[Preparation of Electrolytic Solution]

Under a dry argon atmosphere, compounds described in solvent and additive sections of each of the rows of [Examples] and [Comparative Examples] in Tables 1 to 5 described below were mixed in proportions described in the sections, and then $LiPF_6$ serving as an electrolytic salt was dissolved therein in such a manner that the concentration of $LiPF_6$ was 1 mol/L, thereby preparing nonaqueous electrolytic solutions (nonaqueous electrolytic solutions in Examples 1 to 25 and Comparative Examples 1 to 18).
[Production of Nonaqueous Electrolyte Secondary Battery]

The positive electrode, the negative electrodes, and a separator composed of polyethylene were stacked in a sequence of negative electrode/separator/positive electrode/separator/negative electrode, thereby forming a battery element. The battery element was placed in a bag formed of a laminate film in which both surfaces of an aluminum film (with a thickness of 40 μm) were covered with resin layers in such a manner that terminals of the positive electrode and the negative electrode were protruded. The nonaqueous electrolytic solution prepared according to the foregoing procedure was fed into the bag, followed by vacuum sealing to produce a sheet battery.
[Evaluation of Battery]

The sheet battery held between glass plates to improve contact between the electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated three cycles to stabilize the battery. In the fourth cycle, the battery was subjected to 4.4-V-constant-current constant-voltage charge (CCCV charge) (0.05 C cut) in which the battery was charged at a current corresponding to 0.5 C until the battery voltage reached a charge cut-off voltage of 4.4 V and then charged until a charging current reached a value corresponding to 0.05 C. Then the battery was discharged at a constant current corresponding to 0.2 C until the battery voltage reached 3 V, and the discharge capacity was measured before high-temperature storage. Next, the battery was subjected to 4.4-V-CCCV charge (0.05 C cut) and then high-temperature storage at 85° C. for 24 hours. The sheet battery was immersed in an ethanol bath before and after the high-temperature storage. The amount of gas generated was determined from the change in volume. Tables 1 to 5 show the amount of gas.

After the storage, the battery was discharged at a constant current of 0.2 C until the battery voltage reached a discharge cut-off voltage of 3 V at 25° C., and the remaining capacity after the storage test was determined. Next, the battery was subjected to 4.4-V-CCCV charge (0.05 C cut). The battery was discharged at a current corresponding to 0.2 C until the battery voltage reached a discharge cut-off voltage of 3 V, and the 0.2-C capacity was measured. Thereby, the 0.2-C capacity after the storage test was determined and defined as the recovery capacity. The term "1 C" indicates a current value when a battery is fully charged in one hour.

Tables 1 to 5 show the remaining capacity and the recovery capacity (%) when the discharge capacity before the high-temperature storage was defined as 100%.

In Tables 1 to 5, the values of parts by weight correspond to the solvents and the additives. That is, in Example 1 in Table 1, the expression "ethylene carbonate+ethylmethyl carbonate (35.32+63.43)" in the solvent section is used to indicate that 35.32 parts by weight of ethylene carbonate and 63.43 parts by weight of ethylmethyl carbonate were mixed. The expression "vinylene carbonate+crotononitrile (1+0.25)" in the additive section is used to indicate that 1 part by weight of vinylene carbonate and 0.25 parts by weight of crotononitrile were mixed. The same is true for Table 6 and other Tables.

TABLE 1

|  | Solvent (parts by weight) | Additive (parts by weight) | Remaining capacity (%) | Recovery capacity (%) | Amount of gas (mL) |
| --- | --- | --- | --- | --- | --- |
| Example1 | Ethylene carbonate + ethylmethyl carbonate (35.32 + 63.43) | Vinylene carbonate + crotononitrile (1 + 0.25) | 78 | 84 | 0.02 |
| Example2 | Ethylene carbonate + ethylmethyl carbonate (35.32 + 63.43) | Vinylene carbonate + 2-methyl-2-pentenenitrile (1 + 0.25) | 78 | 81 | 0.03 |
| Example3 | Ethylene carbonate + ethylmethyl carbonate (35.32 + 63.43) | Vinylene carbonate + cinnamonitrile (1 + 0.25) | 79 | 84 | 0.05 |
| Example4 | Ethylene carbonate + ethylmethyl carbonate (35.4 + 63.5) | Vinylene carbonate + crotononitrile (1 + 0.1) | 80 | 84 | 0.08 |
| Example5 | Ethylene carbonate + ethylmethyl carbonate (35.2 + 63.3) | Vinylene carbonate + crotononitrile (1 + 0.5) | 77 | 78 | 0.03 |
| Example6 | Ethylene carbonate + ethylmethyl carbonate (35.67 + 64.08) | Crotononitrile (0.25) | 76 | 81 | 0.03 |
| Example7 | Ethylene carbonate + ethylmethyl carbonate (35.32 + 63.43) | Fluoroethylene carbonate (1 + 0.25) | 81 | 86 | 0.04 |
| Example8 | Ethylene carbonate + ethylmethyl carbonate (35.32 + 63.43) | 4,5-Difluoroethylene carbonate + crotononitrile (1 + 0.25) | 80 | 87 | 0.06 |
| Example9 | Ethylene carbonate + ethylmethyl carbonate (35.32 + 63.43) | Lithium difluorophosphate + crotononitrile (1 + 0.25) | 80 | 85 | 0.05 |

TABLE 2

|  | Solvent (parts by weight) | Additive (parts by weight) | Remaining capacity (%) | Recovery capacity (%) | Amount of gas (mL) |
| --- | --- | --- | --- | --- | --- |
| Example10 | Ethylene carbonate + ethylmethyl carbonate (34.96 + 62.79) | Vinylene carbonate + fluoroethylene carbonate + crotononitrile (1 + 1 + 0.25) | 78 | 84 | 0.08 |
| Example11 | Ethylene carbonate + ethylmethyl carbonate (34.96 + 62.79) | Vinylene carbonate + 4,5-difluoroethylene carbonate + crotononitrile (1 + 1 + 0.25) | 79 | 86 | 0.09 |
| Example12 | Ethylene carbonate + ethylmethyl carbonate (35.37 + 62.88) | Vinylene carbonate + lithium difluorophosphate + crotononitrile (1 + 0.5 + 0.25) | 81 | 85 | 0.05 |
| Example13 | Ethylene carbonate + ethylmethyl carbonate (35.37 + 62.88) | Fluoroethylene carbonate + lithium difluorophosphate + crotononitrile (1 + 0.5 + 0.25) | 80 | 85 | 0.07 |
| Example14 | Ethylene carbonate + ethylmethyl carbonate (35.01 + 62.44) | Vinylene carbonate + fluoroethylene carbonate + lithium difluorophosphate + crotononitrile (1 + 1 + 0.5 + 0.25) | 82 | 86 | 0.07 |
| Example15 | Fluoroethylene carbonate + ethylmethyl carbonate (38 + 61) | Crotononitrile (1) | 73 | 82 | 0.20 |
| Example16 | Fluoroethylene carbonate + ethylmethyl carbonate (38 + 61) | Acrylonitrile (1) | 73 | 83 | 0.22 |
| Example17 | Fluoroethylene carbonate + ethylmethyl carbonate (38 + 60) | Vinylene carbonate + crotononitrile (1 + 1) | 74 | 84 | 0.18 |

TABLE 3

| | Solvent (parts by weight) | Additive (parts by weight) | Remaining capacity (%) | Recovery capacity (%) | Amount of gas (mL) |
|---|---|---|---|---|---|
| Example18 | Fluoroethylene carbonate + ethylmethyl carbonate (38 + 60) | Vinylene carbonate + acrylonitrile (1 + 1) | 73 | 82 | 0.24 |
| Example19 | Fluoroethylene carbonate + ethylmethyl carbonate (38 + 60) | Vinylene carbonate + fumaronitrile (1 + 1) | 75 | 84 | 0.26 |
| Example20 | Fluoroethylene carbonate + ethylmethyl carbonate (38 + 60) | Lithium difluorophosphate + crotononitrile (1 + 1) | 76 | 84 | 0.22 |
| Example21 | Fluoroethylene carbonate + ethylmethyl carbonate (38 + 60) | Vinylene carbonate + lithium difluorophosphate + crotononitrile (1 + 0.5 + 1) | 78 | 85 | 0.24 |
| Example22 | Ethylene carbonate + fluoroethylene carbonate + ethylmethyl carbonate (17 + 20 + 62) | Crotononitrile (1) | 74 | 83 | 0.22 |
| Example23 | Ethylene carbonate + fluoroethylene carbonate + ethylmethyl carbonate (17 + 20 + 61) | Vinylene carbonate + crotononitrile (1 + 1) | 75 | 83 | 0.21 |
| Example24 | Ethylene carbonate + fluoroethylene carbonate + ethylmethyl carbonate (17 + 20 + 61) | Lithium difluorophosphate + crotononitrile (1 + 1) | 76 | 84 | 0.20 |
| Example25 | Ethylene carbonate + fluoroethylene carbonate + ethylmethyl carbonate (17 + 19 + 61) | Vinylene carbonate + lithium difluorophosphate + crotononitrile (1 + 0.5 + 1) | 75 | 84 | 0.22 |

TABLE 4

| | Solvent (parts by weight) | Additive (parts by weight) | Remaining capacity (%) | Recovery capacity (%) | Amount of gas (mL) |
|---|---|---|---|---|---|
| Comparative Example1 | Ethylene carbonate + ethylmethyl carbonate (36 + 64) | None | 70 | 78 | 0.05 |
| Comparative Example2 | Ethylene carbonate + ethylmethyl carbonate (35 + 64) | Vinylene carbonate (1) | 78 | 82 | 0.15 |
| Comparative Example3 | Ethylene carbonate + ethylmethyl carbonate (35.67 + 64.08) | Acrylonitrile (0.25) | 66 | 84 | 0.37 |
| Comparative Example4 | Ethylene carbonate + ethylmethyl carbonate (35 + 64) | Fluoroethylene carbonate (1) | 79 | 85 | 0.13 |
| Comparative Example5 | Ethylene carbonate + ethylmethyl carbonate (35 + 64) | 4,5-Difluoroethylene carbonate (1) | 80 | 86 | 0.19 |
| Comparative Example6 | Ethylene carbonate + ethylmethyl carbonate (35 + 64) | Lithium difluorophosphate (1) | 80 | 86 | 0.14 |
| Comparative Example7 | Ethylene carbonate + ethylmethyl carbonate (35 + 63) | Vinylene carbonate + fluoroethylene carbonate (1 + 1) | 77 | 81 | 0.24 |
| Comparative Example8 | Ethylene carbonate + ethylmethyl carbonate (35.32 + 63.43) | Vinylene carbonate + acrylonitrile (1 + 0.25) | 78 | 81 | 0.10 |
| Comparative Example9 | Ethylene carbonate + ethylmethyl carbonate (35.32 + 63.43) | Vinylene carbonate + methacrylonitrile (1 + 0.25) | 75 | 79 | 0.12 |

TABLE 5

|  | Solvent (parts by weight) | Additive (parts by weight) | Remaining capacity (%) | Recovery capacity (%) | Amount of gas (mL) |
|---|---|---|---|---|---|
| Comparative Example10 | Ethylene carbonate + ethylmethyl carbonate (35.32 + 63.43) | Vinylene carbonate + acetonitrile (1 + 0.25) | 76 | 81 | 0.13 |
| Comparative Example11 | Ethylene carbonate + ethylmethyl carbonate (35.32 + 63.43) | Vinylene carbonate + succinonitrile (1 + 0.25) | 67 | 70 | 0.08 |
| Comparative Example12 | Fluoroethylene carbonate + ethylmethyl carbonate (39 + 61) | None | 60 | 74 | 1.30 |
| Comparative Example13 | Fluoroethylene carbonate + ethylmethyl carbonate (38 + 61) | Acetonitrile (1) | 61 | 72 | 1.25 |
| Comparative Example14 | Fluoroethylene carbonate + ethylmethyl carbonate (38 + 61) | Vinylene carbonate (1) | 72 | 82 | 1.25 |
| Comparative Example15 | Fluoroethylene carbonate + ethylmethyl carbonate (38 + 60) | Vinylene carbonate + acetonitrile (1 + 1) | 70 | 79 | 1.01 |
| Comparative Example16 | Fluoroethylene carbonate + ethylmethyl carbonate (38 + 60) | Vinylene carbonate + succinonitrile (1 + 1) | 65 | 71 | 0.85 |
| Comparative Example17 | Ethylene carbonate + fluoroethylene carbonate + ethylmethyl carbonate (17 + 20 + 63) | None | 59 | 70 | 1.35 |
| Comparative Example18 | Ethylene carbonate + fluoroethylene carbonate + ethylmethyl carbonate (17 + 20 + 62) | Vinylene carbonate (1) | 68 | 79 | 1.33 |

Tables 1 to 5 clearly show that in the case where the nonaqueous electrolyte secondary batteries including the nonaqueous electrolytic solutions each containing unsaturated nitrile compound (1) or unsaturated nitrile compound (2) are produced, the gas generation after the high-temperature storage is suppressed without deteriorating the battery characteristics in terms of the remaining capacity and the recovery capacity, as compared with the case where the nonaqueous electrolyte secondary batteries including the nonaqueous electrolytic solutions without unsaturated nitrile compound (1) or unsaturated nitrile compound (2) are produced. Specifically, in the electrolytic solutions prepared in Examples 1 to 25, the gas generation after the high-temperature storage is suppressed without deteriorating the battery characteristics in terms of the remaining capacity and the recovery capacity, as compared with Comparative Examples 1 to 18.

In particular, in the case of using the compounds represented by general formula (1) or general formula (2) wherein at least one of $R^1$ and $R^2$ or at least one of $R^4$ and $R^5$ represents a cyano group or an optionally halogen atom-containing hydrocarbon group having 1 to 6 carbon atoms, the effect is significant. Furthermore, in the case of using a combination of fluoroethylene carbonate, which is a halogen atom-containing cyclic carbonate, 4,5-difluoroethylene carbonate, vinylene carbonate, which is a cyclic carbonate having a carbon-carbon unsaturated bond, and lithium difluorophosphate selected from the group consisting of monofluorophosphates and difluorophosphates, the effect is particularly significant. In particular, the results demonstrate that in the case where at least one of the halogen atom-containing cyclic carbonate and at least one compound selected from the group consisting of monofluorophosphates and difluorophosphates is incorporated, the remaining capacity and the recovery capacitance are high after the high-temperature storage, which is effective. Moreover, the results demonstrate that also in the case where both are incorporated, the amount of gas generated after the high-temperature storage is small, and the deterioration is suppressed in terms of the remaining capacity and the recovery capacity, as compared with the case where only unsaturated nitrile compound (1) is incorporated. The results also demonstrate that even in the case where a large amount of fluoroethylene carbonate, which is a halogen atom-containing cyclic carbonate, is incorporated, the presence of unsaturated nitrile compound (1) results in a significant suppression of gas generation after the high-temperature storage without deteriorating the battery characteristics.

Examples 26 to 36 and Comparative Examples 19 to 26

A battery was produced as in Example 1, except that the negative electrode was replaced with a negative electrode formed by a method described below, and the electrolytic solution was replaced with a nonaqueous electrolytic solution prepared by mixing compounds described in the solvent and additive sections of each of the rows of [Examples] and [Comparative Examples] in Tables 6 and 7 in proportions described in the sections and dissolving $LiPF_6$ serving as an electrolytic salt therein in such a manner that the concentration of $LiPF_6$ was 1 mol/L (nonaqueous electrolytic solutions in Examples 26 to 36 and Comparative Examples 19 to 26). [Production of Negative Electrode Composed of Silicon Alloy]

As negative-electrode active materials, 73.2 parts by weight of silicon, which is a non-carbon material, 8.1 parts by weight of copper, and 12.2 parts by weight of an artificial graphite powder (trade name: "KS-6", manufactured by Timcal Ltd.) were used. To these materials, 54.2 parts by weight of N-methylpyrrolidone solution containing 12 parts by weight of polyvinylidene fluoride and then 50 parts by weight of N-methylpyrrolidone were added. The mixture was mixed using a disperser to form a slurry. The resulting slurry was uniformly applied to 18-μm-thick copper foil serving as a negative electrode current collector, naturally dried, and finally dried at 85° C. for whole day and night under reduced pressure. Then the copper foil was pressed in such a manner that the electrode density was about 1.5 g/cm$^3$, thereby forming a negative electrode.

[Evaluation of Battery]

The sheet battery held between glass plates to improve contact between the electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated three cycles to stabilize the battery. In the fourth cycle, the battery was subjected to 4.2-V-constant-current constant-voltage charge (CCCV charge) (0.05 C cut) in which the battery was charged at a current corresponding to 0.5 C until the battery voltage reached a charge cut-off voltage of 4.2 V and then charged until a charging current reached a value corresponding to 0.05 C. Then the battery was discharged at a constant current corresponding to 0.2 C until the battery voltage reached 3 V, and the discharge capacity was measured before high-temperature storage. Next, the battery was subjected to 4.2-V-CCCV charge (0.05 C cut) and then high-temperature storage at 60° C. for a week. The sheet battery was immersed in an ethanol bath before and after the high-temperature storage. The amount of gas generated was determined from the change in volume. Tables 6 and 7 show the amount of gas.

After the storage, the battery was discharged at a constant current of 0.2 C until the battery voltage reached a discharge cut-off voltage of 3 V at 25° C., and the remaining capacity after the storage test was determined. Next, the battery was subjected to 4.2-V-CCCV charge (0.05 C cut). The battery was discharged at a current corresponding to 0.2 C until the battery voltage reached a discharge cut-off voltage of 3 V, and the 0.2-C capacity was measured. Thereby, the 0.2-C capacity after the storage test was determined and defined as the recovery capacity. The term "1 C" indicates a current value when a battery is fully charged in one hour.

The discharge capacity before the high-temperature storage was defined as 100%. In this case, the remaining capacity and the recovery capacity (%) were shown in Tables 6 and 7.

TABLE 6

| | Solvent (parts by weight) | Additive (parts by weight) | Remaining capacity (%) | Recovery capacity (%) | Amount of gas (mL) |
|---|---|---|---|---|---|
| Example26 | Ethylene carbonate + diethyl carbonate (34 + 60) | Fluoroethylene carbonate + crotononitrile (5 + 1) | 85 | 89 | 0.09 |
| Example27 | Ethylene carbonate + diethyl carbonate (34 + 60) | Fluoroethylene carbonate + acrylonitrile (5 + 1) | 84 | 88 | 0.08 |
| Example28 | Ethylene carbonate + diethyl carbonate (34 + 60) | Fluoroethylene carbonate + methacrylonitrile (5 + 1) | 84 | 86 | 0.09 |
| Example29 | Ethylene carbonate + diethyl carbonate (34 + 60) | Fluoroethylene carbonate + fumaronitrile (5 + 1) | 88 | 90 | 0.22 |
| Example30 | Ethylene carbonate + diethyl carbonate (34 + 60) | 4,5-Difluoroethylene carbonate + crotononitrile (5 + 1) | 87 | 91 | 0.11 |
| Example31 | Ethylene carbonate + diethyl carbonate (34 + 60) | Vinylene carbonate + crotononitrile (5 + 1) | 85 | 87 | 0.11 |
| Example32 | Ethylene carbonate + diethyl carbonate (36 + 62) | Lithium difluorophosphate + crotononitrile (1 + 1) | 88 | 90 | 0.10 |
| Example33 | Ethylene carbonate + diethyl carbonate (36 + 63) | Crotononitrile (1) | 83 | 87 | 0.11 |
| Example34 | Fluoroethylene carbonate + diethyl carbonate (39 + 60) | Crotononitrile (1) | 87 | 90 | 0.20 |
| Example35 | Fluoroethylene carbonate + diethyl carbonate (37 + 57) | Vinylene carbonate + crotononitrile (5 + 1) | 88 | 91 | 0.22 |
| Example36 | Fluoroethylene carbonate + diethyl carbonate (39 + 59) | Lithium difluorophosphate + crotononitrile (1 + 1) | 87 | 91 | 0.20 |

TABLE 7

| | Solvent (parts by weight) | Additive (parts by weight) | Remaining capacity (%) | Recovery capacity (%) | Amount of gas (mL) |
|---|---|---|---|---|---|
| Comparative Example19 | Ethylene carbonate + diethyl carbonate (37 + 63) | None | 84 | 86 | 0.49 |
| Comparative Example20 | Ethylene carbonate + diethyl carbonate (35 + 60) | Fluoroethylene carbonate (5) | 86 | 89 | 0.83 |

TABLE 7-continued

| | Solvent (parts by weight) | Additive (parts by weight) | Remaining capacity (%) | Recovery capacity (%) | Amount of gas (mL) |
|---|---|---|---|---|---|
| Comparative Example21 | Ethylene carbonate + diethyl carbonate (35 + 60) | 4,5-Difluoroethylene carbonate (5) | 87 | 90 | 0.90 |
| Comparative Example22 | Ethylene carbonate + diethyl carbonate (34 + 60) | Fluoroethylene carbonate + acetonitrile (5 + 1) | 56 | 59 | 0.51 |
| Comparative Example23 | Ethylene carbonate + diethyl carbonate (35 + 60) | Vinylene carbonate (5) | 85 | 88 | 0.95 |
| Comparative Example24 | Fluoroethylene carbonate + diethyl carbonate (40 + 60) | None | 88 | 91 | 1.33 |
| Comparative Example25 | Fluoroethylene carbonate + diethyl carbonate (38 + 57) | Vinylene carbonate (5) | 88 | 90 | 1.31 |
| Comparative Example26 | Fluoroethylene carbonate + diethyl carbonate (39 + 60) | Lithium difluorophosphate (1) | 85 | 88 | 1.35 |

Tables 6 and 7 clearly show that also in the case of using the negative electrode containing the specific metal element used for the negative electrode, the nonaqueous electrolytic solution of the present invention results in the same effect as the carbon electrode, i.e., the gas generation after the high-temperature storage is inhibited without deteriorating the battery characteristics.

Examples 37 to 47 and Comparative Examples 27 to 42

A battery was produced as in each of Examples 26 to 36 and Comparative Examples 19 to 26, except that under a dry argon atmosphere, compounds described in solvent and additive sections of each of the rows of [Examples] and [Comparative Examples] in Tables 8 and 9 described below were mixed in proportions described in the sections, and then LiPF$_6$ serving as an electrolytic salt was dissolved therein in such a manner that the concentration of LiPF$_6$ was 1 mol/L, thereby preparing nonaqueous electrolytic solutions (nonaqueous electrolytic solutions in Examples 37 to 47 and Comparative Examples 27 to 42) (in Tables, EC represents ethylene carbonate, DEC represents diethylene carbonate, FEC represents fluoroethylene carbonate, DFEC represents 4,5-difluoroethylene carbonate, VC represents vinylene carbonate, and LiPO$_2$F$_2$ represents lithium difluorophosphate).

The resulting batteries were similarly evaluated. Tables 8 and 9 show the results. The storage test and the cycle test were performed by methods described below.

[Evaluation of Battery]
1. Storage Test

A sheet battery held between glass plates to improve contact between electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated 3 cycles to stabilize the battery. Then, the battery was subjected to 4.2-V-CCCV charge (0.05 C cut) and stored at 85° C. for 24 hours. The sheet battery was immersed in an ethanol bath before and after the high-temperature storage. The amount of gas generated (storage gas) was determined from the change in volume.

The battery after the storage was discharged at 25° C. at a constant current of 0.2 C until the battery voltage reached a discharge cut-off voltage of 3 V, subjected to 4.2 V-CCCV charge (0.05 C cut), and discharged at a current corresponding to 0.2 C until the battery voltage reached 3 V, and then a 0.2-C capacity was measured. Next, the battery was subjected to 4.2-V-CCCV charge (0.05 C cut) and discharged at a current corresponding to 1.0 C until the battery voltage reached 3 V, and then a 1.0-C capacity was measured. The ratio of the 1.0-C capacity after the storage to the 0.2-C capacity after the storage (1.0-C capacity/0.2-C capacity) is defined as the load characteristics after storage.

Furthermore, a value calculated by the subtraction of the ratio (%) of the amount of gas generated from a battery including a nonaqueous electrolytic solution that contains unsaturated nitrile compound (1) or unsaturated nitrile compound (2) to the amount of gas generated from a corresponding battery including a nonaqueous electrolytic solution that does not contain unsaturated nitrile compound (1) or unsaturated nitrile compound (2) from 100, i.e., 100−{(amount of gas generated from battery including nonaqueous electrolytic solution that contains unsaturated nitrile compound (1) or unsaturated nitrile compound (2)/amount of gas generated from battery including nonaqueous electrolytic solution that does not contain unsaturated nitrile compound (1) or unsaturated nitrile compound (2))×100}, is defined as the gas-generation inhibition rate (%). The term "1 C" indicates a current value when a battery is fully charged in one hour.

2. Cycle Test

The sheet battery held between glass plates to improve contact between the electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated three cycles to stabilize the battery. A cycle test was performed as follows: the charge-discharge operation of 0.5-C-CCCV charge (0.05 C cut) and constant-current discharge at 0.5 C until 3 V was repeated. The rate of a discharge capacity in the 100th cycle to a discharge capacity in the fourth cycle, i.e., (discharge capacity in 100th cycle/discharge capacity in 4th cycle), is defined as the cycle capacity retention rate.

The ratio of the cycle capacity retention rate of a battery including a nonaqueous electrolytic solution that contains unsaturated nitrile compound (1) or unsaturated nitrile compound (2) to the cycle capacity retention rate of a corresponding battery including a nonaqueous electrolytic solution that does not contain unsaturated nitrile compound (1) or unsaturated nitrile compound (2), i.e., (cycle capacity retention rate of battery including nonaqueous electrolytic solution that contains unsaturated nitrile compound (1) or unsaturated nitrile compound (2)/cycle capacity retention rate of battery including nonaqueous electrolytic solution that does not contain unsaturated nitrile compound (1) or unsaturated nitrile compound (2)), is defined as the ratio of the cycle capacity retention rates.

<Evaluation Result>

TABLE 8

| | Negative electrode | Solvent (wt %) | Unsaturated nitrile compound (1) or unsaturated nitrile compound (2) | | Additional additive | | High-temperature storage characteristics | | | Cycle characteristics | |
|---|---|---|---|---|---|---|---|---|---|---|---|
| | | | Additive | Content (wt %) | Additive | Content (wt %) | Storage gas | Gas inhibition rate | Load characteristics after storage | Cycle retention rate | Ratio of cycle retention rate |
| Example 37 | Si | EC + DEC (36 + 63) | Crotononitrile | 1 | — | — | 0.06 | 73.9 | 0.79 | 45.7 | 0.97 |
| Comparative Example 27 | Si | EC + DEC (37 + 63) | — | — | — | — | 0.23 | — | 0.09 | 46.9 | — |
| Example 38 | Si | EC + DEC (35.0 + 59.5) | Crotononitrile | 0.5 | FEC | 5 | 0.15 | 77.9 | 0.51 | — | — |
| Example 39 | Si | EC + DEC (34 + 60) | Crotononitrile | 1 | FEC | 5 | 0.12 | 82.4 | 0.69 | 60.9 | 1.00 |
| Example 40 | Si | EC + DEC (34 + 59) | Crotononitrile | 2 | FEC | 5 | 0.04 | 94.1 | 0.42 | — | — |
| Example 41 | Si | EC + DEC (34 + 60) | Acrylonitrile | 1 | FEC | 5 | 0.08 | 88.2 | 0.74 | — | — |
| Comparative Example 28 | Si | EC + DEC (35 + 60) | — | 0 | FEC | 5 | 0.68 | — | 0.23 | 60.8 | — |
| Example 42 | Si | EC + DEC (36.1 + 61.4) | Crotononitrile | 0.5 | DFEC | 2 | 0.08 | 83.3 | 0.19 | 74.6 | 1.00 |
| Comparative Example 29 | Si | EC + DEC (36 + 62) | — | 0 | DFEC | 2 | 0.48 | — | 0.83 | 74.5 | — |
| Example 43 | Si | EC + DEC (36.1 + 61.4) | Crotononitrile | 0.5 | VC | 2 | 0.07 | 86.0 | 0.39 | 63.0 | 1.00 |
| Comparative Example 30 | Si | EC + DEC (36 + 62) | — | 0 | VC | 2 | 0.50 | — | 0.25 | 63.1 | — |
| Example 44 | Si | EC + DEC (36.4 + 62.1) | Crotononitrile | 0.5 | LiPO2F2 | 1 | 0.06 | 78.6 | 0.07 | 63.4 | 1.00 |
| Comparative Example 31 | Si | EC + DEC (36 + 63) | — | 0 | LiPO2F2 | 1 | 0.28 | — | 0.39 | 63.2 | — |

TABLE 9

| | Negative electrode | Solvent (wt %) | Unsaturated nitrile compound (1) or unsaturated nitrile compound (2) | | Additional additive | | High-temperature storage characteristics | | | Cycle characteristics | |
|---|---|---|---|---|---|---|---|---|---|---|---|
| | | | Additive | Content (wt %) | Additive | Content (wt %) | Storage gas | Gas inhibition rate | Load characteristics after storage | Cycle retention rate | Ratio of cycle retention rate |
| Comparative Example 32 | Carbon | EC + DEC (35.0 + 59.5) | Crotononitrile | 0.5 | — | — | 0.05 | 37.5 | 0.27 | 51.0 | 0.65 |
| Comparative Example 33 | Carbon | EC + DEC (37 + 63) | — | 0 | — | — | 0.08 | — | 0.46 | 79.0 | — |
| Comparative Example 34 | Carbon | EC + DEC (36.1 + 61.4) | Crotononitrile | 0.5 | DFEC | 2 | 0.12 | 65.7 | 0.36 | 87.0 | 0.96 |
| Comparative Example 35 | Carbon | EC + DEC (36 + 62) | — | 0 | DFEC | 2 | 0.35 | — | 0.46 | 91.0 | — |
| Comparative Example 36 | Carbon | EC + DEC (36.4 + 62.1) | Crotononitrile | 0.5 | LiPO2F2 | 1 | 0.03 | 66.7 | 0.44 | 91.5 | 0.99 |
| Comparative Example 37 | Carbon | EC + DEC (36 + 63) | — | 0 | LiPO2F2 | 1 | 0.09 | — | 0.59 | 92.6 | — |
| Example 45 | Si | FEC + DEC (39.8 + 59.7) | Crotononitrile | 0.5 | — | 0 | 0.09 | 76.3 | 0.43 | 82.5 | 1.00 |
| Comparative Example 38 | Si | FEC + DEC (40 + 60) | — | — | — | — | 0.38 | — | 0.77 | 82.7 | — |
| Example 46 | Si | FEC + DEC (39.0 + 58.5) | Crotononitrile | 0.5 | DFEC | 2 | 0.19 | 63.5 | 0.20 | — | — |
| Comparative Example 39 | Si | FEC + DEC (39 + 59) | — | 0 | DFEC | 2 | 0.52 | — | 0.83 | — | — |

TABLE 9-continued

| | Negative electrode | Solvent (wt %) | Unsaturated nitrile compound (1) or unsaturated nitrile compound (2) Additive | Content (wt %) | Additional additive Additive | Content (wt %) | High-temperature storage characteristics Storage gas | Gas inhibition rate | Load characteristics after storage | Cycle characteristics Cycle retention rate | Ratio of cycle retention rate |
|---|---|---|---|---|---|---|---|---|---|---|---|
| Example 47 | Carbon | FEC + DEC (39.8 + 59.7) | Crotononitrile | 0.5 | — | — | 0.09 | 85.5 | 0.32 | 93.4 | 1.00 |
| Comparative Example 40 | Carbon | FEC + DEC (40 + 60) | — | 0 | — | — | 0.62 | — | 0.52 | 93.5 | — |
| Comparative Example 41 | Carbon | FEC + DEC (39.0 + 58.5) | Crotononitrile | 0.5 | DFEC | 2 | 0.14 | 78.1 | 0.43 | — | — |
| Comparative Example 42 | Carbon | FEC + DEC (39 + 59) | — | 0 | DFEC | 2 | 0.64 | — | 0.53 | — | — |

Tables 8 and 9 show the following.

In Example 37, the amount of gas generated after the high-temperature storage was reduced compared with Comparative Example 27 (the Si negative electrode was used, and the nonaqueous electrolytic solution did not contain unsaturated nitrile compound (1)). Furthermore, in Example 37, the value of the load characteristics after storage was large without a significant reduction in cycle retention rate compared with Comparative Example 27.

In Example 39 (the Si negative electrode was used; and the nonaqueous electrolytic solution contained 0.5% by weight of crotononitrile and also contained fluoroethylene carbonate, which is a halogen atom-containing cyclic carbonate), the amount of gas generated after the high-temperature storage was reduced compared with Comparative Example 28 (the Si negative electrode was used; and the nonaqueous electrolytic solution did not contain unsaturated nitrile compound (1) or unsaturated nitrile compound (2) but contained fluoroethylene carbonate, which is a halogen atom-containing cyclic carbonate). Also in each of Examples 40 to 42 (the Si negative electrode was used; and the nonaqueous electrolytic solution contained unsaturated nitrile compound (1) or unsaturated nitrile compound (2) and also contained fluoroethylene carbonate, which is a halogen atom-containing cyclic carbonate), the amount of gas generated after the high-temperature storage was reduced. Furthermore, in Example 39, the load characteristics after storage were further improved compared with Comparative Example 28. A reduction in cycle retention rate was not observed.

Also in each of Examples 42 to 44 (the Si negative electrode was used; and the nonaqueous electrolytic solution contained 0.5% by weight crotononitrile and difluoroethylene carbonate, which is a halogen atom-containing cyclic carbonate, and either vinylene carbonate, which is a cyclic carbonate having a carbon-carbon unsaturated bond, or lithium difluorophosphate, which is a difluorophosphate), the gas generation during high-temperature storage was inhibited while the cycle retention rate was maintained compared with Comparative Examples 29 to 31 (the Si negative electrode was used; and the nonaqueous electrolytic solution did not contain unsaturated nitrile compound (1) or unsaturated nitrile compound (2) but contained difluoroethylene carbonate, which is a halogen atom-containing cyclic carbonate, vinylene carbonate, which is a cyclic carbonate having a carbon-carbon unsaturated bond, or lithium difluorophosphate, which is a difluorophosphate). That is, the combinations of these additives result in the same effects as above.

In Comparative Example 32 (the carbon negative electrode was used; and the nonaqueous electrolytic solution contained 0.5% by weight crotononitrile), the amount of gas generated after the high-temperature storage was reduced compared with Comparative Example 33 (the carbon negative electrode was used; and the nonaqueous electrolytic solution did not contained unsaturated nitrile compound (1)). However, the gas-generation inhibition rate was lower than that in Example 37 in which the Si negative electrode was used. Furthermore, in Comparative Example 32, both of the load characteristics after storage and the cycle capacity retention rate were markedly deteriorated compared with Comparative Example 33. From the results, in the case where unsaturated nitrile compound (1) is used in the battery including the Si negative electrode, unsaturated nitrile compound (1) is more effective in inhibiting the gas generation during high-temperature storage than the case where unsaturated nitrile compound (1) is used in the battery including the carbon negative electrode. Furthermore, the use of unsaturated nitrile compound (1) in the battery including the Si negative electrode is also effective from the viewpoints of the battery characteristics such as the load characteristics after storage and the cycle characteristics.

Also in Example 46 (the Si negative electrode was used; and the nonaqueous electrolytic solution contained unsaturated nitrile compound (1) or unsaturated nitrile compound (2) and also contained fluoroethylene carbonate, which is a halogen atom-containing cyclic carbonate, as a solvent), the generation of the storage gas was inhibited without causing a reduction in cycle retention rate, as compared with Comparative Example 38 (the Si negative electrode was used; and the nonaqueous electrolytic solution did not contain unsaturated nitrile compound (1) or unsaturated nitrile compound (2) but contained fluoroethylene carbonate, which is a halogen atom-containing cyclic carbonate, as a solvent). That is, the effect of the present invention is also exhibited to the nonaqueous electrolytic solution containing the halogen atom-containing cyclic carbonate serving as a solvent.

Furthermore, as shown in Example 47 (the carbon negative electrode was used; and the nonaqueous electrolytic solution contained unsaturated nitrile compound (1) or unsaturated nitrile compound (2) and also contained fluoroethylene carbonate, which is a halogen atom-containing cyclic carbonate, as a solvent), the use of the halogen atom-containing cyclic carbonate as a solvent is also effective for the case of using the carbon negative electrode.

Examples 48 to 63 and Comparative Examples 43 to 55

<Preparation of Nonaqueous Electrolytic Solution in Example 61, Example 62, and Comparative Example 46>

In each of Example 61, Example 62, and Comparative Example 46, under a dry argon atmosphere, sufficiently dried $LiPF_6$ and an additive described in Table 11 were dissolved in a mixture of fluoroethylene carbonate (FEC) and diethyl carbonate (DEC) (volume ratio=3:7, weight ratio=40:60) in such a manner that the concentration of $LiPF_6$ was 1 mol·$dm^{-3}$ and that the concentration of the additive was the value described in Table 11, thereby preparing a nonaqueous electrolytic solution (except that in Comparative Example 46, the additive was not used). As the halogen atom-containing cyclic carbonate, fluoroethylene carbonate (FEC) was contained in the nonaqueous electrolytic solution as described above.

<Preparation of Nonaqueous Electrolytic Solution in Examples and Comparative Examples Other Than Example 61, Example 62, and Comparative Example 46>

In each of Examples and Comparative Examples other than Example 61, Example 62, and Comparative Example 46, under a dry argon atmosphere, sufficiently dried $LiPF_6$ and an additive described in Table 10 or 11 were dissolved in a mixture of ethylene carbonate (EC) and diethyl carbonate (DEC) (volume ratio=3:7, weight ratio=37:63) in such a manner that the concentration of $LiPF_6$ was 1 mol·$dm^{-3}$ and that the concentration of the additive was the value described in Table 10 or 11, thereby preparing a nonaqueous electrolytic solution (except that in Comparative Examples 43 and 51, the additives were not used). As the halogen atom-containing cyclic carbonate, trans-4,5-difluoroethylene carbonate (DFEC) or fluoroethylene carbonate (FEC) was used. As the difluorophosphate, lithium difluorophosphate ($LiPO_2F_2$) was used.

<Production of Positive Electrode>

First, 94% by weight of lithium cobaltate ($LiCoO_2$) serving as a positive-electrode active material, 3% by weight of acetylene black serving as a conductive material, and 3% by weight of polyvinylidene fluoride (PVdF) serving as a binder were mixed in an N-methylpyrrolidone solvent to form a slurry. The resulting slurry was applied to both surfaces of aluminum foil having a thickness of 15 μm and dried in such a manner that the volume was 90% of the volume of a negative electrode. The resulting laminate was rolled so as to have a thickness of 85 μm with a press and then cut into a piece with active material layers each having a width of 65 mm and a length of 150 mm. The piece was then cut to form a positive electrode with active material portions each having a width of 30 mm and a length of 40 mm. The positive electrode was dried at 80° C. for 12 hours under reduced pressure before use.

<Production of Negative Electrode>

(Production of Negative Electrode Composed of Silicon Alloy)

As negative-electrode active materials, 73.2 parts by weight of silicon, which is a non-carbon material, 8.1 parts by weight of copper, and 12.2 parts by weight of an artificial graphite powder (trade name: "KS-6", manufactured by Timcal Ltd.) were used. To these materials, 54.2 parts by weight of N-methylpyrrolidone solution containing 12 parts by weight of polyvinylidene fluoride and then 50 parts by weight of N-methylpyrrolidone were added. The mixture was mixed using a disperser to form a slurry. The resulting slurry was uniformly applied to 18-μm-thick copper foil serving as a negative electrode current collector. The resulting copper foil was pressed in such a manner that the electrode density was about 1.5 g/$cm^3$, and then cut into a piece with an active material portion having a width of 30 mm and a length of 40 mm, thereby forming a negative electrode (silicon-alloy negative electrode). The negative electrode was dried at 60° C. for 12 hours under reduced pressure before use. In Tables 8 and 9, the Si negative electrode is used for convenience in writing.

(Production of Negative Electrode Composed of Carbon)

First, 98 parts by weight of an artificial graphite powder (trade name: KS-44, manufactured by Timcal Ltd.) serving as a negative-electrode active material, 100 parts by weight of an aqueous dispersion of sodium carboxymethylcellulose (with a sodium carboxymethylcellulose content of 1% by weight) serving as a thickener, and 2 parts by weight of an aqueous dispersion of styrene-butadiene rubber (with a styrene-butadiene rubber content of 50% by weight) serving as a binder were mixed with a disperser to form a slurry. The resulting slurry was applied to both surfaces of copper foil having a thickness of 10 μm, followed by drying. The resulting laminate was rolled with a press so as to have a thickness of 75 μm. The laminate was cut into a piece with active material portions each having a width of 30 mm and a length of 40 mm, thereby forming a negative electrode. The negative electrode was dried at 60° C. for 12 hours under reduced pressure before use.

<Production of Secondary Battery>

The positive electrodes, the negative electrode (alloy negative electrode or carbon negative electrode), and separators composed of polyethylene were stacked in a sequence of positive electrode/separator/negative electrode/separator/positive electrode, thereby forming a battery element. The battery element was placed in a bag formed of a laminate film in which both surfaces of an aluminum film (with a thickness of 40 μm) were covered with resin layers in such a manner that terminals of the positive electrode and the negative electrode were protruded. Then 0.4 mL of the nonaqueous electrolytic solution was fed into the bag, followed by vacuum sealing to produce a sheet battery.

[Evaluation of Battery]

1. Storage Test

A sheet battery held between glass plates to improve contact between electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated 3 cycles to stabilize the battery. Then, the battery was subjected to 4.2-V-CCCV charge (0.05 C cut) and stored at 85° C. for 24 hours. The sheet battery was immersed in an ethanol bath before and after the high-temperature storage. The amount of gas generated (storage gas) was determined from the change in volume.

The battery after the storage was discharged at 25° C. at a constant current of 0.2 C until the battery voltage reached a discharge cut-off voltage of 3 V, subjected to 4.2 V-CCCV charge (0.05 C cut), and discharged at a current corresponding to 0.2 C until the battery voltage reached 3 V, and then a 0.2-C capacity was measured. Next, the battery was subjected to 4.2-V-CCCV charge (0.05 C cut) and discharged at a current corresponding to 1.0 C until the battery voltage reached 3 V, and then a 1.0-C capacity was measured. The ratio of the 1.0-C capacity after the storage to the 0.2-C capacity after the storage (1.0-C capacity/0.2-C capacity) is defined as the load characteristics after storage.

Furthermore, a value calculated by the subtraction of the ratio (%) of the amount of gas generated from a battery including a nonaqueous electrolytic solution that contains dicyano compound (3) to the amount of gas generated from a corresponding battery including a nonaqueous electrolytic solution that does not contain dicyano compound (3) from 100, {(100−amount of gas generated from battery including nonaqueous electrolytic solution that contains dicyano compound (3)/amount of gas generated from battery including nonaqueous electrolytic solution that does not contain dicyano compound (3))×100}, is defined as the gas-generation inhibition rate (%). The term "1 C" indicates a current value when a battery is fully charged in one hour.

2. Cycle Test

The sheet battery held between glass plates to improve contact between the electrodes was charged at a constant current corresponding to 0.2 C until the battery voltage reached a charge cut-off voltage of 4.2 V and discharged at a constant current corresponding to 0.2 C until the battery voltage reached a discharge cut-off voltage of 3 V at 25° C. This charge-discharge operation was repeated three cycles to stabilize the battery. A cycle test was performed as follows: the charge-discharge operation of 0.5-C-CCCV charge (0.05 C cut) and constant-current discharge at 0.5 C until 3 V was repeated. The rate of a discharge capacity in the 100th cycle to a discharge capacity in the fourth cycle, i.e., (discharge capacity in 100th cycle/discharge capacity in 4th cycle), is defined as the cycle capacity retention rate.

The ratio of the cycle capacity retention rate of a battery including a nonaqueous electrolytic solution that contains dicyano compound (3) to the cycle capacity retention rate of a corresponding battery including a nonaqueous electrolytic solution that does not contain dicyano compound (3), i.e., (cycle capacity retention rate of battery including nonaqueous electrolytic solution that contains dicyano compound (3)/cycle capacity retention rate of battery including nonaqueous electrolytic solution that does not contain dicyano compound (3)), is defined as the ratio of the cycle capacity retention rates.

<Evaluation Result>

TABLE 10

| | | Additive for nonaqueous electrolytic solution | | | | Evaluation result | | | | |
|---|---|---|---|---|---|---|---|---|---|---|
| | Type of negative electrode | Dicyano compound (3) | | Halogen atom-containing cyclic carbonate (type: wt %) | Difluoro-phosphate (wt %) | Storage gas (mL) | Gas-generation inhibition rate (%) | Load characteristics after storage (1.0C/0.2C) | Cycle capacity retention rate (%) | Ratio of cycle capacity retention rate |
| Example | | Type | Content (wt %) | | | | | | | |
| Example 48 | Si | Succinonitrile | 0.5 | — | — | 0.07 | 69.6 | 0.46 | 32.2 | 0.69 |
| Example 49 | Si | Glutaronitrile | 0.5 | — | — | 0.05 | 78.3 | 0.34 | — | — |
| Example 50 | Si | Adiponitrile | 0.5 | — | — | 0.06 | 73.9 | 0.26 | — | — |
| Example 51 | Si | Pimelonitrile | 0.5 | — | — | 0.03 | 87 | 0.65 | 47.5 | 1.01 |
| Example 52 | Si | Pimelonitrile | 1 | — | — | 0.01 | 95.7 | 0.54 | 47.5 | 1.01 |
| Example 53 | Si | Sebaconitrile | 0.5 | — | — | 0.04 | 82.6 | 0.68 | — | — |
| Example 54 | Si | 3,3'-oxydipropionitrile | 0.5 | — | — | 0.06 | 73.9 | 0.23 | 48 | 1.02 |
| Example 55 | Si | 3,3'-oxydipropionitrile | 1 | — | — | 0 | 100 | 0.22 | 48.1 | 1.03 |
| Comparative Example 43 | Si | — | 0 | — | — | 0.23 | — | 0.09 | 46.9 | 1.00 |
| Example 56 | Si | Succinonitrile | 0.5 | DFEC: 2 | — | 0.29 | 39.6 | 0.31 | 66.7 | 0.90 |
| Example 57 | Si | Pimelonitrile | 0.5 | DFEC: 2 | — | 0.22 | 54.2 | 0.21 | 75.5 | 1.01 |
| Comparative Example 44 | Si | — | 0 | DFEC: 2 | — | 0.48 | — | 0.83 | 74.5 | 1.00 |
| Example 58 | Si | Succinonitrile | 0.5 | — | 1 | 0.16 | 42.9 | 0.03 | 59.4 | 0.94 |
| Example 59 | Si | Pimelonitrile | 0.5 | — | 1 | 0.06 | 78.6 | 0.08 | 63.4 | 1.00 |
| Example 60 | Si | 3,3'-oxydipropionitrile | 0.5 | — | 1 | 0.06 | 78.6 | 0.04 | 64.1 | 1.01 |
| Comparative Example 45 | Si | — | 0 | — | 1 | 0.28 | — | 0.39 | 63.2 | 1.00 |

TABLE 11

| | | Additive for nonaqueous electrolytic solution | | | | Evaluation result | | | | |
|---|---|---|---|---|---|---|---|---|---|---|
| | Type of negative electrode | Dicyano compound (3) | | Halogen atom-containing cyclic carbonate (type: wt %) | Difluorophosphate (wt %) | Storage gas (mL) | Gas-generation inhibition rate (%) | Load characteristics after storage (1.0C/0.2C) | Cycle capacity retention rate (%) | Ratio of cycle capacity retention rate |
| Example | | Type | Content (wt %) | | | | | | | |
| Example 61 | Si | Malononitrile | 0.25 | $X^2$ | — | 0.32 | 15.8 | 0.60 | 86.7 | 1.05 |
| Example 62 | Si | Pimelonitrile | 0.5 | $X^2$ | — | 0.1 | 73.7 | 0.71 | 82.2 | 0.99 |
| Comparative Example 46 | Si | — | 0 | $X^2$ | — | 0.38 | — | 0.77 | 82.7 | 1.00 |
| Example 63 | Si | Succinonitrile | 1 | FEC: 5 | — | 0.23 | 66.2 | 0.59 | — | — |
| Comparative Example 47 | Si | Acetonitrile·$X^1$ | 1 | FEC: 5 | — | 0.41 | 39.7 | 0.08 | — | — |
| Comparative Example 48 | Si | — | 0 | FEC: 5 | — | 0.68 | — | 0.23 | — | — |
| Comparative Example 49 | Carbon | Succinonitrile | 0.5 | — | — | 0.06 | 25.0 | 0.22 | 48.1 | 0.61 |

TABLE 11-continued

| | | Additive for nonaqueous electrolytic solution | | | | Evaluation result | | | | |
|---|---|---|---|---|---|---|---|---|---|---|
| | | | | Halogen atom-containing cyclic carbonate (type: wt %) | Difluorophosphate (wt %) | Storage | Gas-generation inhibition | Load characteristics after | Cycle capacity retention | Ratio of cycle capacity |
| | Type of | Dicyano compound (3) | | | | | | | | |
| Example | negative electrode | Type | Content (wt %) | | | gas (mL) | rate (%) | storage (1.0C/0.2C) | rate (%) | retention rate |
| Comparative Example 50 | Carbon | Pimelonitrile | 0.5 | — | — | 0.04 | 50.0 | 0.32 | 65.4 | 0.83 |
| Comparative Example 51 | Carbon | — | 0 | — | — | 0.08 | — | 0.46 | 79.0 | 1.00 |
| Comparative Example 52 | Carbon | Pimelonitrile | 0.5 | DFEC: 2 | — | 0.19 | 45.7 | 0.39 | 88 | 0.97 |
| Comparative Example 53 | Carbon | — | 0 | DFEC: 2 | — | 0.35 | — | 0.46 | 91 | 1.00 |
| Comparative Example 54 | Carbon | Pimelonitrile | 0.5 | — | 1 | 0.04 | 55.6 | 0.46 | 91.6 | 0.99 |
| Comparative Example 55 | Carbon | — | 0 | — | 1 | 0.09 | — | 0.59 | 92.6 | 1.00 |

※[1]Nitrile compound other than dicyano compound (3)
※[2] Nonaqueous solvent (FEC/DEC = 3/7 (volume ratio))

<Discussion>
Tables 10 and 11 show the following.

In each of Examples 48 to 55 (the Si negative electrode was used; and the nonaqueous electrolytic solution contained 0.5% by weight or 1% by weight of dicyano compound (3)), the amount of gas generated after the high-temperature storage was reduced compared with Comparative Example 43 (the Si negative electrode was used; and the nonaqueous electrolytic solution did not contain dicyano compound (3)). Furthermore, in each of Examples 48 to 55, the value of the load characteristics after storage was larger than that in Comparative Example 43. Among these, the particularly excellent effects were observed in Examples 51 to 53. Moreover, in Example 48, the cycle capacity retention rate was smaller than that in Comparative Example 43. In each of Examples 51, 52, 54, and 55, the cycle capacity retention rate was large. The results demonstrate that dicyano compound (3) has the effect of inhibiting gas generation during high-temperature storage when the Si negative electrode is used. In particular, the effect is significant when n represents 5 or more in general formula (3) described above, improving the load characteristics after storage, the cycle capacity retention rate, and the ratio of the cycle capacity retention rate.

Furthermore, A comparison between Examples 51 and 52 or a comparison between Examples 54 and 55 show that an increase in dicyano compound (3) content from 0.5% by weight to 1% by weight particularly improves the gas-generation inhibition rate.

In Example 56 (the Si negative electrode was used; and the nonaqueous electrolytic solution contained 0.5% by weight of succinonitrile and also contained the halogen atom-containing cyclic carbonate), the amount of gas generated after the high-temperature storage was reduced compared with Comparative Example 44 (the Si negative electrode was used; and the nonaqueous electrolytic solution did not contain dicyano compound (3) but contained the halogen atom-containing cyclic carbonate). In Example 57 (the Si negative electrode was used; and the nonaqueous electrolytic solution contained 0.5% by weight of pimelonitrile and also contained the halogen atom-containing cyclic carbonate, the amount of gas generated after the high-temperature storage was further reduced. In addition, in Example 57, the cycle capacity retention rate was large. The results demonstrate that dicyano compound (3) has the effect of inhibiting gas generation during high-temperature storage when the Si negative electrode is used and the nonaqueous electrolytic solution contains the halogen atom-containing cyclic carbonate. In particular, the effect is significant when n represents 5 or more in general formula (3) described above, improving the cycle capacity retention rate.

In Example 58 (the Si negative electrode was used; and the nonaqueous electrolytic solution contained 0.5% by weight of succinonitrile and also contained difluorophosphate), the amount of gas generated after the high-temperature storage was reduced compared with Comparative Example 45 (the Si negative electrode was used; and the nonaqueous electrolytic solution did not contain dicyano compound (3) but contained difluorophosphate). In each of Examples 59 and 60 (the Si negative electrode was used; and the nonaqueous electrolytic solution contained 0.5% by weight of pimelonitrile or 3,3'-oxydipropionitrile and also contained difluorophosphate), the amount of gas generated after the high-temperature storage was further reduced. Moreover, in each of Examples 59 and 60, the cycle capacity retention rate was large. The results demonstrate that dicyano compound (3) has the effect of inhibiting gas generation during high-temperature storage when the Si negative electrode is used and the nonaqueous electrolytic solution contains monofluorophosphate and/or difluorophosphate. In particular, the effect is significant when n represents 5 or more in general formula (3) described above, maintaining or improving the cycle capacity retention rate.

In each of Comparative Examples 49 and 50 (the carbon negative electrode was used; and the nonaqueous electrolytic solution contained 0.5% by weight of dicyano compound (3)), the amount of gas generated after the high-temperature storage was reduced compared with Comparative Example 51 (the carbon negative electrode was used; and the nonaqueous electrolytic solution did not contain dicyano compound (3)). However, the gas-generation inhibition rate was lower than those in Examples 48, 51, and 52 in which the Si negative electrodes were used. In each of Comparative Examples 49 and 50, the load characteristics after storage and the cycle capacity retention rate were markedly deteriorated compared with those in Comparative Example 51. From the results, in the case where dicyano compound (3) is used in the battery including the Si negative electrode, dicyano compound (3) is more effective in inhibiting the gas generation during high-temperature storage than the case where dicyano compound (3) is used in the battery including the carbon negative electrode. Furthermore, the use of dicyano compound (3) in the battery including the Si negative electrode is also effective from the viewpoints of the battery characteristics such as the load characteristics after storage and the cycle characteristics.

In Comparative Example 52 (the carbon negative electrode was used; and the nonaqueous electrolytic solution contained 0.5% by weight of pimelonitrile and also contained the halogen atom-containing cyclic carbonate), the amount of gas generated after the high-temperature storage was reduced compared with Comparative Example 53 (the carbon negative electrode was used; and the nonaqueous electrolytic solution did not contain dicyano compound (3) but contained the halogen atom-containing cyclic carbonate). However, the gas-generation inhibition rate was lower than that in Example 57 in which the Si negative electrode was used. Furthermore, in Comparative Example 52, the load characteristics after storage and the cycle capacity retention rate were markedly deteriorated compared with Comparative Example 53. From the results, in the case where dicyano compound (3) is used in the battery including the Si negative electrode, dicyano compound (3) is more effective in inhibiting the gas generation during high-temperature storage than the case where dicyano compound (3) is used in the battery including the carbon negative electrode. Furthermore, the use of dicyano compound (3) in the battery including the Si negative electrode is also effective from the viewpoints of the battery characteristics such as the load characteristics after storage and the cycle characteristics.

In Comparative Example 54 (the carbon negative electrode was used; and the nonaqueous electrolytic solution contained 0.5% by weight of pimelonitrile and also contained difluorophosphate), the amount of gas generated after the high-temperature storage was reduced compared with Comparative Example 55 (the carbon negative electrode was used; and the nonaqueous electrolytic solution did not contain dicyano compound (3) but contained difluorophosphate). However, the gas-generation inhibition rate was lower than that in Example 59 in which the Si negative electrode was used. Furthermore, in Comparative Example 54, the load characteristics after storage and the cycle capacity retention rate were markedly deteriorated compared with Comparative Example 55. From the results, in the case where dicyano compound (3) is used in the battery including the Si negative electrode, dicyano compound (3) is more effective in inhibiting the gas generation during high-temperature storage than the case where dicyano compound (3) is used in the battery including the carbon negative electrode. Furthermore, the use of dicyano compound (3) in the battery including the Si negative electrode is also effective from the viewpoints of the battery characteristics such as the load characteristics after storage and the cycle characteristics.

In each of Examples 61 and 62 (the Si negative electrode was used; and the FEC/DEC (3/7) nonaqueous solvent was used as the nonaqueous electrolytic solution and 0.25% by weight of malononitrile or 0.5% by weight of pimelonitrile), the amount of gas generated after the high-temperature storage was reduced compared with Comparative Example 46 (the Si negative electrode was used; and the FEC/DEC (3/7) nonaqueous solvent was used as the nonaqueous electrolytic solution and did not contained dicyano compound (3)). Furthermore, in Example 62, the cycle characteristics were also improved compared with Example 51.

In examples and comparative examples described above, the advantages were proved by dicyano compound (3) having two cyano groups. The present invention, however, is not limited to these examples without departing from the scope of the invention. That is, the present invention is characterized in that the electrolytic solution contains the compound having 2 to 4 cyano groups in its structural formula. With respect to the characteristics thereof, a comparison of Example 63 in which the electrolytic solution contains succinonitrile serving as a compound having two or more cyano groups and Comparative Example 47 in which the electrolytic solution contains acetonitrile serving as a compound having a single cyano group clearly shows that the electrolytic solution in Example 63 exhibits a reduction in storage gas and improvement in load characteristics after storage, as compared with Comparative Example 47. In Comparative Example 47, the load characteristics after storage is impaired compared with Comparative Example 48. These results clearly show that the electrolytic solution containing the compound having 2 to 4 cyano groups in its structural formula has the unique effect as described above. It is thus speculated that an electrolytic solution containing a compound having 3 to 4 cyano groups in its structural formula also has the same effect as the electrolytic solution containing the compound having 2 to 4 cyano groups in its structural formula.

According to the nonaqueous electrolytic solution of the present invention, it is possible to produce a high energy density nonaqueous electrolyte secondary battery having a high capacity and excellent cycle characteristics and suppressing the decomposition of an electrolytic solution used in the nonaqueous electrolyte secondary battery and the deterioration thereof when used in a high-temperature environment. Thus, the battery can be suitably used in various fields such as electronic apparatuses for which nonaqueous electrolyte secondary batteries are used.

Applications of the nonaqueous electrolytic solution for use in secondary batteries and the nonaqueous electrolyte secondary battery according to the present invention are not particularly limited, and the battery can be used various known applications. Examples thereof include notebook type personal computers, pen-input personal computers, mobile personal computers, electronic book players, portable telephones, portable facsimile telegraphs, portable copiers, portable printers, headphone stereos, video movies, liquid-crystal television sets, handy cleaners, portable CDs, mini disks, transceivers, electronic pocketbooks, pocket calculators, memory cards, portable tape recorders, radios, backup power sources, motors, cars, motorcycles, small motor vehicles, bicycles, illuminators, toys, game appliances, clocks, stroboscopes, and cameras.

While the present invention has been described in detail with reference to the specific embodiments, it will be understood by the skilled person that various changes and modifications can be made without departing from the spirit and scope of the invention. The present invention contains subject matter related to Japanese Patent Application No. 2006-329935 filed in the Japanese Patent Office on Dec. 6, 2006 and Japanese Patent Application No. 2007-170651 filed in the Japanese Patent Office on Jun. 28, 2007, the entire contents of which are incorporated herein by reference.

The invention claimed is:

1. A nonaqueous electrolytic solution, comprising:
   an electrolyte,
   a nonaqueous solvent,
   at least one compound selected from the group consisting of a halogen atom-containing cyclic carbonate in a content of from 0.001 to 70% by weight; a cyclic carbonate having a carbon-carbon unsaturated bond in a content of from 0.01 to 5% by weight; and a monofluorophosphate, difluorophosphate, or combination thereof in a content of from 0.001 to 5% by weight, and
a compound of formula (2):

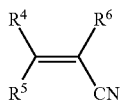

wherein $R^4$, $R^5$, and $R^6$ are each independently a hydrogen atom, a cyano group, a hydrocarbon group having 1 to 10 carbon atoms, or a halogen atom-substituted hydrocarbon group having 1 to 10 carbon atoms, with the proviso that $R^4$ and $R^5$ are not both hydrogen atoms, and wherein the compound of formula (2) comprises at least one nitrile compound selected from the group consisting of crotononitrile, 3-methylcrotononitrile, 3-fluorocrotononitrile, 4-fluorocrotononitrile, 4,4-difluorocrotononitrile, 4,4,4-trifluorocrotononitrile, and 3-(fluoromethyl)crotononitrile.

2. The nonaqueous electrolytic solution of claim 1, wherein a content of the compound of formula (2) in the nonaqueous electrolytic solution is from 0.001 to 10% by weight.

3. The nonaqueous electrolytic solution of claim 1, comprising at least one halogen atom-containing cyclic carbonate selected from the group consisting of fluoroethylene carbonate, difluoroethylene carbonate, fluoropropylene carbonate, trifluoromethylethylene carbonate, and fluorotrifluoromethylethylene carbonate.

4. The nonaqueous electrolytic solution of claim 1, comprising at least one cyclic carbonate having a carbon-carbon unsaturated bond selected from the group consisting of vinylene carbonate, 4-methylvinylene carbonate, 4,5-dimethylvinylene carbonate, 4-vinylethylene carbonate, and 5-methyl-4-vinylethylene carbonate.

5. The nonaqueous electrolytic solution of claim 4, wherein the at least one cyclic carbonate having a carbon-carbon unsaturated bond comprises vinylene carbonate.

6. The nonaqueous electrolytic solution of claim 5, wherein the nonaqueous electrolytic solution is suitable for a nonaqueous electrolyte secondary battery.

7. The nonaqueous electrolytic solution according to claim 1, wherein the compound of formula (2) comprises crotononitrile.

8. The nonaqueous electrolytic solution of claim 7, wherein the nonaqueous electrolytic solution is suitable for a nonaqueous electrolyte secondary battery.

9. A nonaqueous electrolyte secondary battery, comprising:
a positive electrode comprising a positive-electrode active material capable of storing and releasing metal ions,
a negative electrode comprising a negative-electrode active material comprising at least one atom selected from the group consisting of Si, Sn, and Pb, and capable of storing and releasing metal ions, and
the nonaqueous electrolytic solution of claim 1.

10. A nonaqueous electrolyte secondary battery, comprising:
a negative electrode,
a positive electrode, and
the nonaqueous electrolytic solution of claim 1,
wherein the negative electrode and the positive electrode are each capable of storing and releasing metal ions.

11. The nonaqueous electrolyte secondary battery of claim 10, wherein the negative electrode comprises a carbonaceous material serving as an active material.

12. The nonaqueous electrolyte secondary battery of claim 11, wherein the nonaqueous electrolytic solution comprises at least one cyclic carbonate having a carbon-carbon unsaturated bond selected from the group consisting of vinylene carbonate, 4-methylvinylene carbonate, 4,5-dimethylvinylene carbonate, 4-vinylethylene carbonate, and 5-methyl-4-vinylethylene carbonate.

13. The nonaqueous electrolyte secondary battery of claim 12, wherein the nonaqueous electrolytic solution comprises vinylene carbonate.

14. The nonaqueous electrolyte secondary battery of claim 13, wherein the compound of formula (2) comprises crotononitrile.

* * * * *